US 9,800,717 B2

(12) United States Patent
Ma et al.

(10) Patent No.: US 9,800,717 B2
(45) Date of Patent: Oct. 24, 2017

(54) MOBILE TERMINAL AND METHOD FOR CONTROLLING THE SAME

(71) Applicant: LG ELECTRONICS INC., Seoul (KR)

(72) Inventors: Yongbeom Ma, Seoul (KR); Hyongguk Kim, Seoul (KR); Jaekul Lee, Seoul (KR); Moonkil Seo, Seoul (KR); Mihwa Chang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/724,933

(22) Filed: May 29, 2015

(65) Prior Publication Data

US 2015/0350413 A1 Dec. 3, 2015

(30) Foreign Application Priority Data

May 30, 2014 (KR) .................. 10-2014-0066308

(51) Int. Cl.
*H04M 1/725* (2006.01)
*G01C 21/34* (2006.01)
*G01C 21/36* (2006.01)

(52) U.S. Cl.
CPC .... *H04M 1/72577* (2013.01); *G01C 21/3423* (2013.01); *G01C 21/362* (2013.01); *H04M 1/7253* (2013.01); *H04M 1/72569* (2013.01); *H04M 2250/12* (2013.01)

(58) Field of Classification Search
CPC ......... H04M 1/72577; H04M 1/72569; H04M 1/7253; H04M 2250/12; G01C 21/3605
See application file for complete search history.

(56) References Cited

U.S. PATENT DOCUMENTS

2011/0254692 A1* 10/2011 Furuta ................ H04M 1/7253
                                                                                340/636.1
2012/0242473 A1*  9/2012 Choi .................... B60W 50/14
                                                                                340/441
2013/0345980 A1* 12/2013 van Os .............. G01C 21/3626
                                                                                701/538

(Continued)

FOREIGN PATENT DOCUMENTS

KR   10-2003-0041689    5/2003
KR   10-2012-0033146    4/2012
KR   10-2014-0065079    5/2014

OTHER PUBLICATIONS

Office Action issued in Korean Application No. 10-2014-0066308 on Nov. 23, 2015, 5 pages.

(Continued)

*Primary Examiner* — Chuong A Ngo
(74) *Attorney, Agent, or Firm* — Fish & Richardson P.C.

(57) ABSTRACT

An embodiment disclosed in the present disclosure discloses a mobile terminal for performing communication with a vehicle control apparatus installed in a vehicle, and the mobile terminal may include a wireless communication unit configured to form a network comprising the vehicle control apparatus and the mobile terminal, respectively, as one node thereof, and a controller configured to allow the vehicle control apparatus or the mobile terminal to perform an operation corresponding to an event according to whether or not the vehicle is moving or whether a user is getting on or off the vehicle based on the event generated from at least one node.

23 Claims, 27 Drawing Sheets

(56) References Cited

U.S. PATENT DOCUMENTS

2015/0057872 A1\* 2/2015 Uchimura ............ H04M 1/7253
 701/29.1
2015/0213657 A1\* 7/2015 Tanaka ................... G07C 5/008
 701/123

OTHER PUBLICATIONS

Korean Office Action is Jun. 3, 2015 for Korean Application No. 10-2014-0066308, 4 pages.
The car control with your smartphone. SKT T Car. Jan. 21, 2014, 2 pages.
Parking and starting up the remote control from the master bedroom. Front vehicle accident information is delivered in real time. (Herald business news), 3 pages.

\* cited by examiner

AS10

AS20

AS30

AS40

MOBILE TERMINAL AND METHOD FOR CONTROLLING THE SAME

CROSS-REFERENCE TO RELATED APPLICATION

Pursuant to 35 U.S.C. §119(a), this application claims the benefit of earlier filing date and right of priority to Korean Application No. 10-2014-0066308, filed on May 30, 2014, the contents of which is incorporated by reference herein in its entirety.

BACKGROUND OF THE DISCLOSURE

1. Field of the Disclosure

The technology disclosed in the present specification relates to a mobile terminal, and more particularly, to a mobile terminal for sharing an event occurred according to whether or not a vehicle is moving or whether or not a user is riding on the vehicle between a vehicle control apparatus provided in the vehicle and the mobile terminal, and a control method thereof.

2. Background of the Disclosure

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player. Efforts are ongoing to support and increase the functionality of mobile terminals. Such efforts include software and hardware improvements, as well as changes and improvements in the structural components.

In addition, in recent years, various types of mobile terminals have been developed in consideration of user convenience. Of them, a wearable device may include various types of electronic devices that are wearable on a user's body or user's clothes. The wearable device may include, for example, a smart watch, a wearable computer, a google glass, a Bluetooth headset, a smart wear, and the like.

The wearable device is implemented in the form of a multimedia device having a complex function according to its various functions. For example, a smart watch may capture still images or record moving images through a camera provided therein or reproduce multimedia content through a display unit formed on the body thereof in addition to a basic function as a watch. Otherwise, the smart watch may check messages over a wireless network and connect to a social network using various email plug-ins or the like.

Studies for providing more convenience to the user using various functions in the mobile terminal or wearable device have been actively carried out.

In particular, the need for the use of such a mobile terminal or wearable device in association with the driving or operation of a vehicle has been gradually increased.

SUMMARY OF THE DISCLOSURE

A technical task disclosed in the present disclosure is to provide a mobile terminal and a control method thereof for sharing an event generated from either one terminal device of the mobile terminal and a vehicle control apparatus with another terminal device to maintain continuity between programs operated in each terminal device regardless of whether or not a vehicle is moving or whether or not a user is riding on the vehicle, thereby enhancing user convenience.

According to an embodiment disclosed in the present disclosure, there is disclosed a mobile terminal for performing communication with a vehicle control apparatus installed in a vehicle, and the mobile terminal may include a wireless communication unit configured to form a network comprising the vehicle control apparatus and the mobile terminal, respectively, as one node thereof, and a controller configured to allow the vehicle control apparatus or the mobile terminal to perform an operation corresponding to an event according to whether or not the vehicle is moving or whether a user is getting on or off the vehicle based on the event generated from at least one node.

According to an embodiment, the wireless communication unit may transmit data corresponding to the event to the vehicle control apparatus to allow the vehicle control apparatus to perform an operation corresponding to the event.

According to an embodiment, the mobile terminal may further include a display unit configured to display a pop-up window for receiving the user input.

According to an embodiment, the display unit may display at least one graphic object within the pop-up window, and the controller may perform an operation corresponding to the event according to a selection input to the graphic object.

According to an embodiment, the graphic object may display a number of event occurrences on the graphic object or around the graphic object.

According to an embodiment, when an operation corresponding to the event is carried out, the controller may display whether or not the event has occurred or a number of the event occurrences on part of the screen while performing the operation.

According to an embodiment, the controller may display whether or not the event has occurred or a number of the event occurrences in or around a portion displayed on the screen to receive a command for executing a program of executing an operation corresponding to the event.

According to an embodiment, the mobile terminal may further include an output unit configured to output an event in the form of light, vibration or sound when the event has occurred.

According to an embodiment, the controller may determine whether or not the vehicle is moving or whether or not a user is riding on the vehicle using any one or a combination of an ignition on/off state of the vehicle, a speed of the vehicle, a change or non-change of the vehicle location, and a distance between the vehicle control apparatus and the mobile terminal.

According to an embodiment, when power is on within a predetermined distance to the location of the vehicle, the mobile terminal may execute a program for displaying the location of the vehicle according to a user input.

According to an embodiment, the location of the vehicle may be a current location recognized by the mobile terminal or vehicle control apparatus when generating a user's getting-off event.

According to an embodiment, a program for displaying the location of the vehicle may display the location of the vehicle on a map or display a photo set by a user input.

According to an embodiment, a program for displaying the location of the vehicle may output a different vibration amplitude or frequency according to a distance difference between the mobile terminal and the vehicle.

According to an embodiment, a program for displaying the location of the vehicle may output a different voice or a different notification sound amplitude or frequency according to a distance difference between the mobile terminal and the vehicle.

According to an embodiment, when power is on within a predetermined distance to the location of the vehicle control apparatus, the mobile terminal may execute a program for setting a destination of the vehicle control apparatus according to a user input.

According to an embodiment, when power is on within a predetermined distance to the location of the vehicle control apparatus, the mobile terminal may execute a program for executing a schedule management program according to a user input.

According to an embodiment, when power is on within a predetermined distance to the location of the vehicle control apparatus, the mobile terminal may display the information of the vehicle according to a user input.

According to an embodiment, when power is on within a predetermined distance to the location of the vehicle control apparatus, the mobile terminal may display a message containing a schedule-related text according to a user input.

According to an embodiment, when power is on within a predetermined distance to the location of the vehicle control apparatus, the mobile terminal may execute a program for transmitting a control command to the vehicle according to a user input.

According to an embodiment, the control command to the vehicle may include at least one of an air conditioning control inside the vehicle, a control of whether the vehicle door is open or closed, a control of whether the vehicle window is open or closed, and a control of whether the vehicle sunroof is open or closed.

According to an embodiment, the mobile terminal may display the information of the vehicle according to a user input when a user's getting-on event has occurred.

According to an embodiment, the information of the vehicle may include at least one of an air conditioning state inside the vehicle, whether the vehicle door is open or closed, whether the vehicle window is open or closed, an alarm state of the vehicle, whether a door is open or closed, whether a window is open or closed, whether a sunroof is open or closed, a battery charging state of the vehicle, a fueling state of the vehicle, and tire pressure information.

According to an embodiment, the mobile terminal may execute a program for transmitting a control command to the vehicle according to a user input when a user's getting-on event has occurred.

According to an embodiment, the mobile terminal may execute a program for setting a destination on the vehicle control apparatus according to a user input when a user's getting-on event has occurred.

According to an embodiment, a program for setting the destination may set a place name retrieved more than a predetermined number of times based on a search log stored in the mobile terminal or a place registered more than a predetermined number of times on a schedule management program or a place contained in a message in which the message containing a specific place name is repeated more than a predetermined number of times, as a destination on the vehicle control apparatus.

According to an embodiment, upon receiving a call while the vehicle is moving, the mobile terminal may reject an incoming call and sends a response message to an outgoing call destination, and execute a program for originating a call to the outgoing call destination according to a user input when a vehicle's non-moving event or user's getting-off event has occurred.

According to an embodiment, upon receiving a message containing a schedule-related text while the vehicle is moving, the mobile terminal may execute a schedule management program according to a user input when a vehicle's non-moving event or user's getting-off event has occurred.

According to an embodiment, upon making a recording while the vehicle is moving, the mobile terminal may execute a program capable of managing the recording file according to a user input when a vehicle's non-moving event or user's getting-off event has occurred.

According to an embodiment, upon determining the non-arrival of the vehicle to a preset destination, the mobile terminal may display a route from a current location to the destination on the screen according to a user input when a vehicle's non-moving event or user's getting-off event has occurred.

According to an embodiment, subsequent to determining the arrival of the vehicle to a preset first destination, the vehicle control apparatus may set a second destination, and determine the arrival of the vehicle to the second destination again, and the mobile terminal may display a route from the second destination to the first destination according to a user input when a vehicle's non-moving event or user's getting-off event has occurred.

According to an embodiment, when the vehicle control apparatus determines the arrival of the vehicle to a preset destination, the mobile terminal may display information associated with the destination when a vehicle's non-moving event or user's getting-off event has occurred.

According to an embodiment, the mobile terminal may transmit a query containing the set destination name to a search server, and display response data received from the search server on the screen according to a user input.

According to an embodiment, when the vehicle control apparatus determines the arrival of the vehicle to a preset destination, the mobile terminal may execute an outgoing call program to place a call to a contact corresponding to an address stored in an address book according to a user input when a distance between the address stored in the address book and a destination set to the vehicle control apparatus is within a predetermined distance.

According to an embodiment, when the vehicle control apparatus determines the arrival of the vehicle to a preset destination, the mobile terminal may execute an outgoing call program to place a call to a contact in a message stored along with a place or the message originator according to a user input when a distance between the place contained in a prestored message and a destination set to the vehicle control apparatus is within a predetermined distance.

According to an embodiment, when the vehicle control apparatus determines the arrival of the vehicle to a preset destination, the mobile terminal may execute an outgoing call program to place a call to a contact stored along with a place in a schedule management program according to a user input when a distance between the place stored in the schedule management program and a destination set to the vehicle control apparatus is within a predetermined distance.

According to an embodiment, when the vehicle control apparatus determines the arrival of the vehicle to a preset destination, the mobile terminal may execute a photo capture program, a memo program or recording program according to a user input when a vehicle's non-moving event or user's getting-off event has occurred.

Furthermore, according to an embodiment disclosed in the present disclosure, there is disclosed a vehicle control apparatus installed in a vehicle to perform communication with a mobile terminal, and the vehicle control apparatus may include a wireless communication unit configured to form a network comprising the vehicle control apparatus and the mobile terminal, respectively, as one node thereof, and a controller configured to allow the vehicle control apparatus or the mobile terminal to perform an operation corresponding to an event according to whether or not the vehicle is moving or whether a user is riding on the vehicle based on the event generated from at least one node.

Furthermore, an embodiment disclosed in the present disclosure discloses a vehicle mounted with the vehicle control apparatus.

In addition, according to an embodiment disclosed in the present disclosure, there is disclosed a control method of a mobile terminal for performing communication with a vehicle control apparatus installed in a vehicle, and the control method may include forming a network comprising the vehicle control apparatus and the mobile terminal, respectively, as one node thereof, and allowing the vehicle control apparatus or the mobile terminal to perform an operation corresponding to an event according to whether or not the vehicle is moving or whether a user is riding on the vehicle based on the event generated from at least one node.

According to a mobile terminal and a control method thereof according to an embodiment disclosed in the present disclosure, it may be possible to acquire vehicle information on a vehicle from a vehicle control apparatus installed in the vehicle, and output the acquired vehicle information to the outside, thereby allowing a user to check the vehicle information in an easy, fast and efficient manner as well as performing control on the vehicle in a remote manner prior to getting on the vehicle using the vehicle control apparatus installed in the vehicle.

Furthermore, a mobile terminal and a control method thereof according to an embodiment disclosed in the present disclosure may be linked with the vehicle control apparatus, thereby sharing an event generated from either one terminal device between the mobile terminal and vehicle control apparatus with another terminal device.

Accordingly, it may be possible to maintain continuity between programs operated in each terminal device regardless of whether or not the vehicle is moving or whether or not the user is riding on the vehicle, thereby enhancing user convenience.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Figure 1:
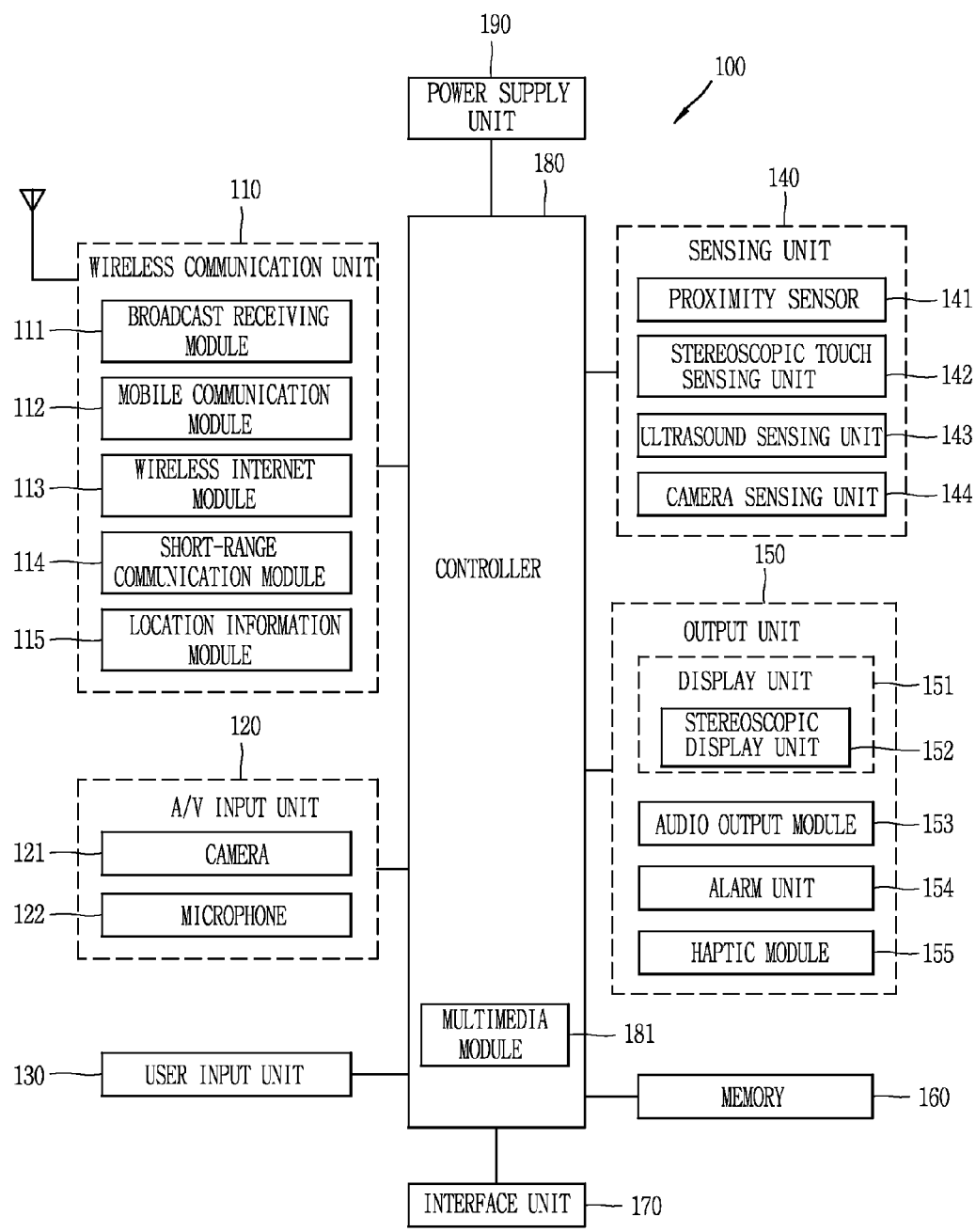
FIG. 1 is a block diagram illustrating a mobile terminal according to an embodiment disclosed in the present disclosure.

The technology disclosed in the present disclosure may be applicable to a mobile terminal and a control method thereof. In particular, the technology disclosed in the present disclosure may be applicable to a wearable device linked or connected to a vehicle, and a control method thereof.

Specifically, the technology disclosed in the present disclosure relates to a mobile terminal linked or connected to a vehicle control apparatus to perform communication with the vehicle control apparatus provided in the vehicle, and a control method thereof.

In particular, the technology disclosed in the present disclosure may provide a moving direction to a destination, and provide a mobile terminal and a control method thereof linked to vehicle navigation.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices, and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

A vehicle control apparatus according to the present invention is applied to various pieces of equipment and apparatuses, such as a telematics terminal, a navigation terminal, audio video navigation (AVN) terminal, a television set, a 3D television set, an audio/video (A/V) system, an information providing center, and a call center.

In addition, the vehicle control apparatus according to the present invention is configured to be also in the form of a mobile terminal that is connected to the vehicle in a wired or wireless manner. In this case, like the mobile terminal described above, the vehicle control apparatuses include a mobile phone, a smart phone, a laptop computer, a digital-broadcast-dedicated terminal, a personal digital assistant (PDA), a portable multimedia player (PMP), a navigation system, a slate PC, a tablet PC, a ultrabook, a wearable device and the like.

The technical terms used in the present specification are set forth to mention specific embodiments of the present invention, and do not intend to define the scope of the present invention. As far as not being defined differently, all terms used herein including technical or scientific terms may have the same meaning as those generally understood by an ordinary person skilled in the art to which the present disclosure belongs to, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that can be properly understood by the skilled person in the art. In addition, general terms used in the description of the present disclosure should be construed according to definitions in dictionaries or according to its front or rear context, and should not be construed to have an excessively restrained meaning.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Preferred embodiments of the present invention will be described below in detail with reference to the accompanying drawings where those components are rendered the same reference number that are the same or are in correspondence, regardless of the figure number, and redundant explanations are omitted.

In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings.

Mobile Terminal

Hereinafter, a mobile terminal according to an embodiment of the present invention will be explained in more detail with reference to FIGS. 1 to 5B.

FIG. 1 is a block diagram of a mobile terminal 100 according to an embodiment of the present invention.

As shown in FIG. 1, the mobile terminal 100 includes a radio communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components will be explained.

The radio communication unit 110 typically includes one or more components to authorize radio communication between the mobile terminal 100 and a radio communication unit system or a network in which the mobile terminal 100 is located. For example, the radio communication unit 110 may include a broadcast receiving module 111, a mobile communication module 112, a wireless Internet module 113, a short range communication module 114, a location information module 115, etc.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network. In this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include Bluetooth™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a mobile terminal. An example of the location information module 115 may include a Global Position System (GPS) module or a Wireless Fidelity (Wi-Fi) module.

Still referring to FIG. 1, the NV input unit 120 is configured to provide audio or video signal input to the mobile terminal. The NV input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 153, an alarm unit 154 and a haptic module 155.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display and an e-ink display.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

The display unit 151 may also be implemented as a stereoscopic display unit 152 for displaying stereoscopic images.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the three dimensional sensor, the sensing units 140 is configured to include a proximity sensor 141, a three dimensional touch sensing unit 142, a ultrasound sensing unit 143, a camera sensing unit 144, and a bio-information obtainment unit 145.

The proximity sensor 141 measures a distance between a sensing target object (for example, a user's finger or a stylus pen) with which a touch is applied without mechanical contact and a sensing surface using the strength of an electromagnetic field or infrared light. The terminal recognizes which part of a stereoscopic image is touched on using the distance. Particularly, a touch screen is a capacitive type, a proximity extent of the sensing target object is sensed with a change in an electric field due to the proximity of the sensing target object. The touch screen is configured in such a manner as to recognize a three dimensional touch using the proximity extent.

The three dimensional touch sensing unit 142 is configured to sense the strength of the touch that is applied to a touch screen or the time for which the touch is applied to the touch screen. For example, the three dimensional touch sensing unit 142 senses a pressure of the applied touch. The three dimensional touch sensing unit 142 determines that the higher the pressure of the touch being applied to an object is, the farther the object is positioned away from the touch screen.

The ultrasound sensing unit 143 is configured in such a manner that positional information on the sensing target object is recognized using ultrasound.

The ultrasound sensing unit 143, for example, is configured from an optical sensor and multiple ultrasound sensors. The optical sensor is formed in such a manner as to sense light, and the ultrasound sensor is formed in such a manner to sense ultrasound. Because light is faster than ultrasound, the time it takes for the light to arrive at the optical sensor is shorter than the time it takes the ultrasound to arrive at the ultrasound sensor. Therefore, a position of a source from which a wave originates is calculated using a difference in arrival time between the light and the ultrasound.

The camera sensing unit 144 includes at least one of a camera, a photo sensor, and a laser sensor.

For example, the camera and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the mobile terminal. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The bio-information obtainment unit 145 obtains bio-information through a user's specific body portion.

According to one embodiment, the bio-information obtainment unit 145 measures a bio-signal that is generated by physiological potential in the human body.

As one example, the bio-information obtainment units 145 is configured to include at least one among a pulse plethyamography (PPG) sensor, an electrocardiogram (ECG) sensor, a galvanic skin reflex (GSR) sensor, an electro-encephalogram (EEG) sensor, an electro-myogram (EMG) sensor, and an electro-oculography (EOG) sensor. These sensor measure a pulse blood flow, an electrocardiogram, a galvanic skin reflex, an electro-encephalogram, an electro-myogram, and a bio-signal by eye movements.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer or the like.

The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, using vibration to inform about an occurrence of an event. The video or audio signals may be also outputted via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be outputted or sequentially outputted.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a communication system which is operable with the mobile terminal 100 according to the present disclosure will be described.

Figure 2A:
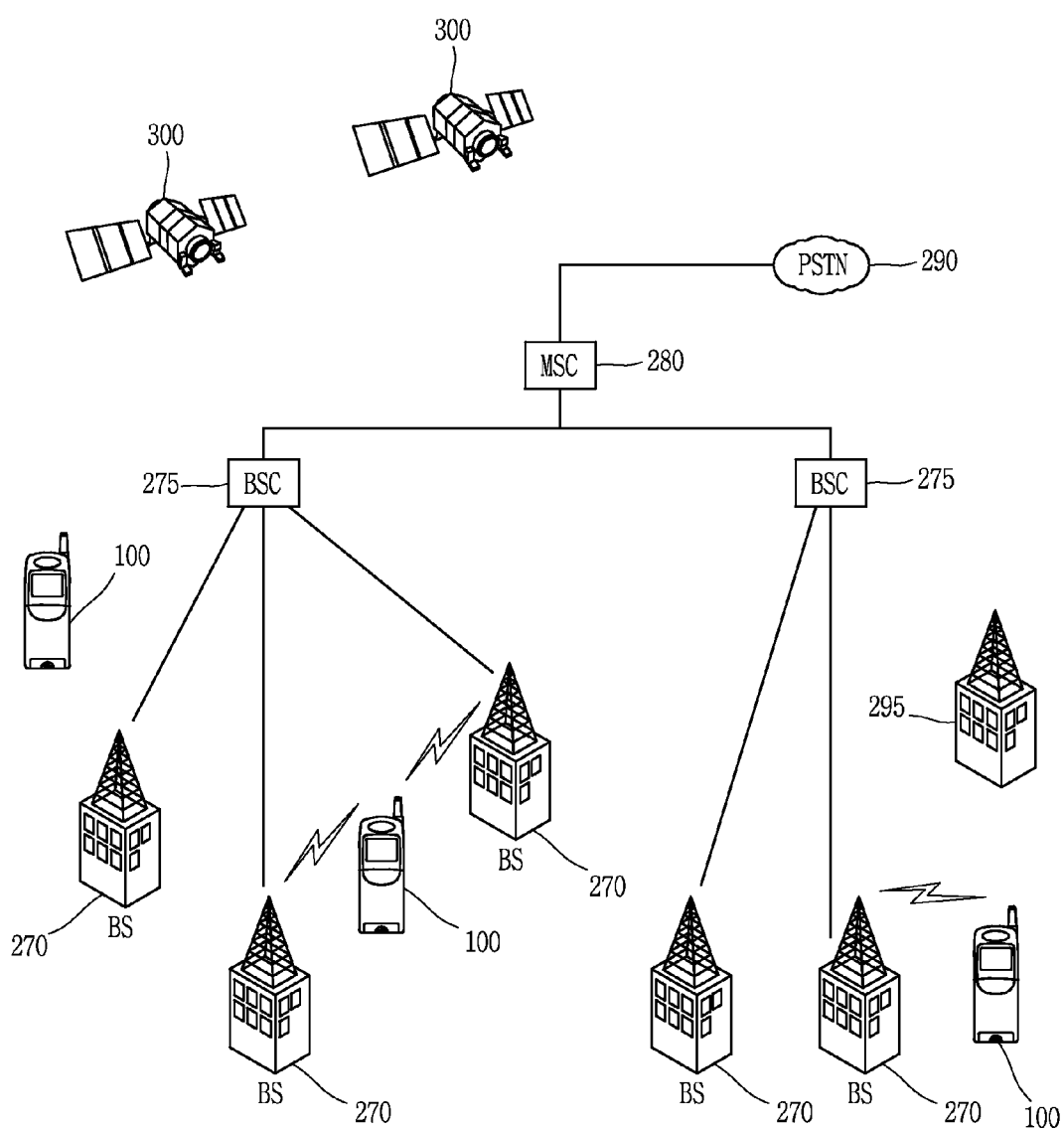
FIGS. 2A and 2B are conceptual views illustrating a communication system in which a mobile terminal according to the present disclosure is operable.
Figure 2B:
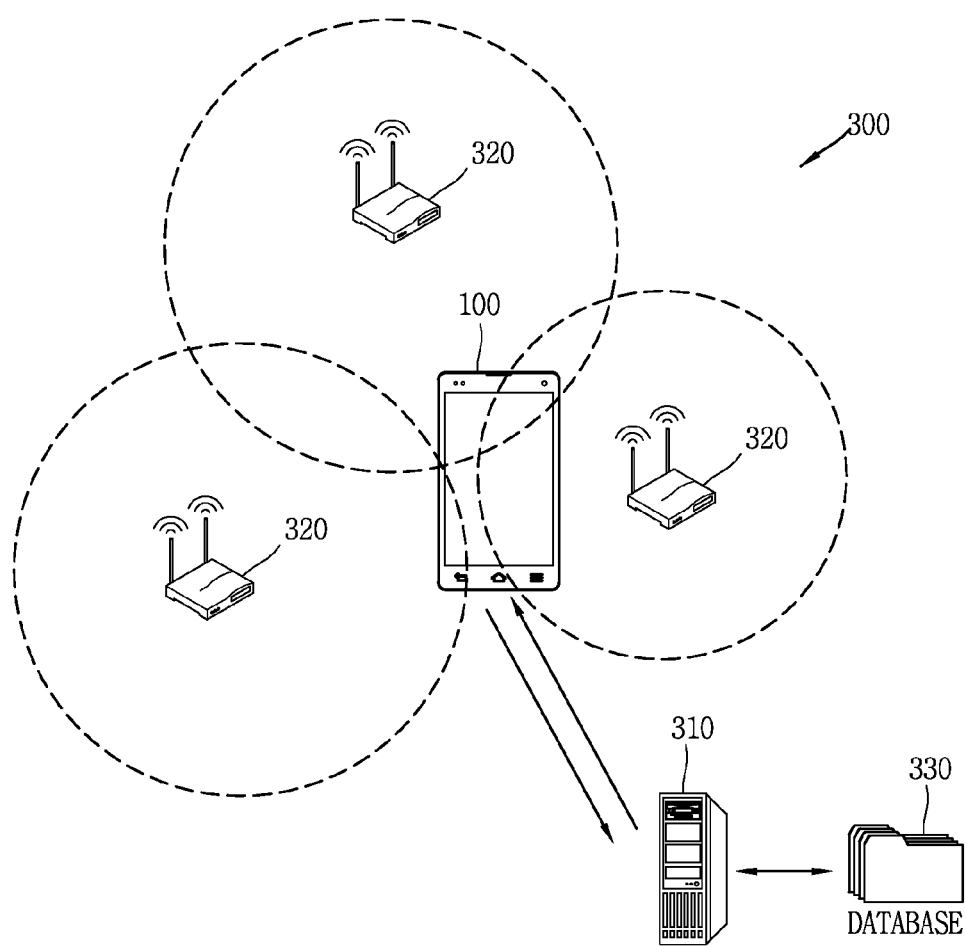

FIGS. 2A and 2B are conceptual views of a communication system operable with a mobile terminal 100 in accordance with the present disclosure.

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 2A, a CDMA wireless communication system is shown having a plurality of mobile terminal s 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the mobile terminal s 100 operating within the system. The broadcast receiving module 111 (FIG. 1B) is typically configured inside the mobile terminal 100 to receive broadcast signals transmitted by the BT 295.

FIG. 2A further depicts several Global Positioning System (GPS) satellites 300. Such satellites 300 facilitate locating the position of at least one of plural mobile terminal s 100. Two satellites are depicted in FIG. 2, but it is understood that useful position information may be obtained with greater or fewer satellites than two satellites. The GPS module 115 (FIG. 1B) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminal s 100. The mobile terminal s 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminal s 100.

Hereinafter, description will be given of a method for acquiring location information of a mobile terminal using a wireless fidelity (WiFi) positioning system (WPS), with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the display device 100 may be transmitted to the display device 100 through the WiFi location determination server 310, thereby acquiring the location information of the display device 100.

Types of realization of the mobile terminal, disclosed in the present specification, according to one embodiment, are described below referring to FIGS. 3A to 5B.

Figure 3A:
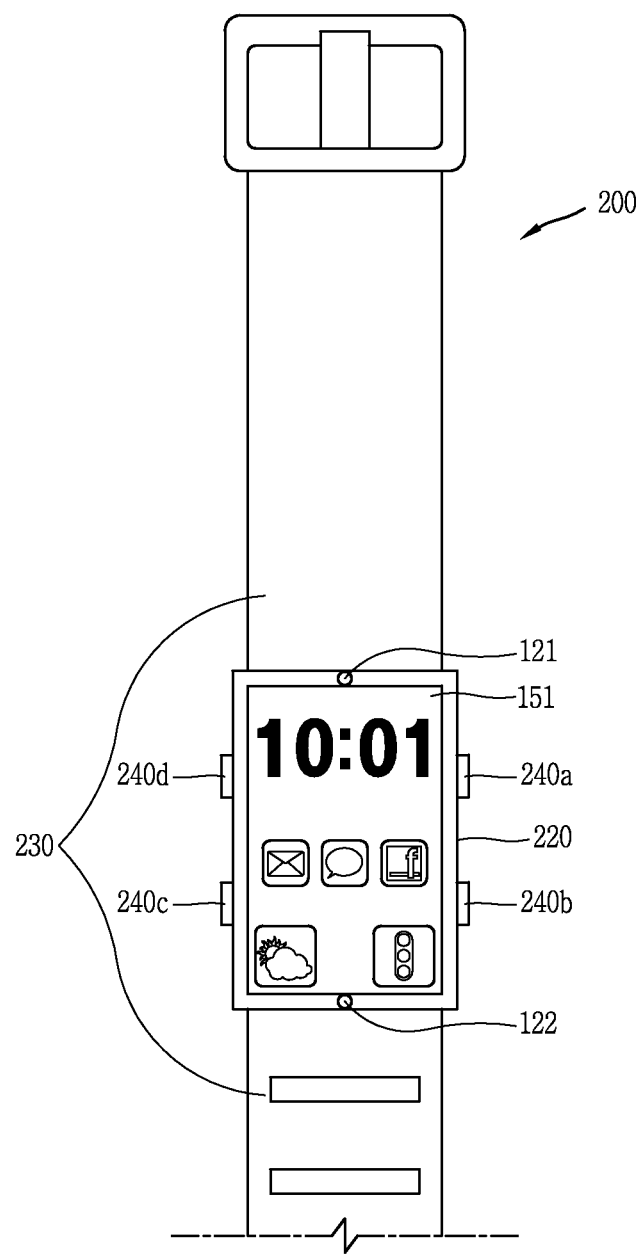
FIGS. 3A and 3B are views illustrating the front and rear surfaces of a smart watch according to an embodiment of the present disclosure.
Figure 3B:
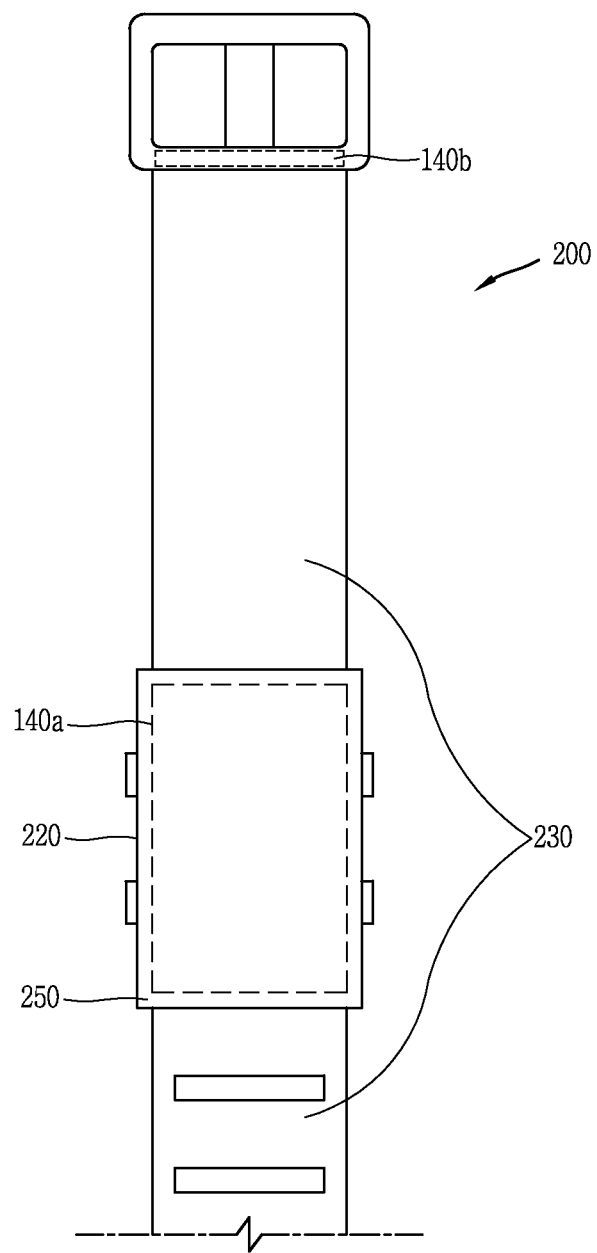

FIGS. 3A and 3B are diagrams illustrating a front side and a rear side of a smart watch according to one embodiment of the present invention.

That is, FIGS. 3A and 3B illustrate a case where the mobile terminal 100 takes the form of a smart watch, which is a watch-type mobile terminal, among wearable devices.

A smart watch 200 that is disclosed in the present specification has rectangular construction. However, the present invention is not limited to this, and of course, may be applied to a smart watch having various types of constructions in the shape of a circle, a triangle, or the like.

The smart watch 200 includes a band 230 and a body 220. A case forming an appearance of the body 220 may include a front case 210 and a rear case 250. A space formed by the front case 210 and the rear case 250 may accommodate various components therein. At least one intermediate case may further be disposed between the front case 210 and the rear case 250. Such cases may be formed by injection-molded synthetic resin, or may be formed using a metallic material such as stainless steel (STS) or titanium (Ti).

Referring to FIG. 3A, a display unit 151, a camera 121, a microphone 122, and the like are arranged in the front case 210.

The display 151 occupies most parts of a main surface of the front case 210. A camera 121 and a microphone 122 may be arranged at two ends of the display unit 151.

Various types of visual information may be displayed on the display unit 151. Such information may be displayed in the form of texts, numbers, signs, graphics or icons.

For input of such information, at least one of the texts, numbers, signs, graphics or icons may be arranged in the form of a keypad. Such keypad may be called 'soft key'.

The display unit 151 may be operated as an entire region, or as a plurality of divided regions. In the latter case, the plurality of regions may be associated with each other.

In addition, a wire/wireless headset port (not illustrated) and a wire/wireless data port (not illustrated) are arranged on one lateral face of a main body of the smart watch 200. These ports are configured as one example of an interface 170 (refer to FIG. 1).

Referring to FIG. 3B, a first sensor 145a is arranged on a rear face of the main body 220, that is, a rear case 250. The first sensor 145a is a sensor that senses a state of a user's skin or a signal of a user' living body. In addition, a second sensor 145b that senses a movement of a user's muscle and the like is arranged on a band 230 that comes into contact with a skin of a user' wrist.

An antenna for receiving broadcast signals may be disposed on a side surface of the body 220. The antenna, part of the broadcast receiving module 111 (refer to FIG. 1) may be provided in the body 220 in a retractable manner.

Then, an audio output module (not illustrated), an interface, and the like are arranged in the main body 220 of the smart watch 200. In addition, a user input unit 240, a connection port, and the like are arranged lateral faces of the front case 210 and the rear case 250.

The user input unit 240 is operated to receive a command for controlling the operation of the smart watch 200, which may include at least one of manipulation units 240a, 240b, 240c and 240d. The manipulation units may be referred to as manipulating portions, and may include any type of ones that can be manipulated in a user's tactile manner.

Commands inputted through the manipulation units may be variously set. For instance, the manipulation units may be configured to input commands such as START, END, SCROLL or the like, and configured to input commands for controlling a level of sound outputted from the audio output unit 152, or commands for converting the current mode of the display 151 to a touch recognition mode.

A connection port may be configured to receive data from an external device or to receive power, thereby transmitting it to each component inside the smart watch 200. Alternatively, the connection port may be configured to allow data inside the smart watch 200 to be transmitted to an external device. The connection port may be configured as one example of the interface unit 170 (refer to FIG. 1).

A power supply unit (not illustrated) that supplies electric power to the smart watch 200 is installed in the main body 220 of the smart watch 200. The power supply unit is configured to be in the form suitable to be built into the main body 220.

Figure 4A:
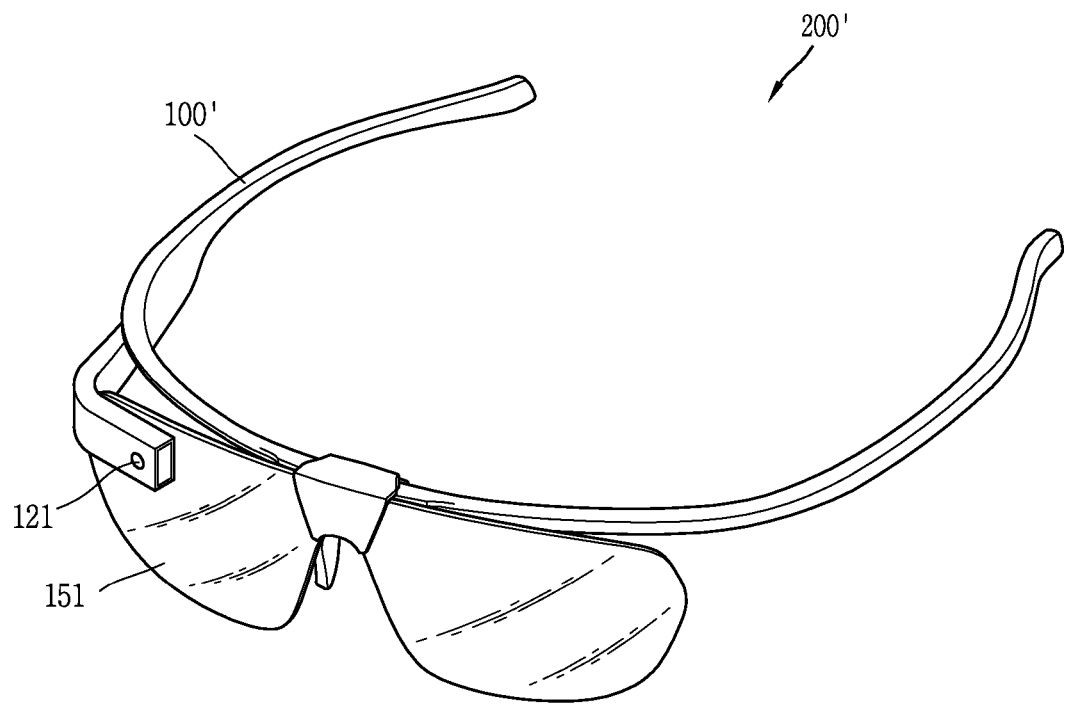
FIGS. 4A and 4B are conceptual views illustrating a wearable glasses type terminal according to an embodiment disclosed in the present disclosure.
Figure 4B:
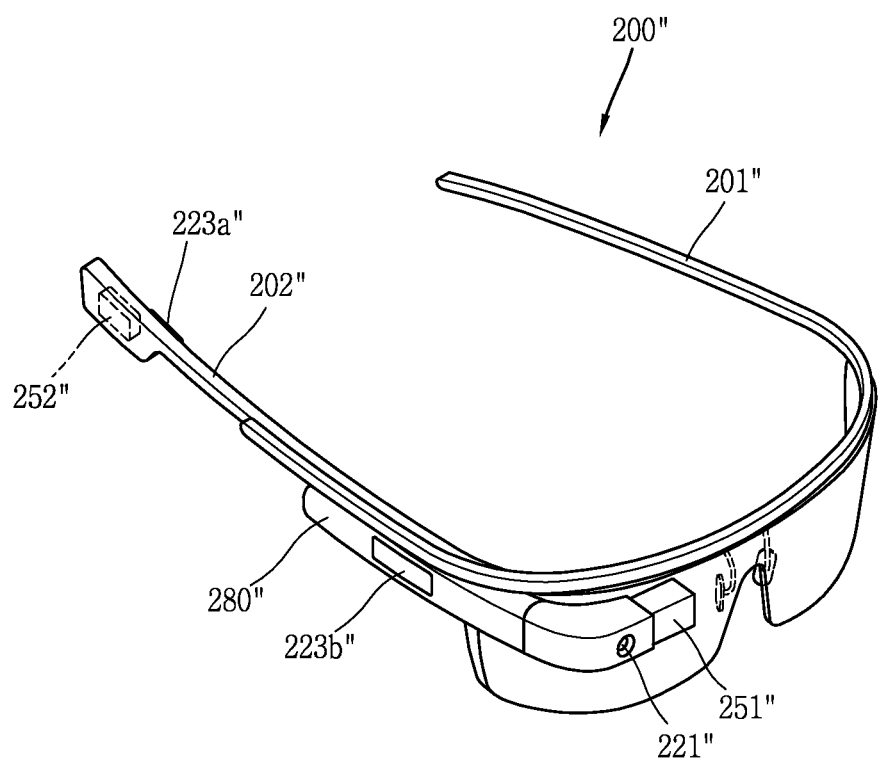

FIGS. 4A and 4B are diagrams of a wearable glasses-type terminal, disclosed in the present specification, according to one embodiment.

That is, FIGS. 4A and 4B illustrate a case where the mobile terminal 100 is realized as a type of smart glasses, which is a glasses-type mobile terminal, among wearable devices.

Referring to FIG. 4A, a wearable glasses-type terminal 200', disclosed in the present specification, according to one embodiment, is configured to include a main body 100', a display unit 151, a controller 180.

The wearable glasses-type terminal 200', disclosed in the present specification, according to one embodiment may further include a user input unit, a voice recognition unit, and a motion sensing unit.

The wearable glasses-type terminal 200', disclosed in the present specification, according to one embodiment, is realized as a head-mounted display (HMD). A specific example, the wearable glasses-type terminal 200' is realized as smart glasses.

The main body 100' is formed in such a manner that it is mountable on the human head. For example, the main body 100' is realized as a frame of the smart glasses.

The display units 151, coupled with the main body 100', are arranged in positions that correspond to both eyes, respectively. In addition, the display unit 151 has optical transparency, and visual information is output to the display unit 151.

The visual information is generated in the wearable glasses-type terminal 200', or means a virtual object that is input from an external device. For example, the virtual object means an application, an icon corresponding to the application, content, a UI for a communication mode or the like. The virtual object is generated by the controller 180 or is input from the mobile terminal, such as a smart phone.

At this point, since the display unit 151 has the optical transparency, the user can view an external environment through the display unit 151.

In addition, according to one embodiment, the external environment may be viewed through the display unit 151 and at the same time, information on an arbitrary external object that makes up the external environment may be output to the display unit 151. For example, the external object is a business card, a human being, or an external device with which mutual communication is possible.

As described above, the controller 180 controls the wearable glasses-type terminal 200'. Specifically, the controller 180 outputs information on the external device, which is sensed in a wireless communication unit 110, to the display unit 151.

For example, the controller 180 identifies a position of the sensed external device. At this point, the controller 180 determines whether or not the sensed external device is positioned within a user's sight and based on a result of this determination, determines whether or not the information on the sensed external device will be output.

In addition, the controller 180 is mounted on the main body 100' of the wearable glasses-type terminal 200' or the controller 180 and the main body 100 are integrally formed into one piece. According to another embodiment, the controller 180 may be arranged away from the main body 100'.

The camera 121 is arranged in front of at least one of the left-eye and right-eye display units 151. Alternatively, the camera 121 is arranged on one side or both sides of the frame 100' and thus photographs an object that is out of the wearer's sight.

The user input unit 130 is realized as a separate touch panel that is provided on one side or both sides of the frames 110. Alternatively, the user input unit 130 may be realized as a physical key. For example, an ON/OFF switch for a power source is realized in such a manner that it is provided on one side of the frame 110'.

According to another embodiment, the user input unit 130 may be realized as a separate external device that is connected to the main body 100'. Accordingly, the user can input a specific command into the separate external device. Alternatively, the display unit 151 is realized as a touch screen, and thus the user can input a control command directly into the display unit 151.

According to another embodiment, the user input unit 130 may be realized as a module that recognizes a user's voice command. Accordingly, the user can input a specific voice command into the main body 100'.

On the other hand, the wearable glasses-type terminal according to one embodiment appears on the market. The smart glasses, realized as the wearable device conveniently, executes a function that is executed in the existing mobile terminal.

The external environment that is seen through the display unit 151 and the visual information being output are displayed together on the display unit 151 of the smart glasses (this is referred to as an augmented reality). Accordingly, the user can more easily grasp the information on the arbitrary object that makes up the external environment.

In addition, the smart glasses performs wireless communication with other different smart glasses or with the external device that is capable of communicating with the smart glasses. At this point, information relating to the external device is output to the display unit 151.

FIG. 4B is a perspective view illustrating a wearable device where an eye-proximity display according to an embodiment of the present invention can be mounted.

Referring to FIG. 4B, the wearable device is a glass-type mobile terminal 200", which can be wearable on a head of a human body and be provided with a frame (case, housing, etc.) therefor. The frame may be made of a flexible material to be easily worn. The frame of mobile terminal 200" is shown having a first frame 201" and a second frame 202", which can be made of the same or different materials.

The frame may be supported on the head and defines a space for mounting various components. As illustrated, electronic components, such as a control module 280", an audio output module 252", and the like, may be mounted to the frame part. Also, a display unit 251" for covering either or both of the left and right eyes may be detachably coupled to the frame part.

The control module 280" controls various electronic components disposed in the mobile terminal 200". The control module 280" may be understood as a component corresponding to the aforementioned controller 180 (refer to FIG. 1). FIG. 4B illustrates that the control module 280" is installed in the frame part on one side of the head, but other locations are possible.

The display unit 251" may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 200", the display unit 251" may be located to correspond to either or both of the left and right eyes. FIG. 4B illustrates that the display unit 251" is located on a portion corresponding to the right eye to output an image viewable by the user's right eye.

The display unit 251" may project an image into the user's eye using a prism. Also, the prism may be formed from optically transparent material such that the user can view both the projected image and a general visual field (a range that the user views through the eyes) in front of the user.

In such a manner, the image output through the display unit 251" may be viewed while overlapping with the general visual field. The mobile terminal 200" may provide an augmented reality (AR) by overlaying a virtual image on a realistic image or background using the display.

The camera 221" may be located adjacent to either or both of the left and right eyes to capture an image. Since the camera 221" is located adjacent to the eye, the camera 221" can acquire a scene that the user is currently viewing.

In the drawings, the camera 221" is provided at the control module 280". However, the camera 221" may be positioned at most any location of the mobile terminal. In some embodiments, multiple cameras 221" may be utilized. Such multiple cameras 221" may be used to acquire a stereoscopic image.

The glass-type mobile terminal 200" may include user input units 223a" and 223b", which can each be manipulated by the user to provide an input. The user input units 223a" and 223b" may employ techniques which permit input via a tactile input. Typical tactile inputs include a touch, push, or the like. The user input units 223a" and 223b" are shown operable in a pushing manner and a touching manner as they are located on the frame part and the control module 280", respectively.

If desired, the mobile terminal 200" may include a microphone which processes input sound into electric audio data, and an audio output module 252" for outputting audio. The audio output module 252" may be configured to produce audio in a general audio output manner or an osteoconductive manner. When the audio output module 252" is implemented in the osteoconductive manner, the audio output module 252" may be closely adhered to the head when the user wears the mobile terminal 200" and vibrate the user's skull to transfer sounds.

Hereinafter, a structure of the mobile terminal of FIG. 1 according to an embodiment of the present invention will be explained with reference to FIGS. 5A and 5B.

Figure 5A:
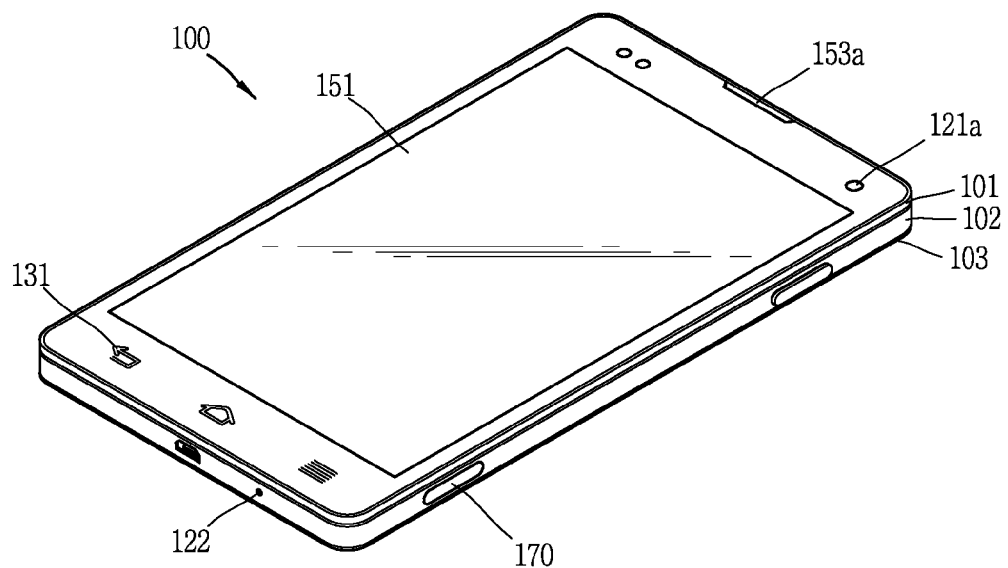
FIG. 5A is a front perspective view illustrating an example of a mobile terminal associated with the present disclosure.

FIG. 5A is a front perspective view of a mobile terminal 100 according to an embodiment of the present invention.

The mobile terminal 100 according to the present disclosure is a bar type mobile terminal. However, the present disclosure is not limited to this, but may be applied to a watch type, a clip type, a glasses-type, or a slide type in which two or more bodies are coupled to each other so as to perform a relative motion, a folder type, a swing type, a swivel type and the like.

A body of the mobile terminal 100 includes a case (casing, housing, cover, etc.) forming an outer appearance. The case may include a front case 101 and a rear case 102. A space formed by the front case 101 and the rear case 102 may accommodate various components therein. At least one intermediate case may further be disposed between the front case 101 and the rear case 102. A battery cover 103 for covering a battery 191 may be detachably mounted to the rear case 102.

Such cases may be formed by injection-molded synthetic resin, or may be formed using a metallic material such as stainless steel (STS) or titanium (Ti).

A display 151, a first audio output module 153a, a first camera 121a, a first manipulation unit 131, etc. may be disposed on a front surface of the body. A microphone 122, an interface unit 170, a second manipulation unit 132, etc. may be provided on a side surface of the body.

The display unit 151 may output information processed in the mobile terminal 100. The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display and an e-ink display.

The display unit 151 may include a touch sensing means for inputting information in a touch manner. Once part on the display unit 151 is touched, the content corresponding to the touched position is input. The content input in a touch manner, may be characters, or numbers, or menu items which can be set in each mode.

The touch sensing means may be transmissive so that visual information output from the display unit 151 can be viewed, and may include a structure for enhancing visibility of the touch screen at a bright place. Referring to FIG. 5A, the display unit 151 occupies most of the front surface of the front case 101.

The first audio output module 153a and a first camera 121 are arranged at a region adjacent to one end of the display unit 151, and the first manipulation unit 131 and the microphone 122 are arranged at a region adjacent to another end of the display unit 151. The second manipulation unit 132 (refer to FIG. 5B), the interface unit 170, etc. may be arranged on side surfaces of the body.

The first audio output module 153a may be implemented as a receiver for transmitting a call sound to a user's ear, or a loud speaker for outputting each type of alarm sound or a playback sound of multimedia.

A sound generated from the first audio output module 153 may be configured to be emitted through an assembly gap between structures. In this case, a hole independently formed to output audio sounds may not be seen or is otherwise hidden in terms of appearance, thereby further simplifying the appearance and manufacturing of the mobile terminal 100. The present invention is not limited to this. The hole for outputting audio sounds may be formed at a window.

The first camera 121a processes image frames such as still images or moving images, obtained by an image sensor in a video call mode or a capturing mode. The processed image frames may be displayed on the display unit 151.

The user input unit 130 is manipulated to receive a command for controlling the operation of the mobile terminal 100, and may include a first manipulation unit 131 and a second manipulation unit 132. The input keys may be referred to as manipulation portions, and may include any type of ones that can be manipulated in a user's tactile manner.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 5B:
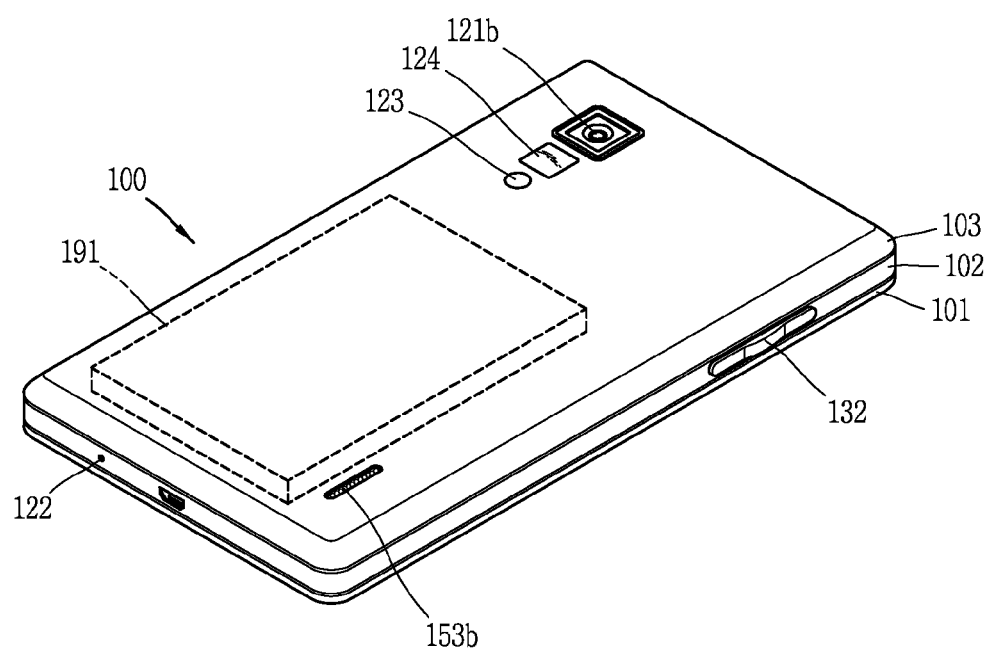
FIG. 5B is a rear perspective view illustrating an example of a mobile terminal associated with the present disclosure.

FIG. 5B is a rear perspective view illustrating the mobile terminal 100 illustrated in FIG. 5A.

Referring to FIG. 5B, a second camera 121b may be additionally mounted at a rear surface of the terminal body, namely, the rear case 102. The second camera 121b has an image capturing direction, which is substantially opposite to the direction of the first camera unit 121a (refer to FIG. 5A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popupable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a (refer to FIG. 5A) can implement a stereo function, and may be also used to implement a speaker phone mode during a phone call.

An antenna (not shown) for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

It should be understood by those skilled in the art that the technology of a mobile terminal or wearable device disclosed in the present disclosure can be implemented as a different specific form without departing from the scope and technical concept disclosed in the present disclosure.

Vehicle Control Apparatus

The vehicle control apparatus disclosed in the present specification is described below referring to FIGS. 6A to 8C.

Figure 6A:
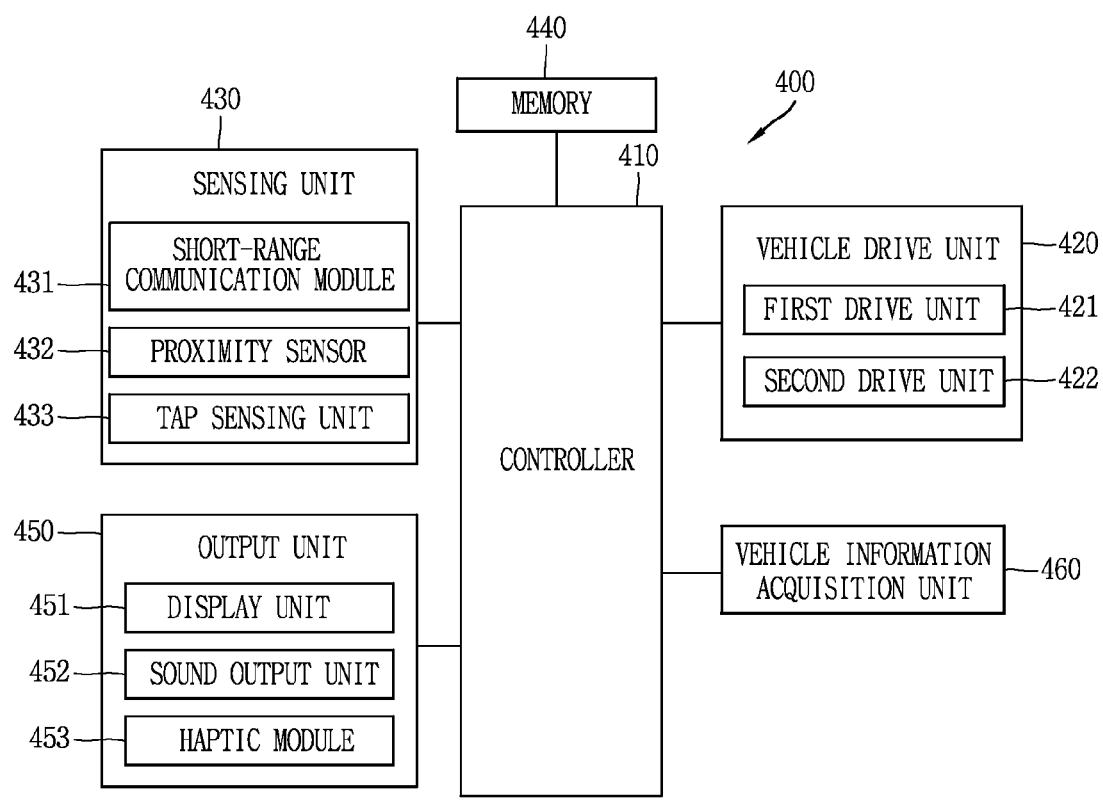
FIG. 6A is a block diagram for explaining a vehicle control apparatus associated with the present disclosure.

FIG. 6A is a block diagram for describing the vehicle control apparatus according to the present invention.

Figure 6B:
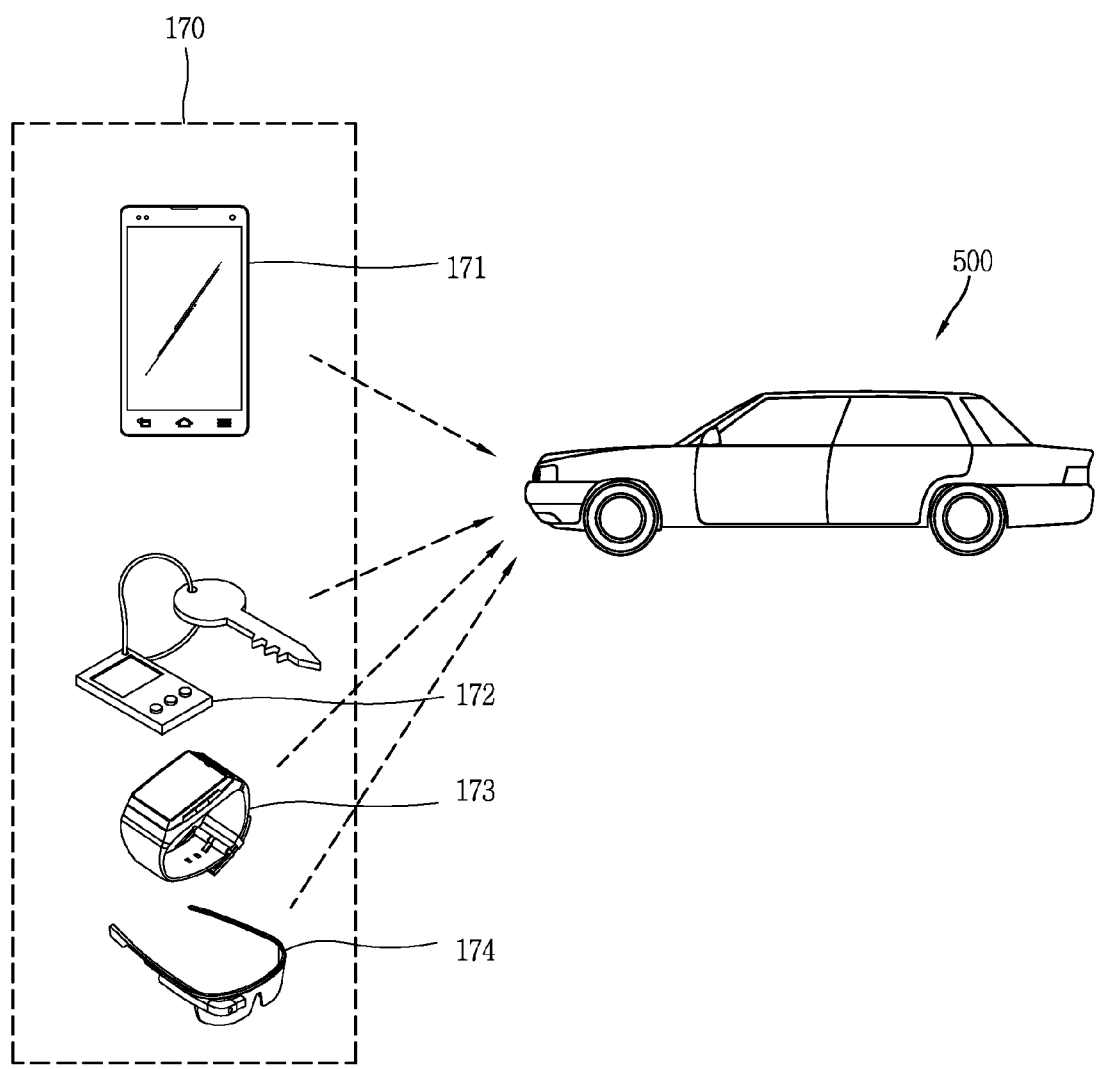
FIG. 6B is an exemplary view illustrating an example of external devices connected to a vehicle control apparatus associated with the present disclosure.

FIG. 6B is a diagram illustrating one example of an external device that is connected to the vehicle control apparatus according to the present invention.

Referring to FIGS. 6A and 6B, FIG. 6A is a block diagram for describing the vehicle control apparatus, disclosed in the present specification, according to one embodiment. FIG. 6B is a diagram illustrating an example of the external device that is capable of being connected to the vehicle control apparatus, disclosed in the present specification, according to one embodiment.

First, as illustrated in FIG. 6A, a vehicle control apparatus 400, disclosed in the present specification, according to one embodiment, is configured to include a controller 410, a sensing unit 430 connected to the controller 410, a vehicle drive unit 420, and a memory 440. The vehicle control apparatus 400 may further include an output unit 450. Then, the vehicle control apparatus 400 is formed in a body of a vehicle that is configured to include an external frame that makes up an external appearance of the vehicle, a window, and an internal frame which is formed in such a manner that the user rides in. At this point, the constituent elements illustrated in FIG. 6A are not essential in realizing the vehicle control apparatus 400 according to the present invention, and thus the vehicle control apparatus 400 described in the present specification may include one or more constituent elements in addition to the constituent elements described above and may omit one or more constituent elements.

The sensing unit 430 is typically implemented using one or more sensors configured to sense internal information of the vehicle control apparatus 400, the surrounding environment of the vehicle control apparatus 400, user information, and the like. For example, the sensing unit 430 is shown having a proximity sensor 432 and an illumination sensor. If desired, the sensing unit 430 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor, a microphone 122, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The vehicle control apparatus 400 may be configured to utilize information obtained from sensing unit 430, and in particular, information obtained from one or more sensors of the sensing unit 430, and combinations thereof.

The sensing unit 430 may further include a short-range communication module 431. The short-range communication module 431 for short-range communication may support short-range communication using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, Wireless Universal Serial Bus (Wireless USB). The short-range communication module 431 may support wireless communication between the vehicle control apparatus 400 and an external device 170 (refer to FIG. 6B) through wireless area networks.

The external device may be the mobile terminal 100 described above. Particularly, the external device may be in the form of the wearable device 200 or 200', which is one type of the mobile terminal described above.

The vehicle drive unit 420 cancels a locked state of the vehicle or switches the vehicle to the locked state. At this point, the locked state of the vehicle is a state where one or more of or all of the functions of the vehicle are limited, the vehicle does not start, or a door of the vehicle does not open. As opposed to the locked state, the canceling of the locked state makes the vehicle return to a state where, at least one among a driver seat, a front passenger seat, rear passenger seats, and a trunk can open, all the functions of the vehicle can be performed, that is, the vehicle can start, or various functions, such as a navigation function and a ventilation function, can be performed.

In addition, the vehicle drive unit 420 changes various settings and enables a function to be automatically performed. For example, the vehicle drive unit 420 controls each constituent element of the vehicle under the control of the controller 410, for example, controls the extent to which a window of the front driver seat or the front passenger seat is opened or controls an angle of a rear view mirror. The vehicle drive unit 420 adjusts a height or a horizontal position (for example, a distance between the seats) of at least one among the front driver seat or the front passenger seat and the rear seats. The vehicle drive unit 420 may set a steering wheel in the driver seat, for example, may set a height of the steering wheel and a sensitivity of the steering wheel and the like under the control of the controller 410. In addition, under the control of the controller 410, the vehicle drive unit 420 may enable a gear to operate in an automatic transmission or in a manual transmission, and in a case of a hybrid vehicle, may enable any one, among a mode of operation of a combustion engine and a mode of operation of an electric motor mode, to be preferentially selected.

In addition, under the control of the controller 410, the vehicle drive unit 420 may change not only a hardware setting state of the vehicle, but also a software setting state of the vehicle. For example, under the control of the controller 410, the vehicle drive unit 420 may enable a predetermined music play list to be displayed or may enable one music item on the predetermined music play list to be automatically reproduced. In addition, the vehicle drive unit 420 may automatically set a predetermined specific destination point and may enable a path to the specific destination point to be automatically displayed though a navigation apparatus. In addition, under the control of the controller 410, the vehicle drive unit 420 may enable a distance from a preceding or following vehicle or a speed of the vehicle to be automatically set at the time of cruise driving of the vehicle.

To do this, the vehicle drive unit 420 is configured to include different sub-drive units, and the sub-drive units change hardware or software setting states of the vehicle, respectively. The sub-drive unit that changes the hardware setting state of the vehicle is referred to as a first drive unit 421, and the sub-drive unit that changes the software setting state of the vehicle is referred to as a second drive unit 422.

At this point, in order to change the hardware setting of the vehicle, the first drive unit 421 is configured to include different constituent elements that change the external frame or the internal frame of the vehicle. For example, the first drive unit 421 may further include a hardware drive unit for adjusting a height of the seat or an angle of the back of the seat, and may further include a unit for adjusting the height of the steering wheel, which is configured to include an elastic member or a pressure member, such as a coil or a spring for elevating or lowering the height of the steering wheel.

On the other hand, the second drive unit 422 is realized as at least one or more application programs or applications. For example, the second drive unit 122 is realized as being in the form that includes any one among application programs for driving the navigation apparatus or an application program for reproducing already-stored medium data (for example, MP3) and the like. These application programs or applications may be those for one among types of drive control of the vehicle.

The output unit 450 is for generating an output associated with a sense of sight, an auditory sense, or a tactual sense, and is configured to include at least one among a display unit 451, a sound output unit 452, a haptic module 453, and an optical output unit 454. The touch sensor is configured to be layered into, or is integrally formed into the display unit 451 on which various pieces of image information is displayed, or is integrally formed into the display unit 451, thereby realizing a touch screen. The touch screen functions as a user input unit 423 that provides an input interface between the vehicle control apparatus 400 and the user, and at the same time, provides an output interface between the vehicle control apparatus 400 and the user.

The touch screen is realized as on various portions of the vehicle. For example, the touch screen is realized on entire windshield glass in the vehicle or one portion of the windshield glass, and may be realized anywhere on the external surface (surface exposed to outside of the vehicle) or an internal surface (a surface that faces the inside of the vehicle). In addition, the touch screen may be realized on an external or internal surface of a side window in the driver seat, a side window in the front passenger seat, or a window in the rear seat of the vehicle. The touch screen may be realized on a rear view mirror or a sunroof of the vehicle.

In addition, the touch screen may be realized not only on glass such as the window or sunroof of the vehicle, but also on the external or internal frame of the vehicle. For example, the touch screen may be realized on a surface of the external frame of the vehicle, that is, the external frame between the windshield and the window, or between the windows, such as a A-pillar, a B-pillar, or a C-pillar. In addition, the touch screen may be realized on at least one portion (for example, one portion in the vicinity of a door knob of a vehicle door) of the external surface of the vehicle door. The touch screen may be formed also on a surface of a cover of a gear box within the vehicle or on one portion of a cover of a console box. In addition, of course, two or more of the touch screens may be formed on at least one or more different portions of the vehicle.

Data available to various functions of the vehicle control apparatus 400 is stored in the memory 440. Multiple application programs or applications that run on the vehicle control apparatus 400, data and commands for the vehicle control apparatus 400 are stored in the memory 440. At least one or more of these application programs are downloaded from an external server over a wireless communication network. In addition, for basic functions (for example, a vehicle starting function, a navigation function, and vehicle locking and unlocking functions), at least one or more of these application programs are pre-installed on the vehicle control apparatus 400 before shipping. On the other hand, the application program is stored in the memory 440 and is installed on the vehicle control apparatus 400. The controller 400 runs the application program in order that the application program performs operation (or a function) of the vehicle control apparatus.

According to one embodiment, the application program may be a navigation program that performs a navigation function.

Pieces of information relating to at least one or more users are stored in the memory 440. At this point, the information relating to the user is authentication information on the user and information relating to various setting conditions of the vehicle that are set by the user himself/herself or are set properly based on the bio-information on the user. The information relating to the user is, for example, setting information relating to indoor temperature or humidity in the vehicle, which is set by the user himself/herself, setting information that depends on a driving habit of the user, or the like. In addition, the information relating to the user may be a record of driving paths along which the user drove. In addition, the authentication information may be information on a password or a pattern that is predetermined by the user, or may be information that is based on the bio-information on the user, such as recognition information on user's fingerprints or irises. In addition, the authentication information may be information relating to a user's gesture.

According to one embodiment, the bio-information on the user is obtained by the mobile terminal 100 (or the wearable device 200 or 200').

In this case, the wearable device may further include a communication unit that performs communication with the vehicle control apparatus which is installed in the vehicle and a bio-information obtainment unit that obtains the bio-information on the user from the specific body portion (for example, a wrist portion).

At this point, the communication unit transmits the obtained bio-information on the user to the vehicle control apparatus 400, and the bio-information on the user is stored in the memory 440.

The bio-information is at least one piece of information, among pieces of information on a user's heart rate, user's body fat, user's blood pressure, user's blood sugar, user's lineaments, user's fingerprints, a user's brain wave, and user's irises.

In addition, a program for operation of the controller 410 is stored in the memory 440, pieces of data, (for example, user authentication information, or driving environment setting information) that are input or output may be temporarily stored in the memory 440. Pieces of data on various patterns of vibration and sound that are output when an touch input is applied to the touch screen are stored in the memory 440.

The memories 440 include storage media, such as a flash memory, a hard disk, a solid state disk (SDD), a silicon disk drive (SDD), a multimedia card micro type, a card memory (for example, an SD, a XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The vehicle control apparatus 400 may operate in association with a web storage apparatus that, like the memory 140, performs a storage function over the Internet.

On the other hand, the controller 410 normally controls entire operation of the vehicle control apparatus 400 in addition to the operation associated with the application programs described above. The controller 410 processes the signal, the data, the information, and the like that are input or output through the constituent elements described above, or controls driving of the vehicle by running the application program that is stored in the memory 440. In addition, the controller 410 controls at least one or more, among the constituent elements that are described referring FIG. 1A, in order to run the application program stored in the memory 440. Furthermore, the controller 410 controls the constituent elements that are included in the vehicle control apparatus 400, in combination of at least two or more of them. in order to run the application program.

On the other hand, the user inputs the authentication information into the controller 410, and the controller 410 determines whether or not the user is an authenticated user, based on the authentication information. The authentication information is recognition information on the user's finger or on a predetermined pattern. In addition, the authentication information is recognition information on user's irises, or information relating to a user's specific gesture. For example, pattern recognition information or finger recognition information is input, as the authentication information, into the controller 410. The pattern recognition information is on multiple-times tapping (for example, multiple taps or multiple knocks) that are applied by the user to one portion of the external or internal surface of the vehicle. The finger recognition information is input through one portion of the external or internal surface of the vehicle, or through a touch screen region that is formed on the window and the window shield glass and the like in the driver seat or the passenger seat. In addition, the controller 410 may recognize the user's gesture that is made inside of or outside of the vehicle, or may recognize the iris information on the user, using the photo sensor or the camera that is provided in the sensing unit 430.

Then, the controller 410 cancels the locked state of the vehicle only when the user is an authenticated user. Then, the vehicle control apparatus 400 enables the user to open the door of the vehicle, the trunk, and the like without having to use the key to them. In addition, the controller 410 may make the vehicle start using predetermined authentication information on the user. In addition, the controller 410 may switch the state of the vehicle to the locked state. That is, based on the selection by the authenticated user, the controller 410 may maintain the locked state of the vehicle until the authentication information on the authenticated user is input again. On the other hand, when the authentication information on the user is input from outside of the vehicle in the state where the vehicle is unlocked, based on this, the controller 410 switches the state of the vehicle to the locked state. Then, when the same authentication information is input again in a state where the vehicle is switched to the locked state, the vehicle may be switched back to the unlocked state.

The touch screen is formed on one portion of the vehicle in order that the authentication information on the user is input into the controller 410. Information on user's fingers or information on the user-set pattern is input into the controller 410 through the formed touch screen. Alternatively, a predetermined password may be input into the controller 410. To do this, the controller 410 performs pattern recognition processing that recognizes writing input or picture-drawing input that is applied to the touch screen, as text or an image, respectively. Furthermore, the controller 410 controls one among the constituent elements described above, or a combination of two or more of them in order to realize the vehicle control apparatus 400 according to various embodiments of the present invention, which are described below.

In addition, the controller 410 may display various pieces of image information on the touch screen that is formed on one portion of the vehicle. For example, the controller 410 may display a finger input region for authenticating the user or graphic objects for applying a pattern input on the touch screen, and may display a result of the user authentication, information relating to the currently-authenticated user, or the like.

Then, when the user is an authenticated user, the controller 410 changes the setting state of the vehicle using the user-related information that corresponds to the corresponding user. For example, by controlling the first drive unit 421, the controller 410 adjusts the height of the driver seat or the like, the angle of the back of the seat, or the like and may adjust the indoor temperature or humidity in the vehicle, based on the authenticated information on the user. In addition, based on information that corresponds to the authenticated user, the controller 410 adjusts the extent to which the window of the driver seat and the front passenger seat are opened or controls the angle of the rear view mirror and the like. The controller 410 may adjust the height of the steering wheel and the like.

The controller 410 may change a vehicle operation mode as well according to the authenticated user. For example, the controller 410 may switch a power steering wheel operation mode to a specific mode (for example, a normal mode or a sports mode) according to a preference of the authenticated user. In addition, the controller 110 may switch a gear transmission mode to a manual transmission mode or an automatic transmission mode according to a preference of the authenticated user.

In addition, the controller 410 may change not only such hardware settings, but also software settings. For example, if the authenticated user rides in the vehicle, the controller 410 automatically selects his/her favorite music item or a list containing a music item that he/she previously listens to. In addition, the controller 410 may automatically select a channel of a radio broadcasting system that the authenticated user frequently tunes in and listens to.

In addition, the controller 410 may change various settings of the vehicle, based on the time at which the authenticated user rides in the vehicle. For example, based on the time at which the user is authenticated and on the record of the authenticated driver's driving, the controller 410 searches for a destination point where the authenticated user frequently goes at the corresponding time. That is, if the user has a habit of regularly going "home" after work at between 8:00 pm and 9:00 pm, when the user rides in the vehicle at between 8:00 pm to 9:00 pm, the controller 410 may automatically set the destination point to "home" and display the corresponding path on a display unit of the navigation apparatus, based on the record of the driving.

In this manner, the controller 410 of the vehicle control apparatus 400 according to the embodiment of the present invention enables the user to control the vehicle using the authentication information. As a result, the user can ride in the vehicle and control the vehicle in an easier and more convenient manner. When the user is authenticated, the controller 410 of the vehicle control apparatus 400 according to the embodiment of the present invention adjusts various driving environment settings of the vehicle as well, based on the fact that the user is authenticated, thereby automatically providing his/her favorite driving environment.

In addition, whether or not the user rides in the vehicle, the controller 410 may change the hardware or software settings of the vehicle in a convenient manner, based on the user's selection. For example, the controller 410 may change at least one hardware or software setting, based on the multiple-times tapping on the inside of the vehicle, for example, the console box, the gear box, or the windows in the driver seat or the front passenger seat. As one example, if the user applies the tapping multiple times to the steering wheel of the vehicle, the controller 410 recognizes this and thus may adjust the height of the steering wheel or may change the power steering wheel operation mode from one mode to another.

On the other hand, the controller 410 changes the hardware or software setting state, based not only on the multiple taps, but also on the user's gesture. For example, the controller 410 makes it possible for a camera, a photo sensor, a laser sensor, or an infrared sensor to sense movements of the driver or the passenger who rides in the vehicle. Then, based on the movements of the driver and the passenger, the controller 410 may perform a specific function and adjust a currently-set state. As one example, if the passenger sitting on the front passenger seat make a hand-lowering gesture toward the window in the front passenger seat, the extent to which the window in the front passenger seat is opened is adjusted based on the passenger's gesture. In addition, if a specific gesture (for example, a fingers-flicking gesture or a hands-clapping gesture) is sensed, the controller 410 may reproduce predetermined specific music data, based on the driver's or passenger's gesture.

On the other hand, at least one or more among the constituent elements described above, operate in cooperation with one another to realize operation or control of the vehicle control apparatus 400, or a method of controlling the vehicle control apparatus 400, which are described above, according to various embodiments. In addition, the operation or the control of the vehicle control apparatus 400, or the method of controlling the vehicle control apparatus 400 is realized on the vehicle control apparatus 400 by running at least one application program that is stored in the memory 440.

The constituent elements enumerated above are described in more detail below referring to FIG. 6A, before describing the vehicle control apparatus 400 according to the various embodiments.

The sensing unit 430 senses at least one among information on the inside of the vehicle control apparatus, information on an surrounding environment of the vehicle control apparatus, and information on the user, and generates a sensing signal corresponding to the sensed information. Based on the sensing signal, the controller 410 controls driving of or operation of the vehicle control apparatus 400, or performs data processing, a function, or an operation associated with the application program that is stored on the vehicle control apparatus 400. Typical sensors among various sensors that can be included in the sensing unit 430 are described in more detail.

The proximity sensor 432 may include a sensor to sense presence or absence of an object approaching a surface, or an object located near a surface, by using an electromagnetic field, infrared rays, or the like without a mechanical contact. The proximity sensor 432 may be arranged at an inner region of the mobile terminal covered by the touch screen, or near the touch screen.

The proximity sensor 432, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 432 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 432 senses a proximity touch and a proximity touch pattern (for example, a proximity touch distance, a proximity touch direction, a proximity touch speed, proximity touch time, a proximity touch position, a proximity touch movement state, and the like). On the other hand, the controller 410 processes data (or information) that corresponds to the proximity touch operation and the proximity touch pattern that are sensed through the proximity sensor 432, and further outputs visual information that corresponds to the processed data, on the touch screen. Furthermore, the controller 410 may control the vehicle control apparatus 400 in such a manner that different operations are performed or different pieces of data (or different pieces of information) are processed depending on whether the touch applied to the same point on the touch screen is a proximity touch or a contact touch.

A touch sensor can sense a touch applied to the touch screen, such as the display unit 451, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 451, or convert capacitance occurring at a specific part of the display unit 451, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 410. Accordingly, the controller 410 may sense which region of the display unit 451 has been touched. Here, the touch controller may be a component separate from the controller 410, the controller 410, and combinations thereof.

In some embodiments, the controller 410 may execute the same or different controls according to a type of touch object that touches the touch screen or a touch key provided in addition to the touch screen. Whether to execute the same or different control according to the object which provides a touch input may be decided based on a current operating state of the vehicle control apparatus 400 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 410, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The sensing unit 430 typically includes at least one a camera sensor (CCD, CMOS etc.), a photo sensor (or image sensors), and a laser sensor.

Implementing a camera 421 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

As described above, various pieces of image information relating to inputting of the authentication information on the user are displayed on the display unit 451. For example, a graphic object that indicates a region for inputting a user's fingerprint or a graphic object for inputting the pattern information are displayed on the display unit 451 that is formed, as the touch screen, on one portion of the vehicle. In addition, if user authentication is ended, a result of the user authentication and information relating to the currently-authenticated user may be displayed on the display unit 451. These pieces of image information are displayed on at least one portion of the windshield glass of the vehicle, the window in the front passenger seat, or the like. To do this, at least one portion of the window of the vehicle or at least one portion of the windshield glass of the vehicle that is equipped with the vehicle control apparatus 400 according to the embodiment of the present invention is designed in such a manner that the touch input by the user is sensed.

In addition, the display unit 451 is formed on not only the external surface of the windshield glasses and of the window, but also on the internal surface. Then, information that is processed in the vehicle control apparatus 400 may be displayed (or output) on the display unit 451 that is formed on the internal surface.

For example, screen information that is displayed on the display unit 451 that is formed on the internal surface is execution screen information on an application program that is run on the vehicle control apparatus 400, or information on a user interface (UI) and a graphic user interface (GUI) that depend on the execution screen information.

In addition, the display unit 451 may be realized as included in the sensing unit 130. In this case, a result of the sensing by the sensing unit 430, and a result of matching the user authentication information or at least one portion (for example, a name of the user and like) of the authentication information inherent to the user may be displayed on the display unit 451.

Audio data that is stored in the memory 440 is output through the sound output unit 452. A sound signal associated with a function (for example, a user authentication confirmation sound and a user authentication guidance sound) that is performed in the vehicle control apparatus 400 may be output through the sound output unit 452. The sound output unit 452 is configured to include a speaker, a buzzer, and the like.

On the other hand, the output unit 450 of the vehicle control apparatus 400, disclosed in the present specification, according to the embodiment, is configured to include the haptic module 453. The haptic module 453 generates various haptic effects that the user can feel. A typical example of the haptic effect that is generated by the haptic module 453 is vibration. If it is sensed that the touch input by the user is applied to the touch screen realized on the external frame of the internal frame of the vehicle, the widow in the form of glass, or the like, the controller 410 outputs haptic information using the haptic module 453. Accordingly, using the haptic information, the user can confirm whether he/she properly input the authentication information.

The strength, pattern and the like of the vibration generated by the haptic module 453 can be controlled by user selection or setting by the controller. For example, the haptic module 453 may output different vibrations in a combining manner or a sequential manner.

Besides vibration, the haptic module 453 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 453 can also be implemented to allow the user to feel a tactile effect through a muscle sensation such as the user's fingers or arm, as well as transferring the tactile effect through direct contact. Two or more haptic modules 453 may be provided according to the particular configuration of the vehicle control apparatus 400.

Various embodiments to be explained later may be implemented in a computer or a computer-readable recording medium, by software, hardware, or a combination thereof.

On the other hand, the sensing unit 430 of the vehicle control apparatus 400, disclosed in the present specification, according to the embodiment may further include a main body that is configured to be mounted on the body and to come into contact with one portion of a user's body, and a tap sensing unit 433 for sensing a tap on the main body or a tap gesture. At this point, the tap that is sensed in the tap sensing unit 433 of the vehicle control apparatus 400 is a means for inputting the authentication information on the user. In addition, if the user rides in the vehicle, the tap is used as a means for controlling various functions of the vehicle control apparatus 400. Then, the tap is construed to mean a motion of lightly hitting the main body of the vehicle control apparatus 400 or an object, with a tapping tool such as a finger, or a motion of lightly bringing the tapping tool into contact with the main body of the vehicle control apparatus 400 or the object. At this point, the main body of the sensing unit 430 is formed on the body of the vehicle that is configured to include the external frame and the internal frame of the vehicle and the window or the windshield glass.

On the other hand, the tapping tool with which the tap is applied is a thing that applies an external force to the main body of the vehicle control apparatus 400 or the object, such as a finger, a stylus pen, a pen, a pointer, and a fist. On the other hand, the tipping tool is not necessarily limited to the thing that can be applied to the vehicle control apparatus 400 according to the present invention, and any type of thing may be possible as long as it can apply the external force to the main body of the vehicle control apparatus 400 or the object.

On the other hand, the objects to which the tap gesture is applied is at least one among the main body of the vehicle control apparatus 400 and the object that is placed on and on the vehicle control apparatus 400.

On the other hand, the tap or the tap gesture is sensed by at least one among an acceleration sensor and a touch sensor that are included in the tap sensing unit 433. At this point, the acceleration sensor is a sensor that is capable of measuring dynamic forces, such as acceleration, vibration, and impact, which are applied to the main body of the vehicle control apparatus 400.

That is, the acceleration sensor senses vibration (or a movement) of the main body of the vehicle control apparatus 400, which occurs due to the tap gesture, and thus senses whether the tap is applied to the object. Therefore, the acceleration sensor senses the tap on the main body of the vehicle control apparatus 400 or senses that an object that is positioned close to the main body of the vehicle control apparatus 400 to such an extent that it can be sensed whether the movement or the vibration occurs in the main body of the vehicle control apparatus 400 is tapped on.

In this manner, as long as the sensing of the movement or the vibration of the main body of the vehicle control apparatus 400 is possible, the acceleration sensor senses not only the application of the tap to the main body of the vehicle control apparatus 400, but also senses the application of the tap to points other than the main body.

In the vehicle control apparatus 400 according to the present invention, in order to sense the tap on the vehicle control apparatus, only one among the acceleration sensor and the touch sensor is used, the acceleration sensor and the touch sensor are sequentially used, or the acceleration sensor and the touch sensor are used at the same time. On the other hand, a mode in which only the acceleration sensor is used to sense the tap is referred to as a first mode, a mode in which the touch sensor is used to sense the tap is referred to as a second mode, and a mode in which the acceleration sensor and the touch sensor are all utilized (at the same time or sequentially) to sense the tap is referred to as a third mode or a hybrid mode.

On the other hand, if the tap is sensed through the touch sensor, it is possible to more accurately recognize a position at which the tap is sensed.

On the other hand, in the vehicle control apparatus 400 according to one embodiment, in order to sense the tap through the acceleration sensor or the touch sensor, the display unit 451 of the vehicle control apparatus 400 also operates in an inactivated state in a specific mode in which a minimum amount of current or electric power is consumed. The specific mode is referred to as a doze mode.

For example, in the dose mode, a light-emitting element for outputting a screen is turned off and the touch sensor is turned on in the display unit 451 in a touch screen structure in which the touch sensor is layered into the display unit 451. In addition, the dose mode is a mode in which the display unit 451 is turned off and the acceleration sensor is turned on. In addition, the dose mode is a mode in which the display unit 451 is turned off and the touch sensor and the acceleration sensor are all turned on.

Therefore, in the dose mode, that is, in a state where the display unit 451 is turned off (in a state where the display unit 451 is inactivated), if the user applies the tap to at least one point on the touch screen that is formed on one portion of the vehicle, or to a specific point on the main body of the vehicle control apparatus 400, it is sensed that the tap is applied from the user, through at least one among the touch sensor or the acceleration sensor that is turned on.

In addition, in order to distinguish between a tap as a means for inputting the authentication information on the user or a tap as a means for controlling a function of the vehicle control apparatus 400, and a simple collision of an outside arbitrary object with the touch screen, only if the tap is applied two or more times within a reference time to the touch screen formed on one portion of the vehicle, it is determined that the "tap" is sensed for inputting the authentication information on the user and controlling the vehicle control apparatus 400. For example, if it is determined that as a result of the sensing by the tap sensing unit 433, the tap is applied one time to the touch screen formed on one portion of the vehicle, the controller 410 may recognize that only the outside arbitrary object or an human body collides with the touch screen, without recognizing that the one-time tap is for inputting the authentication information on the user.

Therefore, only if the tap sensing unit 433 senses that the tap is applied at least two or more times (or multiple times) consecutively within the reference time, it is determined that the "tap" as the means for inputting the authentication information on the user or as the mean of controlling the function of the vehicle control apparatus 400 is sensed.

That is, the tap gestures mean that the tap gesture is to be sensed at least two or more times consecutively within the reference time. Therefore, the sensing of the "tap" hereinafter means that it is sensed that a user's finger or an object such as a touch pen is lightly hit substantially multiple times on the main body of the main body of the vehicle control apparatus 400.

Furthermore, the controller 410 may make it possible not only to sense the tap within the reference time, but also to determine whether the taps applied using user's different fingers are sensed or the taps applied using one finger of the user's are sensed. For example, if it is sensed that the taps are applied to one predetermined portion of the vehicle, that is, one portion of the window of the vehicle or one portion of the window shield glass, an A-pillar, a B-pillar, a C-pillar, a sunroof, one portion of a vehicle door, or a console box or a gear box in the vehicle, the controller 410 makes it possible to sense whether the taps are applied using one finger or using different fingers, using fingerprints that are sensed from the portion to which the taps are applied. In addition, the controller 410 recognizes a position on the display unit 451, at which the taps are sensed, or acceleration that is generated due to the taps, through at least one, among the touch sensor and the acceleration sensor that are provided in the tap sensing unit 433. Thus, the controller 410 makes it possible to sense whether the taps are applied using one finger or using different fingers.

Furthermore, considering additionally an angle at which the tap is applied and a distance between points to which the tap is applied or a direction in which the fingerprint is recognized, the controller 410 determines whether the taps are applied using one finger or using both hands or at least two fingers.

On the other hand, the taps mean multiple-times tapping that are sensed consecutively within the reference time. At this point, the reference time is a very short time, for example, a time in a range of 300 ms to 2 s.

To do this, when the tap sensing unit 433 senses that the main body of the vehicle control apparatus 400 is tapped on, the tap sensing unit 433 senses whether the next tapping is applied consecutively within the reference time after the first tapping is sensed. Then, if the next tapping is sensed within the reference time, the tap sensing unit 433 or the controller 410 determines that the tap is sensed for inputting the authentication information on the user or for controlling a specific function of the vehicle control apparatus 400 according to the embodiment of the present invention. In this manner, only if a second tap is sensed within a predetermined time after a first tap is sensed, the controller 410 recognizes the first and second taps as "effective taps." Thus, the controller distinguishes between the tap that is applied to input the authentication information on the user or to control the vehicle control apparatus 400 and the collision of an object with the inside or outside of the vehicle, which occurs unintentionally or due to a user mistake.

There are various method of recognizing the "effective tap." For example, when it is sensed that the second tap is applied a second reference number of times or greater to the main body within a predetermined time after sensing the first tap that is applied a first reference number of times or greater, the controller 410 may recognizes the first and second taps as the "effective taps." At this point, the first reference number of times and the second reference number of times may be the same or be different. For example, the first reference number of times may be 1, and the second reference number of times may be 2. As another example, the first reference number of times and the second reference number of times may be all 1.

In addition, only if the tap is applied to within a "predetermined region," it is determined that the "taps" are sensed. That is, when it is determined that the main body of the vehicle control apparatus 400 is first tapped on, the controller 410 calculates a predetermined region from a point at which the tapping is first sensed. Then, if the tapping is consecutively sensed the first or second reference number of times or greater at the "predetermined region" within the reference time after the first tapping is sensed, the controller 410 determines that the first tap or the second tap is applied.

On the other hand, of course, the reference time and the predetermined region that are described above can be variably modified according to the embodiment.

On the other hand, of course, the first tap and the second tap may be sensed as a separate tap according to not only the reference time and the predetermined region, but also a position at which each tap is sensed. That is, if the second tap is sensed in a position that is a predetermined distance or above away from the position in which the first tap is sensed. the controller 410 determines that the first tap and the second tap are applied. Then, if the first tap and the second tap are recognized based the position in which the tap is sensed, the first tap and the second tap may be sensed at the same time.

In addition, if the first tap and the second tap are configured from multiple touches, that is, from multiple-times tapping, of course, the multiple touches that make up each of the first tap and the second tap are sensed at the same time. For example, if the first touch that makes up the first tap is sensed and at the same time, the first touch that makes up the second tap is sensed in a position that is a predetermined distance or above from a position in which the first touch that makes up the first tap is sensed, the controller 110 makes it possible to enable the first touch that makes up each of the first tap and the second tap. Then, the controller 410 makes it possible to enable an additional touch input, which is sensed in each position. If the touch is sensed the first reference number of times or greater or the second reference number of times or greater, the controller 410 determines that the first tap and the second tap are applied.

On the other hand, when the tap sensing unit 433 senses multiple times that the tap is applied to the main body of the vehicle control apparatus 400, the controller 410 controls not only the user authentication, but also at least one among functions that is executable on the vehicle control apparatus 400. At this point, the functions that is executable on the vehicle control apparatus 400 means all types of functions that is executable or operable on the vehicle control apparatus 400. At this point, one among the executable functions is a function of an application that is installed on the vehicle control apparatus 400. Then, "an arbitrary function is executed" means "an arbitrary application program is executed or is run on the vehicle control apparatus 400." For example, based on the user's multiple taps that are sensed in the console box, the controller 410 reproduces a music file or controls the navigation apparatus in such a manner that a path to a predetermined destination point is automatically set.

As another example, a function that is executable in the vehicle control apparatus 400 is a function that is necessary for basic driving of the vehicle control apparatus 400. For example, the function necessary for the basic driving is a function of turning on/off an air conditioner or a warm-air circulator provided in the vehicle, a function of starting the vehicle, a function of switching between the locked state and the unlocked state, or the like. In addition, the function necessary for the basic driving is a function of turning a cruise control function of the vehicle on or off.

On the other hand, the controller 410 forms a position for inputting the authentication information on the user, based on a point on the main body or the touch screen at which the tapping by the user is sensed. For example, the controller 410 forms a region for inputting the pattern information, or forms a region for inputting the bio-information on the user, for example, the user's fingerprint, in such a manner that the point at which the tapping by the user is first applied serves the center of the region for inputting the pattern information or the bio-information. In this case, even though the user applies the tap to a different point on the main body or the touch screen each time he/she applies the tap, the point at which the information on the user-set pattern or the bio-information on the user varies each time the user applies the tap. Accordingly, the user can minimize exposure of the authentication information, and this is a safeguard against an illegal act, such as when the vehicle is stolen.

Of course, the user authentication information may be also input into the vehicle control apparatus 400 through an external device that is predetermined based on the user's selection. For example, the sensing unit 430 is connected to a predetermined external device outside of the vehicle using a short-range communication module 431. The authentication information on the user may be input into the sensing unit 430 through the short-range communication module 431 and may be authenticated by the controller 410.

The vehicle control apparatus 400 obtains vehicle information from the vehicle.

According to one embodiment, the vehicle information is obtained through the sensing unit 430 described above.

According to another embodiment, the vehicle control apparatus 400 separately is configured to include a vehicle information acquisition unit 460 that obtains the vehicle information.

At this point, the vehicle information is information relating to at least one, among an air conditioning function of the vehicle, a function of checking whether doors (including a hood, a trunk, a fuel intake) are opened or closed, a function of checking whether the windows are opened or closed, a function of checking whether the sunroof is opened or closed, a charged state of a battery of the vehicle, a place where the vehicle is parked, a function of the navigation apparatus provided in the vehicle, a function of checking whether the vehicle is stolen, an amount of fuel in the vehicle, and the like.

In addition, the vehicle information is configured to further include at least information relating to at least one, among current driving speed of the vehicle, current driving acceleration, mileage, the number of times that the vehicle gains sudden acceleration, the number of times that the vehicle stops suddenly.

To that end, the vehicle information acquisition unit 460 communicates with various sensors provided in the vehicle.

For example, the vehicle information acquisition unit 460 is installed in the vehicle, communicates with an acceleration sensor that measures acceleration of the vehicle, and gathers acceleration information on the vehicle.

In addition, for example, the vehicle information acquisition unit 460 performs communication with a black box provided in the vehicle, and obtains when a vehicle accident occurs. In this case, images associated with the vehicle accident are stored in the memory 440.

An image information obtainment unit 470 obtains image information on the user from an image obtainment apparatus 900.

Like a camera, the image obtainment apparatus 900 is a means for processing image frames for a static image and a moving image, which are captured by an image sensor, and obtains an image of the user.

The number of the image obtainment apparatuses 900 is 1 or greater. The image information obtainment unit 470 obtains the image information from various communication means.

FIG. 6B illustrates an example in which an external device that is predetermined in this manner is connected to the vehicle control apparatus according to the embodiment of the present invention.

Referring to FIG. 6B, the predetermined external device 170 is a mobile terminal, such a phone 171 or a smart key 172 that is carried by the user. In this case, the controller 410 recognizes a serial number of the external device 170. If the external device 170 is positioned within a given distance from the controller 410, the controller 110 automatically recognizes a specific user. Then, the controller 410 receives the authentication information that is input through the external device 170. The authentication information that is input from the external device 170 is transferred to the vehicle control apparatus 400 through a communication module provided in the external device 170 and through the short-range communication module 431 of the sensing unit 430.

On the other hand, the authentication information is the bio-information on the user.

According to one embodiment, the bio-information is obtained by the mobile terminal 100 (or the wearable device 200 or 200').

At this point, the bio-information is at least one piece of information, among pieces of information on a user's heart rate, user's body fat, user's blood pressure, user's blood sugar, user's lineaments, user's fingerprints, a user's brain wave, and user's irises.

For example, the authentication information is information on the user's heart rate or fingerprints, recognition information on the user's irises, information on the predetermined password of the user, or information on the pattern that is set by the user. In addition, the authentication information may be information relating to a user's specific gesture.

The authentication of the user is done based on multiple pieces of bio-information or multiple pieces of authentication information.

For example, the user's heart rate and the user's gesture are checked, and then the authentication of the user is done.

To do this, the external device 170 may additionally have a configuration for the user inputting the authentication information, that is, a configuration for executing the same functions as those of at least one or more among the sensors provided in the sensing unit 430 of the vehicle control apparatus 400 according to one embodiment or the same functions as those of additional sensors.

For example, the external device 170, such as the smart key 172 or the smart phone 171, may further include a sensing unit that is the same as, is similar to, corresponds to the touch screen into which the user can input the pattern information, or the tap sensing unit 433 which is provided in the sensing unit 430 of the vehicle control apparatus 400. In addition, the external device 170 may further include a fingerprint recognition unit for recognizing the user's fingerprints. Of course, the external device 170 may further include an inertial sensor, a gyro sensor, an acceleration sensor, or the like.

In addition, for example, a smart watch 173, which is a watch-type mobile terminal, is configured to include a sensor that obtains the user' heartbeat. In addition, smart glasses 174, which is a glasses-type mobile terminal, is configured to include an iris recognition camera for recognizing the user's irises.

In this case, the user can input the authentication information on him/her using at least one piece of information among the information on the fingerprints, the predetermined pattern information, and the iris recognition information. In addition, the user may input the authentication information on him/her into the external device 170 by making a specific gesture while wearing the external device 170. In this case, according to the user's gesture, the controller 110 of the external device 170 recognizes the user's gesture using information on a change in a position of the external device 170, that is, an acceleration measurement value, an amount of change in gravity, or a value that is obtained by measuring an amount of change in inertia. Thus, the controller 110 makes use of such information as the authentication information. In addition, the external device 170 may recognize that the position is changed, using an image of the user that is input through the camera and the like, and may measure a value that is changed.

On the other hand, if the authentication information is input in this manner, the controller 410 of the vehicle control apparatus 400 controls the driving of the vehicle using the authentication information that is input. For example, the controller 410 may recognize the current user according to the authentication information, and may cancel the locked state of the vehicle and set an internal environment of the vehicle that corresponds to the recognized user. In addition, if the locked state of the vehicle is canceled and the authentication information is input back in a state where the vehicle stops, the controller 410 may return the unlocked state of the vehicle to the locked state.

On the other hands, the vehicle may be controlled immediately using the authentication information on the user, which is input through the external device 170, but the controller 410 may request the user to go through an authentication process one more time. In this case, if the external device 170 is positioned within a given distance from the controller 410 or the authentication information is input through the external device 170, the controller 410 switches the state of the vehicle to a wake up state and prepares for starting the vehicle according to the authentication information that is input from the authenticated user. If in a state where the vehicle switches to the wake up state, the user inputs the authentication information one more time into a predetermined region (for example, the window in the driver seat or in the front passenger seat, the A- or B-, or C-pillar, or the like), the controller 410 authenticates the user according to the input and thus starts the vehicle.

In addition, the example is described above in which an authentication procedure is one more time is performed, but of course, more authentication procedures may be performed without limitation. In addition, the example is described above in which if the authentication information on the user is input through external device 170, the multiple authentication procedures are performed, but of course, the multiple authentication procedure may be applied also to a case where the user inputs the authentication information on him/her directly into the touch screen region that is formed on one portion of the vehicle.

Figure 7:
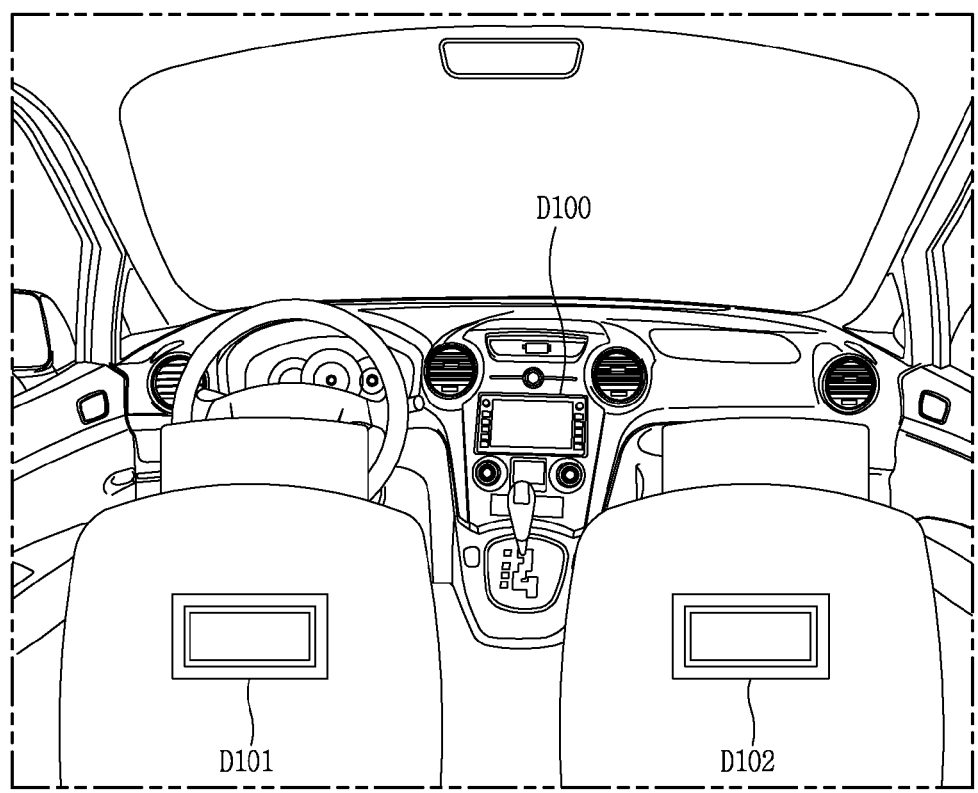
FIG. 7 is an exemplary view for explaining a display unit in a vehicle control apparatus according to an embodiment disclosed in the present disclosure.

FIG. 7 is a diagram for describing the display unit of the vehicle control apparatus, disclosed in the present specification, according to one embodiment.

FIG. 7 illustrates a case where the vehicle control apparatus 400 is realized as in the form of a head unit of the vehicle.

The vehicle control apparatus 400 is configured to include multiple display units D100 to D102.

For example, as illustrated in FIG. 7, the vehicle control apparatus 400 is configured to include one first display unit D100 in front of the driver seat, and two second display units D101 and D102 in front of the rear seats.

At this time, generally, only the first display unit D100 is subject to regulations for safe driving.

Therefore, only the first display unit D100 is subject to vehicle content display regulations, and all content is displayed on the second display units D101 and D102 with any limitation.

Figure 8A:
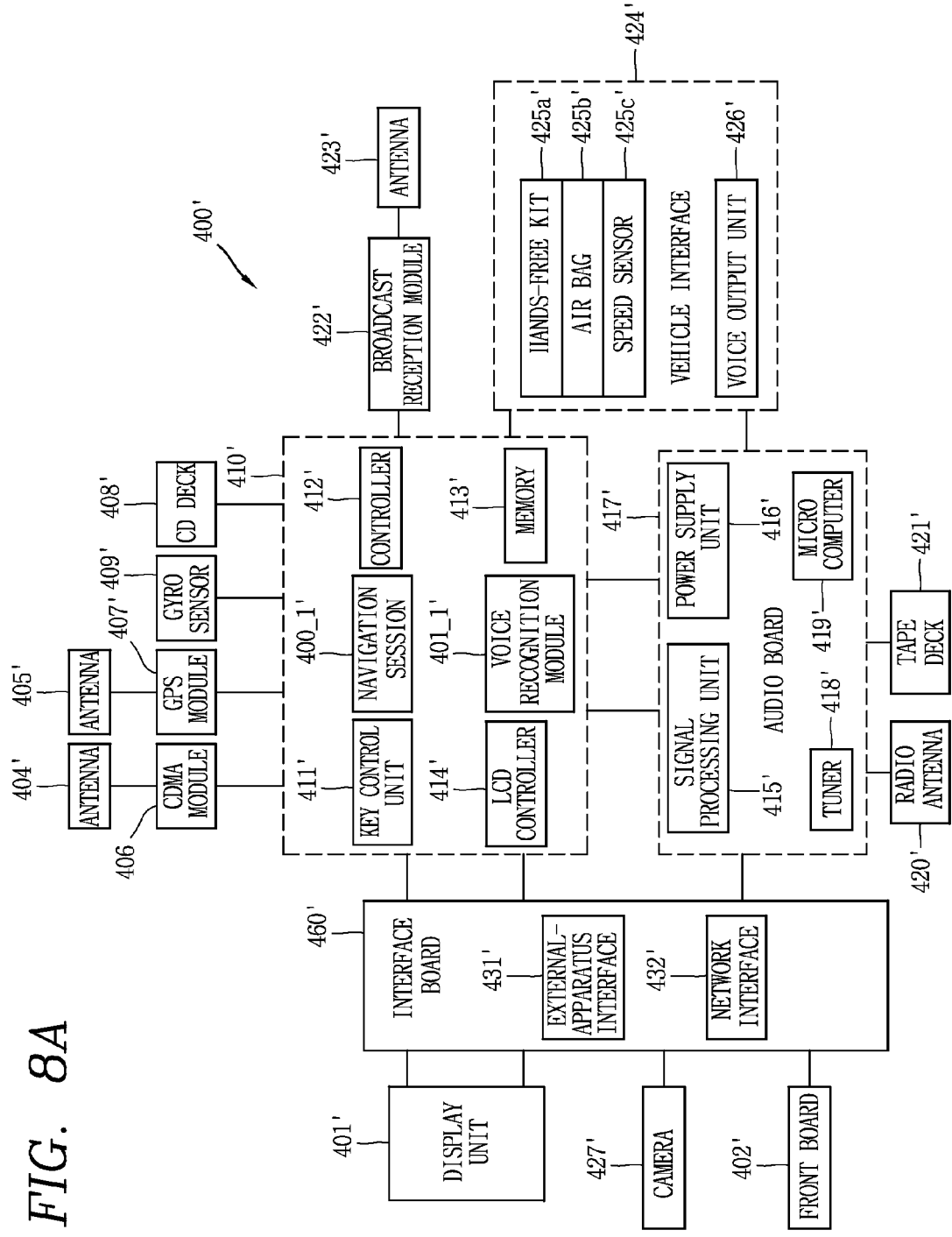
FIG. 8A is a block diagram illustrating the configuration of a vehicle control apparatus according to another embodiment disclosed in the present disclosure.

FIG. 8A is a block diagram illustrating a configuration of the vehicle control apparatus, disclosed in the present specification, according to another embodiment.

FIG. 8A illustrates a case where the vehicle control apparatus 400 is realized as in the form of an image display apparatus, a head unit of the vehicle, or a telematics terminal.

As illustrated in FIG. 8A, a vehicle control apparatus 400' is configured to include a main board 410'. A controller (for example, a central processing unit (CPU) 412' that controls all operations of the vehicle control apparatus 400', a program for processing or controlling the controller 412', a key controller 411' that controls various key signals, and an LCD controller 414' that controls a liquid crystal display (LCD) are built into the main board 410'.

Map information (map data) for displaying directions-suggestion information on a digital map is stored in the memory 413'. In addition, a traffic information collection/control algorithm for inputting the traffic information according to a condition of a road along which the vehicle moves currently, and information for controlling the algorithm are stored in the memory 413'.

The main board 410' is configured to include a code division multiple access (CDMA) module 406' that is assigned a serial number and is built into the vehicle, a global positioning system (GPS) module 207 that receives GPS signals for identifying a vehicle position, tracking a driving path from a departure point to a destination point, and so forth, transmits traffic information collected by the user, a CD deck 408' for reproducing signals recorded on a compact disk (CD), a gyro sensor 409' and the like. The CDMA module 406' and the GPS module 407' transmit/receive a signal to/from antennas 404' and 405', respectively.

In addition, a broadcast reception module 422' is connected to the main board 410' and receives a broadcast signal through an antenna 423'. A display unit (LCD) 401' that controlled by the LCD controller 414' through an interface board 430', a front board 402' that is controlled by the key controller 411', and a camera 427' that captures an image of a scene inside of and/or outside of the vehicle are connected to the main board 410'. Various video signals and text signals are displayed on the display unit 401'. Buttons for inputting various key signals are provided on the front board 402'. The front board 410' provides the key signal corresponding to the button selected by the user. In addition, the display unit 401' is configured to include a proximity sensor and a touch sensor (touch screen).

A menu key for directly inputting the traffic information is provided on the front board 402'. The menu key is configured in such a manner that the menu key is controlled by the key controller 411'.

The audio board 417' is connected to the main board 410' and processes various audio signals. The audio board 417' is configured to include a microcomputer 419' for controlling the audio board 417', a tuner 418' that receives a radio signal, a power supply unit 416' that supplies electric power to the microcomputer 419', and a signal processing unit 415' that processes various voice signals.

In addition, the audio board 417' is configured to include a radio antenna 420' for receiving the radio signal and a tape deck 421' for reproducing an audio tape. The audio board 417' may be configured to further include a voice output unit (for example, an amplifier) 426' for outputting the voice signal that is signal-processed in the audio board 417'.

The voice output unit (amplifier) 426' is connected to a vehicle interface 424'. That is, the audio board 417' and the main board 410' are connected to the vehicle interface 424'.

A hands-free kit 425$a$' for inputting the voice signal, an air bag 425$b$' for driver's or passenger's safety, a speed sensor 425$c$' for detecting a vehicle speed, and so on may be connected to the vehicle interface 424'. The speed sensor 425$c$' calculates the vehicle speed and provides information on the calculated vehicle speed to the central processing unit 412'.

A navigation session 400_1' applied to the vehicle control apparatus 400' generates the directions-suggestion information, based on the map data and current position information on the vehicle, and notifies the user of the generated directions-suggestion information.

The display unit 401' senses a proximity touch within a display window through the proximity sensor. For example, when a pointer (for example, a finger or a stylus pen) comes into proximity touch with the display unit 401', the display unit 401' detects a position of the proximity touch and outputs positional information corresponding to the detected position to the controller 412'.

A voice recognition device (or a voice recognition module) 401_1' recognizes a voice generated by the user and performs a corresponding function according to the signal of the recognized voice.

The navigation session 400_1' applied to the vehicle control apparatus 400' displays the driving path on the map data. When the position of the mobile communication terminal 100' is within a predetermined distance from a blind spot included in the driving path, the navigation session 400_1' automatically sets up a connection to a terminal (for example, a vehicle navigation apparatus) mounted in the vehicle in the vicinity and/or to a mobile terminal being carried by a pedestrian in the vicinity over a wireless network (for example, a short-range wireless communication network). Thus, the navigation session 400_1' receives the positional information on the vehicle in the vicinity from the terminal mounted in the vehicle in the vicinity and receives the positional information on the pedestrian from the mobile terminal being carried by the pedestrian in the vicinity.

On the other hand, the main board 410' is connected to an interface unit (not illustrated) 430', and the interface unit 430' (not illustrated) is configured to include an external-apparatus interface unit 431' and a network interface unit 432'.

The external-apparatus interface unit 431' connects an external device and the vehicle control apparatus 400'. To do this, the external-apparatus interface unit 431' is configured to include an A/V input/output unit (not illustrated) or a wireless communication unit (not illustrated).

The external-apparatus interface unit 431' is connected, for example, to an external device, such as a digital versatile disk (DVD) player, a Blu-ray disk player, a game apparatus, a camera, a camcorder, or a computer (notebook computer) in a cable or wireless manner. The external-apparatus interface unit 431' transfers to the controller 412' of the vehicle control apparatus 400' an image, a voice, or data signal that is input from outside through the connected external device. In addition, the image, the voice, or the data signal that is processed in the controller 412' is output to the connected external device. To do this, the external-apparatus interface unit 431' is configured to include an A/V input/output unit (not illustrated) or a wireless communication unit (not illustrated).

The AN input and output unit is configured to include a USB port, a Composite Video Banking Sync (CVBS) port, a composite port, a S-video port (analog), a Digital Visual Interface (DVI) port, a High Definition Multimedia Interface (HDMI) port, a RGB port, a D-SUB port, and the like in order to input an image and a voice signal from the external device to the vehicle control apparatus 400'.

The wireless communication unit performs short-range communication with a different electronic apparatus. The vehicle control apparatus 400' is connected to the different electronic apparatus in accordance with telecommunication standards, such as Bluetooth, Radio Frequency Identification (RFID), Infrared Data Association (IrDA), Ultra Wideband, and ZigBee over the network.

In addition, the external-apparatus interface unit 431' may be connected to various set-top box through at least one among the various ports, and may perform an input/output operation while in connection to the set-top box.

On the other hands, the external-apparatus interface unit 431' receives an application or an application list that is present in the adjacent external device, and transfers the application or the application list to the memory 413'.

The network interface unit 432' provides an interface for connecting the vehicle control apparatus 400' to a wire/wireless network, such as the Internet. The network interface unit 432' is configured to include, for example, an Ethernet port for the connection to the wire network. For the connection to the wireless network, telecommunication standards are used such as Wireless LAN (WLAN) (Wi-Fi), Wireless broadband (Wibro), World Interoperability for Microwave Access (Wimax), and High Speed Downlink Packet Access (HSDPA).

The network interface unit 432' transmits or receives data to and from the different user or the different electronic apparatus over a connected network, or a different network linked to the connected network. Particularly, one or more pieces among pieces of content data stored in the vehicle control apparatus 400' are transmitted to the user or the electronic apparatus selected from among other users or other electronic apparatuses that are pre-registered with the vehicle control apparatus 400'.

On the other hand, the network interface unit 432' is connected to a predetermined web page over a connected network or a different network linked to the connected network. That is, the network interface unit is connected to the predetermined web page to transmit or receive data to or from a corresponding server. In addition, items of content or pieces of data are received that are provided by a content provider or a network administrator. That is, content, such as a movie, an advertisement, a game, VOD, and a broadcast signal, and information relating to these, which are provided from the content provide or the network administrator, are received. In addition, update information on firmware and an update file, which are provided by the network administrator, are received. In addition, pieces of data are transmitted to the content provider and the network administrator over the network such as the Internet.

In addition, the network interface unit 432' selects a desired application from applications in the public domain, and receives the selected application, over the network.

Figure 8B:
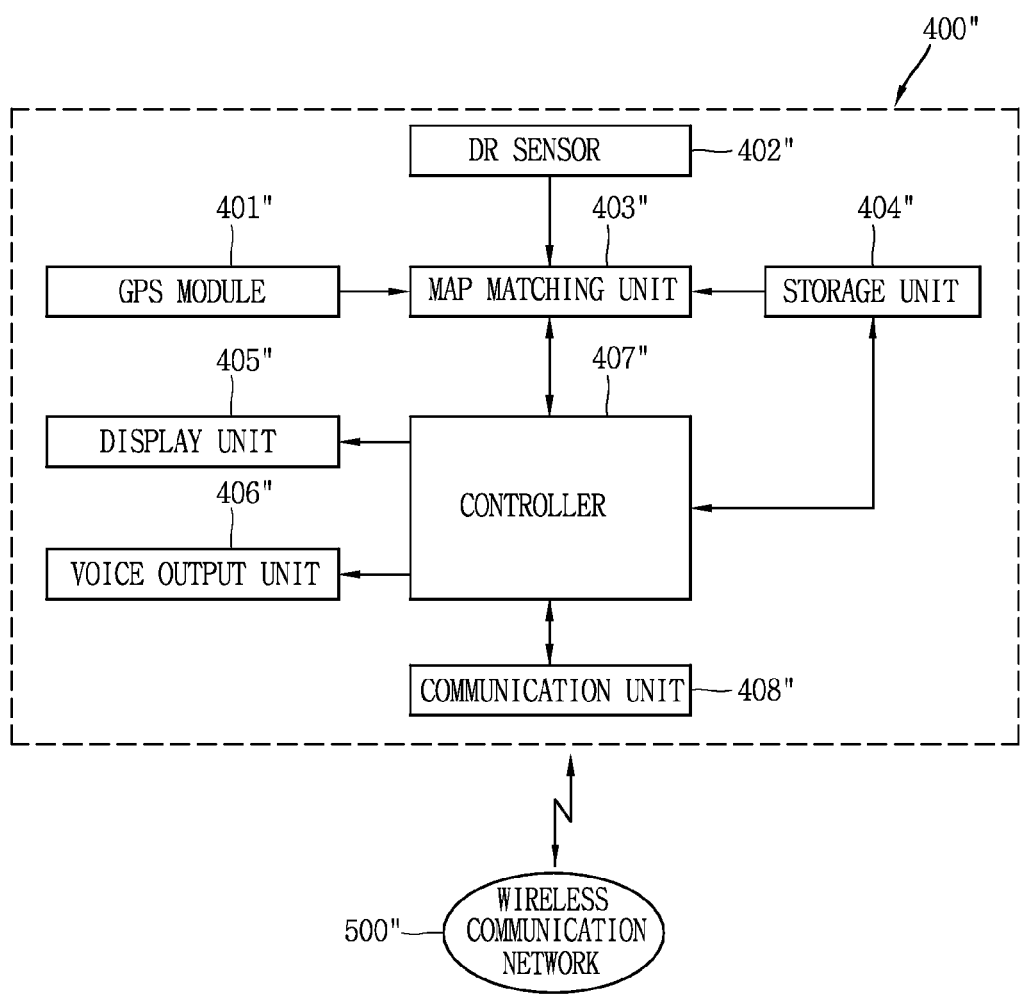
FIG. 8B is a block diagram illustrating the configuration of a vehicle control apparatus according to another embodiment disclosed in the present disclosure.

FIG. 8B is a block diagram illustrating a configuration of the vehicle control apparatus, disclosed in the present specification, according to another embodiment.

FIG. 8B is a configuration diagram illustrating the vehicle control apparatus 400', focusing on a function of the vehicle navigation apparatus.

If a vehicle control apparatus 400" is realized as the vehicle navigation apparatus, the vehicle control apparatus 400" is categorized into an in-ash type and an on-dash type according to how the vehicle navigation apparatus is installed. The in-dash type navigation (vehicle navigation) apparatus is inserted into a given space secured within a dashboard of the vehicle, and is held in place there. The on-dash type navigation (vehicle navigation) apparatus is held in place on the dashboard of the vehicle, or is held in place in the vicinity of the dashboard using a given support, in a manner that can be attached to and be detached from the dashboard. Thus. the on-dash type navigation apparatus is portable.

The vehicle control apparatuses 400" according to the present embodiments include the in-dash type of navigation (vehicle navigation) apparatus and the on-dash type of navigation (vehicle navigation) apparatus. In addition, the navigation (vehicle navigation) apparatuses include all information processing apparatuses that are capable of receiving and/or processing the traffic information, such as various types of portable terminals that are capable of performing a navigation function in cooperation with a GPS receiver within the vehicle, which receives a navigation message that is transmitted from a global positioning system (GPS) satellite.

As illustrated in FIG. 8B, the vehicle control apparatus 400" is configured to include a GPS module 401", a dead-reckoning sensor (DR) sensor 402", a storage unit (or memory) 404", a map mapping unit 403", a communication unit 408", a controller 407", a display unit 405", and a voice output unit 406". The GPS module 401" receives a global positioning system (GPS) signal from the satellite and generates first vehicle position data on the navigation apparatus (whose position is defined as being the same as that of the mobile communication terminal 100), based on the received GPS signal. The dead-reckoning sensor (DR) sensor 402" generates second vehicle position data, based on a driving direction of a vehicle and a speed of the vehicle. The map data and various pieces of information are stored in the storage unit 404" (or memory). The map mapping unit 403" generates a vehicle estimation position, based on the first vehicle position data and the second vehicle position data, matches the generated vehicle estimation position with a link (or a map match link, or a map match road) within the map data stored in the storage unit 404", and outputs the matching-caused map information (the result of map matching). The communication unit 408" receives real time traffic information from an information provision center and/or from the vehicle in the vicinity over a wireless communication network 500", receives traffic light-signal information, and performs telephone communication. The controller 407" generates the directions-suggestion information, based on the matching-caused map information method (the result of map matching). The directions-suggestion map (including information on the point of interest) included in the directions-suggestion information and the traffic signal-light information are displayed on the display unit 405". The voice output unit 406" outputs directions-suggestion voice information (a directions-suggestion voice message) included in the directions-suggestion information and a voice signal corresponding to the traffic light-signal information.

At this point, the communication unit 408" may further include a hands-free kit including a Bluetooth module and may receive a broadcast signal including the traffic information in a TPEG format from the broadcasting station through an antenna. The broadcast signal includes not only audio and video data in accordance with various types of specifications, such as ground wave or satellite Digital Multimedia Broadcasting (DMB), Digital Audio broadcasting (DAB), digital Video Broadcasting (DVB-T and DVB-H), but also additional information, such as traffic information and various types of additional data, which is provided through traffic information (TPEG) service and Binary Format for Scene (BIFS) data service. In addition, the communication unit 408" performs synchronizing on a signal band in which the traffic information is provided, demodulates the synchronized signal, and outputs the demodulated signal to a TPEG decoder (which is included in a controller 407).

The TPEG decoder decodes the traffic information in the TPEG format and provides to the controller 407" various type of information that include the light signal information included in the traffic information.

The directions-suggestion information includes not only the map data, but also various types of information relating to driving, such as traffic lane information, speed limit information, turn-by-turn information, traffic safety information, traffic condition information, vehicle information, path-finding information, and the like.

The signal that is received through the GPS module 401" may be configured in such a manner as to provide the position information on the terminal to the vehicle control apparatus 400" using wireless communication methods proposed by the Institute of Electrical and Electronics Engineers (IEEE), such as IEEE 802.11, IEEE 802.15, IEEE 802.16, and IEEE 802.20. IEEE 802.11 is a set of standard specifications for wireless networks, such as wireless LAN and wireless LAN including one portion of Infrared Communication and so on. IEEE 802.15 is a set of standard specifications for wireless Personal Area Network (PAN) including Bluetooth, UWB, ZigBee, and so on. IEEE 802.16 is a set of standard specifications for wireless Metropolitan Area Network (MAN) (Broadband Wireless Access (BWA)) including Fixed Wireless Access (FWA) and so on. IEEE 802.20 is a set of mobile Internet standard specifications for wireless MAN (Mobile Broadband Wireless Access (MBWA)).

The vehicle control apparatus 400" may be configured to further include an input unit. The input unit is used when the user selects a function that is wanted by the user or inputs information. Various devices, such as a keypad, a touch screen, a jog shuttle, and a microphone, are used as the input unit.

The map matching unit 403" generates the vehicle estimation position, based on the first vehicle position data and the second vehicle position data, and reads the map data corresponding to the driving path from the storage unit 404".

The map matching unit 403" matches the vehicle estimation position with a link (road) included in the map data and outputs the matching-caused map information (the result of map matching) to the controller 407". For example, the map matching unit 403" generates the vehicle estimation position, based on the first vehicle position data and the second vehicle position data. The map matching unit 403" matches the generated vehicle estimation position with the links within the map data stored in the storage unit 404", in the linking order, and outputs the matching-caused map information (the result of map matching) to the controller 407". The map matching unit 403" may output information on characteristics of roads, included in the matching-caused map information (the result of map matching), such as one-story road and multi-story road, to the controller 407". In addition, a function of the map matching unit 403" may be realized in the controller 407".

The map data is stored in the storage unit 404". At this point, the map data being stored is included to include geographic coordinates (or latitude and longitude coordinates) indicating latitude and longitude in a unit of degree-minute-second (in a DMS unit). At this point, in addition to the geographic coordinates, the map data being stored may include Universal Transverse Mercator (UTM) coordinates, Universal Polar System (UPS) coordinates, and Transverse Mercator™ coordinates.

Various types of information, such as various types of menu screens, points of interest (POI) (hereinafter referred to as "POI"), and information on function characteristics according to a specific position on the map data are stored in the storage unit 404".

Various user interfaces (UI) and/or various graphic user interfaces (GUI) are stored in the storage unit 404".

Data, programs, and so on necessary to operate the vehicle navigation apparatus 400 are stored in the storage 404".

Destination information that is input from the user through the input unit is stored in the storage unit 404". At this point, the destination information is on the destination point, or on any one among the destination point and the departure point.

The image information (or directions-suggestion map) included in the direction-suggestion information generated by the controller 407 is displayed on the display unit 405". At this point, the display unit 405 is configured to include the touch sensor (touch screen) and the proximity sensor. In addition, the directions-suggestion information includes not only the map data, but also the various types of information relating to driving, such as the traffic lane information, the speed limit information, the turn-by-turn (TBT) information, the traffic safety information, the traffic condition information, the vehicle information, the path-finding information and the like.

When the image information is displayed, various menu screens and various items of content, such as the directions-suggestion information, are displayed on the display unit 405", using a user interface and/or a graphic user interface that are included in the storage unit 404". At this point, the content that is displayed on the display unit 405" includes the menus screen including various pieces of text or image data (including the map data or various types of information data), a menu screen including icons, a list menus, a combo box, and the like, and the like.

The voice output unit 406" outputs voice information (or a voice message for the directions-suggestion information) included in the directions-suggestion information generated by the controller 407". At this point, the voice output unit 406" may be an amplifier or a speaker.

The controller 407" generates the directions-suggestion information, based on the matching-caused map information, and outputs the generated directions-suggestion information to the display unit 405" and the voice output unit 406". At this point, the directions-suggestion information is displayed on the display unit 405".

The controller 407" receives the real-time traffic information from the information provision center and/or the terminal (vehicle navigation device) mounted in the vehicle in the vicinity and generates the directions-suggestion information.

The controller 407" establishes a connection to a call center through the communication unit 408" and thus makes a telephone call or transmits/receives information between the vehicle control apparatus 400" and the call center. At this point, the communication unit 408" may further include a hand-free module that has a Bluetooth function which uses a short-range wireless communication method.

When a POI search menu is selected by the user, the controller 407" searches for the POI positioned on a path from a current position to the destination point, and displays the resulting POI to the display unit 405". At this point, the controller 407" searches for the POI (a path to the POI does not need to be changed (to be researched for), in which case the POI is positioned to the left or to the right of a driving road) positioned on the path from the current position to the destination point and for the POI (a path to the POI needs to be changed, in which case a predetermined path has to be changed in order to drive by way of the POI in the vicinity) positioned in the vicinity of the path from the current position to the destination point, and displays the resulting POI on the display unit 405".

Figure 8C:
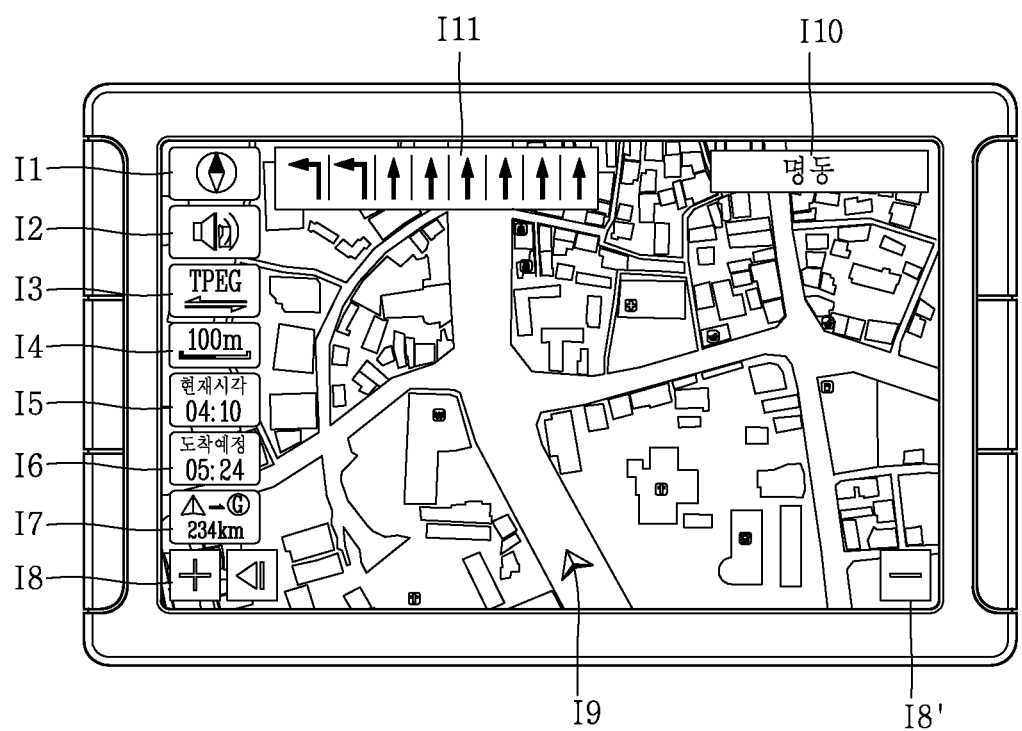
FIG. 8C is an exemplary view illustrating a screen associated with a navigation function according to an embodiment disclosed in the present disclosure.

FIG. 8C is a diagram illustrating a screen associated with a navigation function, disclosed in the present specification, according to one embodiment.

The screen illustrated in FIG. 8C is a screen that is displayed by the mobile terminal 100, the wearable device 200 or 200', or the vehicle control apparatus 400.

If the mobile terminal 100 is realized as in the form of a mobile terminal, a smart phone, a laptop computer, a digital broadcast terminal, a personal digital assistant (PDA), a portable multimedia player (PMP), a wearable device, and the like, only one or more among constituent elements illustrated in FIG. 8C may be displayed or none of the constituent elements may be displayed. 나.

As illustrated in FIG. 8C, an icon I1 indicating a compass direction of the map is displayed on one region of the screen on the display unit to which a screen associated with the navigation function is provided. The map is displayed on the display unit to which the screen associated with the navigation function is provided, in such a manner that a specific direction (for example, the true north direction of the Earth), a moving direction of a moving object, a direction of the destination point, and the like are displayed fixed to an upper portion of the screen.

An icon I2 indicating whether or not a sound output module 162 is activated and a volume setting is displayed on one region of the screen on the display unit to which the screen associated with the navigation function is provided. The user can activate or inactivate the sound output module 162 or adjust the volume by applying the touch input to the icon I2.

An icon I3 indicating whether or not a path search function is activated that is in accordance with Transport Portal Experts Group (TPEG) specifications for transmission of traffic information is displayed on one region of the screen on the display unit. Transport Portal Experts Group (TPEG) was found in 1997 by the European Broadcasting Unit for the purpose of establishing protocols for traffic information. In a navigation system, a path suggestion function that uses real time traffic situation information is in accordance with TPEG.

An icon I4 indicating a scale of the map data is displayed on one region of the screen on the display unit.

An icon I5 indicating present time is displayed on one region of the screen in the display unit. In addition, an icon I6 indicating estimated time at which the moving object arrives at a predetermined destination point is displayed on one region of the screen on the display unit. Furthermore, an icon indication estimated time that it takes the moving object to arrive at the predetermined destination point is displayed on one region of the screen on the display unit.

An icon I7 indicating a distance to the predetermined destination point is displayed on one region of the screen on the display unit.

An icon I8 or an icon I8' for increasing or decreasing a size of the displayed map, respectively, is displayed on one region of the screen on the display unit.

An icon I9 indicating a position and a moving direction of the moving object is displayed on one region of the screen on the display unit. The icon I9 may be displayed on a point on the map, which corresponds to the current position of the moving object. In addition, the moving direction of the moving object is displayed as a direction of a sharp point of an arrow in the icon I9, and the like.

An icon I10 indicating a name of a place in which the moving object is located is displayed on one region of the screen on the display unit.

If the vehicle drives down a street, an icon I11 indicating lanes of the street is displayed on one region of the screen on the display unit.

A path to the predetermined destination point I12 (refer to FIG. 8C) is displayed on the display unit. If the destination point of the moving object is not set, the path may not be displayed.

All the functions (for example, including the navigation function) that are performed by the vehicle 400 described above are performed the mobile terminal 100 or the wearable device 200 or 200' that is connected to the vehicle control apparatus 400 in a wired or wireless manner.

In addition, the vehicle control apparatus 400 and the mobile terminal 100 performs all the functions in cooperation with each other or in conjunction with each other.

To do this, the mobile terminal 100 or the wearable device 200 is configured to include a constituent element that is the same as, is similar to, and corresponds to that included in the vehicle control apparatus 400.

For example, the acceleration sensor provided in the mobile terminal 100 or the wearable device 200 or 200' plays a role of the acceleration sensor included in the vehicle control apparatus 400.

For the cooperation or conjunction between the vehicle control apparatus 400 and the mobile terminal 100, a virtual network computing (VNC) method is applied.

The virtual network computing (VNC) means a graphic desktop sharing system that remotely controls a different computer (or a different terminal) using a RFB protocol in an computer environment.

The VNC transmits keyboard and mouse events or a touch event from one terminal to another, and thus provides a method of updating a graphic screen over the network.

In addition, all the functions that are performed by the vehicle control apparatus 400 described above are shared between the vehicle control apparatus 400 and the mobile terminal 100 or the wearable device 200 or 200' and thus are performed.

That is, when it comes to performing a specific function, among all the functions that are performed by the vehicle control apparatus 400 described above, one portion of the specific function is performed by the vehicle control apparatus 400, the other portions of the specific function are performed by the mobile terminal 100 or the wearable device 200 or 200'.

For example, in a case of the air conditioning function for the vehicle, a setting temperature is input into an air conditioner that is provided within the vehicle, by the mobile terminal 100 or the wearable device 200 or 200'. The vehicle control apparatus 400 performs control in such a manner that the air conditioner operates to maintain the setting temperature that is input.

It is apparent to a person of ordinary skill in the art that the technology relating to the vehicle control apparatus, disclosed in the present specification, can be realized in a different form within a range that does not deviate from the technological idea disclosed in the present specification.

Hereinafter, a mobile terminal linked with a vehicle control apparatus according to an embodiment of the present disclosure will be described in more detail with reference to FIGS. 9 through 21.

Mobile Terminal Linked with Vehicle Control Apparatus

Hereinafter, a mobile terminal linked with a vehicle control apparatus according to an embodiment disclosed in the present disclosure will be described in detail, and the redundant description will be substituted by the earlier description, and the detailed description thereof will be omitted.

A mobile terminal according to an embodiment disclosed in the present disclosure may include a wireless communication unit 110 and a controller 180.

As illustrated in FIG. 1, the wireless communication unit 110 included in the mobile terminal 100, as an element for performing communication with a vehicle control apparatus 400, 400', 400", may include at least one module for performing wireless communication with a node included in a network that typically includes the mobile terminal 100 as another node.

Accordingly, the mobile terminal 100 forms a network with the vehicle control apparatus 400, 400', 400" using the wireless communication unit 110.

A network formed between the mobile terminal 100 and the vehicle control apparatus 400, 400', 400" does not depend on a connection form between nodes, a connecting distance between nodes, a communication protocol used, and the like.

The controller 180 as an element for controlling the overall operation of the mobile terminal 100 allows the mobile terminal 100 or vehicle control apparatus 400, 400', 400" to automatically or receive a user input according to whether or not the vehicle is moving or whether or not a user is riding on the vehicle based on an event generated from at least one node, thereby performing an operation corresponding to the event.

In addition to a terminal in which an event has occurred, a terminal in which an event has not occurred is linked with the terminal in which an event has occurred to perform an operation according to the event, thereby enhancing user convenience.

Specifically, the mobile terminal 100 and vehicle control apparatus 400, 400', 400" may share an event generated from either one of the mobile terminal 100 and vehicle control apparatus 400, 400', 400" with the other one, thereby executing a new program for enhancing user convenience or re-executing a program that has not been carried out in consideration of user's safety based on whether or not a vehicle is moving or whether or not a user is riding on the vehicle.

For an example, when an incoming call event has occurred in the mobile terminal 100 while driving a vehicle, the mobile terminal 100 may reject the incoming call, and when the vehicle is not moving or the user is getting off the vehicle subsequent to sending a response message such as "Unable to respond now" to the call originator, the mobile terminal 100 may notify the user to place a call to the counterpart who has rejected the incoming call, thereby guiding the execution of an outgoing call program.

Here, whether or not the vehicle is moving may be determined by the mobile terminal 100 or vehicle control apparatus 400, 400', 400", and determined by any one or a combination of an ignition on/off state of the vehicle, a speed of the vehicle, a change or non-change of the vehicle location and a distance between the vehicle control apparatus and mobile terminal.

For an example, the vehicle control apparatus 400, 400', 400" may directly sense an ignition state of the vehicle, and a change or non-change of the moving speed, acceleration or location of the vehicle to determine whether or not the vehicle is moving, and otherwise, the mobile terminal 100 may determine a change or non-change of the moving speed, acceleration or location of the mobile terminal 100 when a distance difference between the mobile terminal 100 and vehicle control apparatus is zero or less than a predetermined distance, thereby indirectly determining whether or not the vehicle is moving.

Furthermore, whether or not a user is riding on the vehicle may be determined by the mobile terminal 100 or the vehicle control apparatus 400, 400', 400", and determined by any one or a combination of whether or not an external input of the vehicle control apparatus 400, 400', 400" is received, whether a door is open or closed, whether or not a pressure sensor installed on a seat is sensed, an ignition on/off state of the vehicle, a speed of the vehicle, a change or non-change of the vehicle location, and a distance between the vehicle control apparatus and mobile terminal, and preferably determined by collectively considering a plurality of conditions to determine whether or not the user is riding on the vehicle.

For an example, the vehicle control apparatus 400, 400', 400" may determine that a user is currently riding on the vehicle when receiving a user manipulation, and determine that a user is currently riding on the vehicle even when the pressure sensor installed on a seat senses a pressure above a reference value, and determine that a user is currently riding on the vehicle even when changing the speed of the vehicle or location of the vehicle.

An example of determining whether or not the vehicle is moving or whether or not a user is riding on the vehicle may include the foregoing description, but may not be necessarily limited to this, and may be of course determined by other publicly known methods.

Furthermore, an event occurred in the mobile terminal 100 and/or vehicle control apparatus 400, 400', 400" according to an embodiment disclosed in the present disclosure may be sensed by the mobile terminal 100 and/or vehicle control apparatus 400, 400', 400", and may denote a case where a value sensed by an external signal received in a non-routine manner in a standby state or an external signal received through the communication unit or a value sensed by the sensor or the like is above a predetermined reference value, and the like.

Specifically, an event generated from the mobile terminal 100 and/or vehicle control apparatus 400, 400', 400" according to an embodiment disclosed in the present disclosure may include an incoming call event, a message receiving event, a vehicle proximity event in which a distance between the user and the vehicle is within a predetermined distance, a vehicle getting-on event when the user is getting on the vehicle, a vehicle non-moving event when the vehicle is in a parking state, a vehicle getting-off event at the time when the user is getting off the vehicle, and the like, but may not be necessarily limited to them.

On the other hand, according to an embodiment disclosed in the present disclosure, the mobile terminal 100 may include an output unit 150 for displaying a pop-up window for guiding a user input for executing the outgoing call program, road guide program or memo program on the screen.

At this time, the pop-up window may be displayed in the form of an icon on the operating system screen executed in the mobile terminal 100 or in the form of a widget on the screen to receive a user input for performing an operation according to the foregoing event occurrence, but may be preferably displayed in the form of a pop-up window to fix the location regardless of switching the operating system screen of the mobile terminal 100, and prevent interference with other icons or the like, and change the location at user's discretion.

Figure 10A:
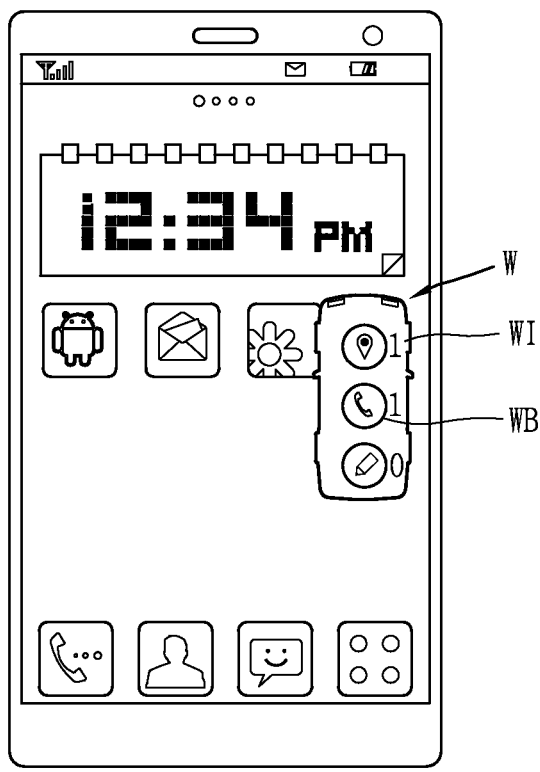
FIG. 10A is an exemplary view illustrating a mobile terminal in which a pop-up window according to an embodiment disclosed in the present disclosure is displayed on a screen.

FIG. 10A is an exemplary view illustrating a mobile terminal in which a pop-up window according to an embodiment disclosed in the present disclosure is displayed on a screen.

As illustrated in FIG. 10A, the mobile terminal 100 that has received data corresponding to an event generated from either one node of the mobile terminal 100 and vehicle control apparatus 400, 400', 400" may display a pop-up window (W) for receiving a user input to part of the screen prior to performing an operation corresponding to the data to receive a user input for whether or not to perform the operation.

Figure 10B:
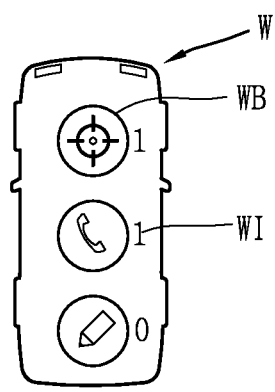
FIG. 10B is an exemplary view illustrating a pop-up window displayed on the screen of a mobile terminal according to an embodiment disclosed in the present disclosure.

The pop-up window (W) may have an outside shape with a polygon, a circle, an ellipse or the like, but preferably have a shape corresponding to the vehicle control apparatus 400, 400', 400", for example, a vehicle shape, to allow the user to recognize at a glance that the pop-up window (W) is related to the vehicle control apparatus 400, 400', 400" which is another node (refer to FIG. 10B).

The location of the pop-up window (W) may be changed by a user's input or user's setting.

On the other hand, the pop-up window (W) may be displayed on the screen to include at least one graphic object (WB) in a button shape for receiving a user input to perform an operation corresponding to the event occurrence as illustrated in FIGS. 10A and 10B.

At this time, when a selection input for the at least one graphic object (WB) is received from the user, the corresponding operation, for example, a specific program, may be executed.

For an example, as illustrated in FIG. 10A, three graphic objects within the pop-up window (W) may be a first graphic object for receiving an input for executing a map related program, a second graphic object for receiving an input for executing an incoming and outgoing call program and a third graphic object for receiving an input for executing a memo program, sequentially from the top to the bottom.

The number of graphic object (WB) or its related program may be set by the user.

Furthermore, a program linked with the graphic object (WB) may be set by the controller as a program frequently used by the user, but preferably set by the controller as a program frequently used by the user within a specific time range based on whether or not the vehicle is moving or a user is riding on the vehicle.

At this time, a program linked with the graphic object (WB) set by the controller may be a program executed more than a preset execution number of times, and the number thereof may not be necessarily limited.

On the other hand, an indicator (W1) indicating whether or not an event corresponding to the graphic object (WB) has occurred and/or a number of occurrences on the graphic object (WB) or around the graphic object (WB).

For an example, as illustrated in FIG. 10A, the indication of "1" may be displayed at an upper right end of the first graphic object for receiving an input for executing a map related program. Specifically, when the user's getting-off location is different from a destination location, and an event is generated once from the vehicle control apparatus 400, 400', 400", and the mobile terminal 100 receives an input for selecting the first graphic object from the user, the mobile terminal 100 may perform a program for guiding a road from the user's getting-off location to the destination.

According to another embodiment, an indicator indicating whether or not an event has occurred and/or a number of occurrences on a program icon or around the program icon. Here, the program icon may be a graphic object displayed on the screen to receive an execution command for a program for performing an operation corresponding to the event.

Figure 10C:
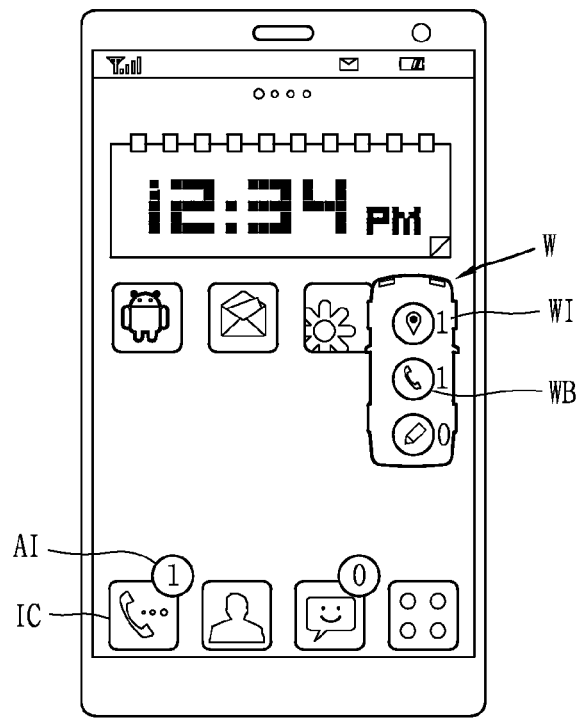
FIG. 10C is an exemplary view illustrating a number of event occurrences around an icon displayed on the screen of a mobile terminal according to an embodiment disclosed in the present disclosure.

FIG. 10C is an exemplary view illustrating a number of event occurrences around an icon displayed on the screen of a mobile terminal according to an embodiment disclosed in the present disclosure.

As illustrated in FIG. 10C, an indicator (AI) indicating whether or not an event has occurred and/or a number of occurrences may be displayed around a program icon (IC).

In other words, a selection input for performing an operation corresponding to the event occurrence may display the indicator (AI) on or around the icon (IC) for receiving a command for executing a program which is the same as or similar to the graphic object (WB) as well as the graphic object (WB).

For an example, when an incoming call event is generated once from the mobile terminal 100 while driving the vehicle, and the vehicle is not moving or the user is getting off the vehicle, the mobile terminal 100 may display "1" at an upper right end of the icon (IC) of the incoming and outgoing call program in addition to the graphic object (WB) for receiving an execution command of the incoming and outgoing call program to allow the mobile terminal 100 to place a call to the counterpart who has rejected the incoming call.

According to still another embodiment, when performing an operation corresponding to an event generated from at least one node, whether or not the event has occurred or a number of the event occurrences may be displayed on part of the screen while performing the operation.

Figure 10D:
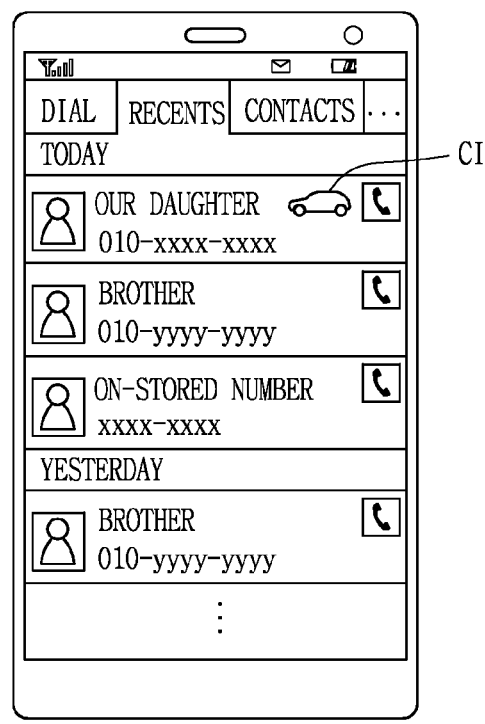
FIG. 10D is an exemplary view illustrating whether or not an event has occurred on part of a program execution screen in a mobile terminal according to an embodiment disclosed in the present disclosure.

FIG. 10D is an exemplary view illustrating whether or not an event has occurred on part of a program execution screen in a mobile terminal according to an embodiment disclosed in the present disclosure.

When a program is executed based on a user input, whether or not the event has occurred or a number of the event occurrences on the executed program screen. At this time, the executed program is of course a program associated with the event occurrence.

For an example, as illustrated in FIG. 10D, when an incoming and outgoing call program is executed, and an incoming call event is generated once from the mobile terminal 100 while driving the vehicle, whether or not the event has occurred may be displayed on part of the execution screen of the incoming and outgoing call program. At this time, the number of event occurrences may be displayed on the screen by repeating the "vehicle" shaped icon (CI) indicating a number or that there is an occurred event by the number of event occurrences.

Here, the location of an icon (CI) indicating whether or not an event has occurred may be determined according to information extracted from data corresponding to an event generated from the mobile terminal 100 or vehicle control apparatus 400, 400', 400".

For an example, when an incoming call event is generated from the mobile terminal 100 while driving the vehicle and the call originator is extracted as "our daughter" from the corresponding data, the "vehicle" shaped icon may be preferably displayed in a region corresponding to "our daughter" within an incoming and outgoing call list on a screen indicating the incoming and outgoing call program.

On the other hand, when the event has occurred, the output unit 150 may output an event in the form of light, vibration or sound.

For an example, the output unit 150 may display a specific screen through the display unit 151 to visually notify the user that an event has occurred, or display a specific color or blink the specific color with a specific period of time to visually notify the user that an event has occurred, or output a specific color, vibration or sound through the alarm unit 154 or audio output unit 153 to notify the user in a tactile or auditory manner that an even has occurred.

Specific Embodiment Linked Between Mobile Terminal and Vehicle Control Apparatus Hereinafter, a specific embodiment linked between a mobile terminal and a vehicle control apparatus according to an embodiment disclosed in the present disclosure will be described.

Prior to Getting on Vehicle—First Embodiment

When power is on within a predetermined distance from the location of the vehicle, namely, when a vehicle proximity event has occurred, the mobile terminal 100 may display the location of the vehicle according to a user input.

The controller 180 of the mobile terminal 100 may calculate a distance to the vehicle control apparatus 400, 400', 400" to calculate a distance to the location of the vehicle.

Here, a method of allowing the controller 180 to calculate a distance to the vehicle control apparatus 400, 400', 400" may calculate a distance difference between the mobile terminal 100 and the vehicle using a location recognized by the mobile terminal 100 when the user is getting off the vehicle and a current location of the mobile terminal 100. It is assumed that the vehicle is not moving when the user is getting off the vehicle, and thus may be inaccurate when the vehicle has been towed or moved by a person who does not own the mobile terminal 100, but has an advantage of easily calculating a distance between the mobile terminal 100 and the vehicle as well as reducing the amount of computation.

On the contrary, in order to calculate a distance between the mobile terminal 100 and the vehicle, the current locations of the mobile terminal 100 and vehicle control apparatus 400, 400', 400" may be used to calculate a distance between the two locations or the distance may be calculated based on an intensity of wireless signal transmitted and received between the mobile terminal 100 and vehicle control apparatus 400, 400', 400", but it may not be necessarily limited to this, and any publicly known methods for calculating a distance between the two terminals may be applicable thereto.

On the other hand, when the mobile terminal 100 is located within a predetermined distance around the vehicle control apparatus 400, 400', 400" while a user who owns the mobile terminal 100 moves toward the vehicle, the mobile terminal 100 may display a location of the vehicle by the execution of program when power is on.

Specifically, when the mobile terminal 100 is on within a predetermined distance between the mobile terminal 100 and vehicle control apparatus 400, 400', 400", an indicator (W1) indicating "1" may be displayed around the graphic object (WB) corresponding to a program for displaying the location of the vehicle within the pop-up window (W) like FIG. 10A, and when an input for selecting the graphic object (WB) according to a user input, the mobile terminal 100 may display the location of the vehicle on the screen.

Figure 11A:
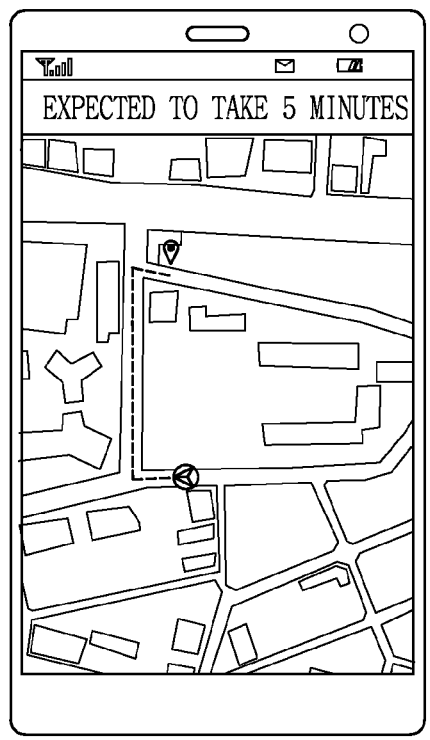
FIG. 11A is a first exemplary view illustrating a screen for displaying the location of a vehicle according to an embodiment disclosed in the present disclosure.

For an example, as illustrated in FIG. 11A, the location of the vehicle may be displayed on a map by the execution of a program for displaying the location of the vehicle.

More preferably, the shortest and optimal route from a current location to the vehicle location may be calculated while displaying the user's current location along with the location of the vehicle, thereby performing road guide to allow the user to move from the current location to the vehicle location.

Furthermore, it may be preferable to calculate a driving direction for approaching the vehicle location in real time according to a direction in which the mobile terminal body faces, and display the calculated driving direction in a turn-by-turn (TBT) manner using an arrow on the screen.

At this time, when displaying a driving direction to the vehicle location in a turn-by-turn manner, it may be preferably displayed on a wearable device screen.

Furthermore, a user may preferably calculate a moving distance from the current location to the vehicle location, an expected moving time according to a walking speed or the like to display it on the screen.

On the other hand, according to another embodiment, a photo or memo set in which the location of the vehicle set by a user input may be displayed.

Figure 11B:
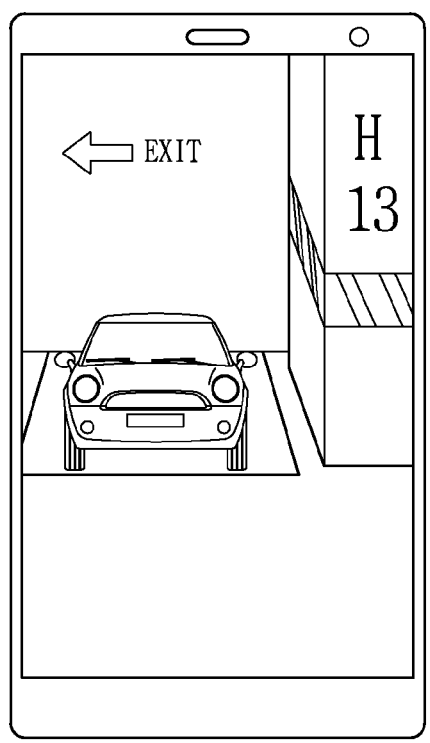
FIG. 11B is a second exemplary view illustrating a screen for displaying the location of a vehicle according to an embodiment disclosed in the present disclosure.

As illustrated in FIG. 11B, when a user takes a photo for the vehicle or its surroundings after getting off the vehicle, a program for displaying the location of the vehicle may display the taken photo.

When the vehicle is parking in an underground parking lot for which the location of the vehicle cannot be correctly recognized, a photo set by the user may be displayed on the screen, thereby providing a clue for the user to move the current location of the vehicle.

On the other hand, when a program for displaying the location of the vehicle, the mobile terminal 100 may output a different size or period of vibration according to a distance difference from the vehicle.

Figure 12:
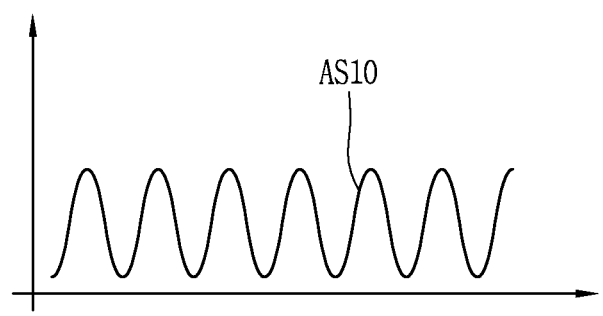
FIG. 12 is an exemplary view illustrating various output schemes of a distance alarm according to an embodiment disclosed in the present disclosure.
Figure 12:
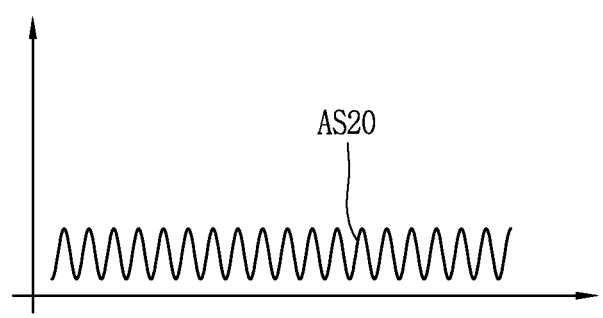
Figure 12:
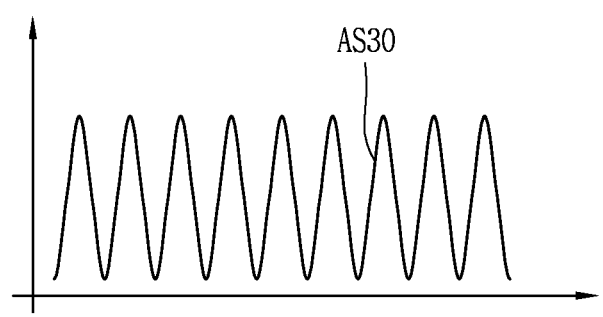
Figure 12:
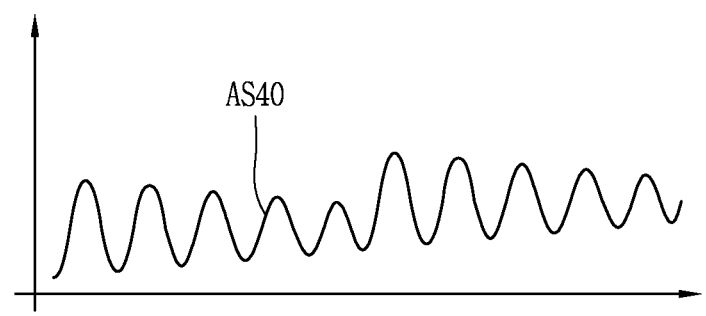

FIG. 12 is an exemplary view illustrating various output schemes of a distance alarm according to an embodiment disclosed in the present disclosure.

For an example, as illustrated in FIG. 12, the mobile terminal 100 may output a distance alarm (AS20) in which a frequency of vibration increases according to a decrease of the calculated distance difference between the mobile terminal 100 and the vehicle or output a distance alarm (AS30) in which an amplitude of vibration increases to the outside based on a distance alarm (AS10) in the form of vibration having a fundamental amplitude and fundamental frequency.

Furthermore, the mobile terminal 100 may output a distance alarm (AS40) in which a frequency or amplitude of vibration varies according to a decrease of the calculated distance difference based on a distance alarm (AS10) in the form of vibration having a fundamental amplitude and fundamental frequency.

As described above, it may be possible to output a different frequency or amplitude of vibration according to a distance difference between the mobile terminal 100 and the vehicle, but it may be also possible to output a different amplitude or frequency of alarm sound according to another embodiment.

Furthermore, according to still another embodiment, it may be possible to select (for an example, "10 m are left") and output a sound from prestored sounds according to a distance difference between the mobile terminal 100 and the vehicle.

Prior to Getting on Vehicle—Second Embodiment

When power is on within a predetermined distance from the location of the vehicle, namely, when a vehicle proximity event has occurred, the mobile terminal 100 may execute a program for setting the destination of the vehicle control apparatus 400, 400', 400" according to a user input.

Figure 13A:
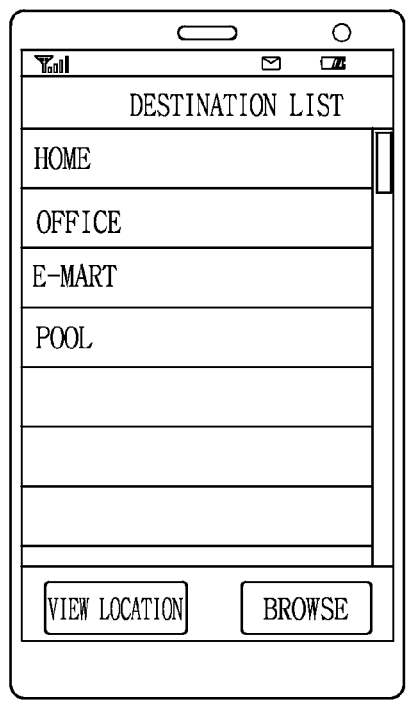
FIGS. 13A(a) and 13A(b) are exemplary views illustrating a destination setting screen according to an embodiment disclosed in the present disclosure.
Figure 13A:
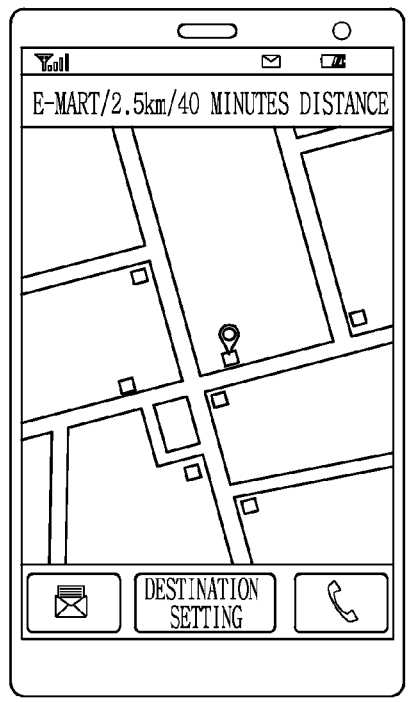

FIG. 13A is an exemplary view illustrating a destination setting screen according to an embodiment disclosed in the present disclosure.

The mobile terminal 100 may execute a program for setting a destination on the vehicle control apparatus 400, 400', 400" when an event has occurred, and the destination setting program may display an input window for retrieving an address or name on the screen to set a destination. Furthermore, the mobile terminal 100 may recognize a voice to retrieve the destination.

On the other hand, a frequently retrieved destination, a destination stored by a user, a recent destination, and the like may be displayed in the form of list as illustrated in FIG. 13A(a), and the user may select any one from the list, and transmit the selected destination to the vehicle control apparatus 400, 400', 400" through the wireless communication unit 110, thereby setting a destination on the vehicle control apparatus 400, 400', 400".

At this time, data transmitted to the vehicle control apparatus 400, 400', 400" by the mobile terminal 100 may include route information including a stopover or route position in addition to the destination.

When a destination is selected by the user, the mobile terminal 100 may display the selected destination or stopover or route position on a map as illustrated in FIG. 13A(b) to confirm it.

At this time, the shortest or optimal distance and/or time required from the current location of the vehicle to the destination may be displayed on part of the screen, and the user may select and enter "destination setting" to set the selected destination on the vehicle control apparatus 400, 400', 400".

According to still another embodiment, the mobile terminal 100 may execute a program for setting a destination on the vehicle control apparatus 400, 400', 400", and display a destination list on the screen as illustrated in FIG. 13A.

At this time, a destination list displayed on the screen may include a place name retrieved more than a predetermined number of times based on a search log stored in the memory 160 of the mobile terminal or a place registered more than a predetermined number of times on a schedule management program or a place with a predetermined number of messages containing a specific place name.

Specifically, at least one search program included in the mobile terminal 100 may store at least one query requested by the user in the memory 160.

The controller 180 may select a place name requested a predetermined number of times by the user based on the at least one query stored in the memory 160 to display it on a destination list.

Here, whether or not a place name is contained in the query may be determined by comparing it with a place name stored in the memory 160 of the mobile terminal 100 or the vehicle control apparatus 400, 400', 400" or comparing it with a place name provided from a navigation provider server connected through the wireless communication unit 110.

According to another embodiment, the mobile terminal 100 may select a place with a predetermined number of times from places stored in a schedule management program to display it on a destination list.

Furthermore, according to still another embodiment, when a message containing a specific place name more than a predetermined number of times, the mobile terminal 100 may display the specific place name on a destination list.

The controller 180 of the mobile terminal 100 may extract a time and/or place name or the like from text contained in a message, and expose a place name having more than a predetermined number of times on the destination list based on the number of messages containing a specific place name among the messages stored in the memory 160.

Prior to Getting on Vehicle—Third Embodiment

When power is on within a predetermined distance from the location of the vehicle, namely, when a vehicle proximity event has occurred, the mobile terminal 100 may display a schedule management program according to a user input.

Figure 13B:
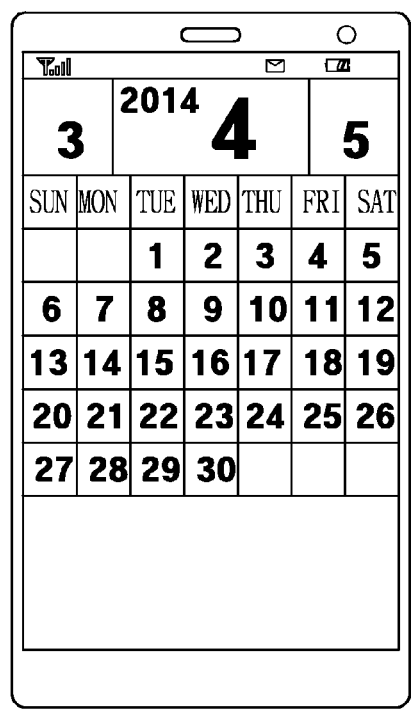
FIG. 13B is an exemplary view illustrating a screen on which a schedule management program according to an embodiment disclosed in the present disclosure is executed.

FIG. 13B is an exemplary view illustrating a screen on which a schedule management program according to an embodiment disclosed in the present disclosure is executed.

As illustrated in FIG. 13B, when an event has occurred, the mobile terminal 100 may execute a schedule management program to display a schedule or memo stored with what-to-do-today on the screen, thereby allowing the user to set a destination on the vehicle control apparatus 400, 400', 400" through a destination setting program as well as allowing the user to recognize a destination to be moved.

According to an embodiment, the mobile terminal 100 may execute a schedule management program to display a place name according to a time stored in the memory 160 on the screen, and receive a selection input for the place name from the user to transfer the selected place name to the destination setting program.

Accordingly, the destination setting program may display a destination on the screen as illustrated in FIG. 13A(a) or 13A(b), and set the destination on the vehicle control apparatus 400, 400', 400" based on a user input.

Prior to Getting on Vehicle—Fourth Embodiment

When power is on within a predetermined distance from the location of the vehicle, namely, when a vehicle proximity event has occurred, the mobile terminal 100 may display a message containing a schedule-related text according to a user input.

Figure 13C:
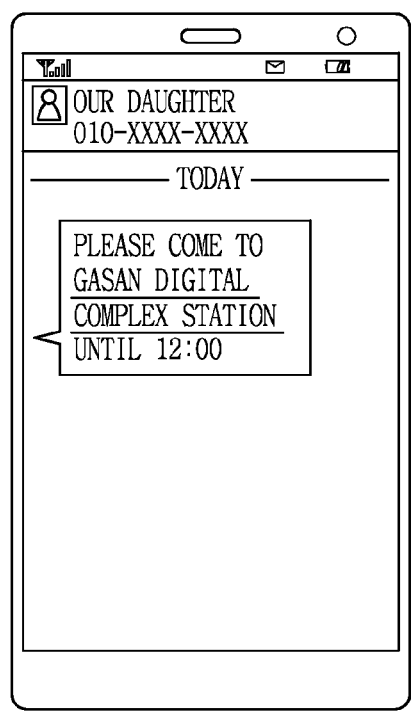
FIG. 13C is an exemplary view illustrating a screen on which a message containing a schedule-related text according to an embodiment disclosed in the present disclosure is displayed.

FIG. 13C is an exemplary view illustrating a screen on which a message containing a schedule related text according to an embodiment disclosed in the present disclosure is displayed.

As illustrated in FIG. 13C, when an event occurs, the mobile terminal 100 may execute a message program to display a message stored in the memory 160.

A message displayed on the screen is a message containing a schedule-related text other than a simple message, and the controller 180 may recognize a time and/or place name or the like, and display the recognized time and place name in the form of hyperlink to receive a user selection input as illustrated in FIG. 13C.

The mobile terminal 100 that has received a selection input for any one of the time and place name from the user may transfer at least one of the time, place name and message originator to a schedule management program, thereby registering the relevant time, place name and message originator with the schedule management program.

According to another embodiment, the mobile terminal 100 that has received a selection input for a place name from the user may transfer the place name to a destination setting program, thereby allowing the vehicle control apparatus 400, 400', 400" to set the relevant place name as a destination.

According to still another embodiment, the message originator may be transferred to an outgoing call program according to a user input, thereby allowing the mobile terminal 100 to place a call to the message originator.

Prior to Getting on Vehicle—Fifth Embodiment

When power is on within a predetermined distance from the location of the vehicle, namely, when a vehicle proximity event has occurred, the mobile terminal 100 may display a screen for displaying the information of the vehicle according to a user input.

Figure 13D:
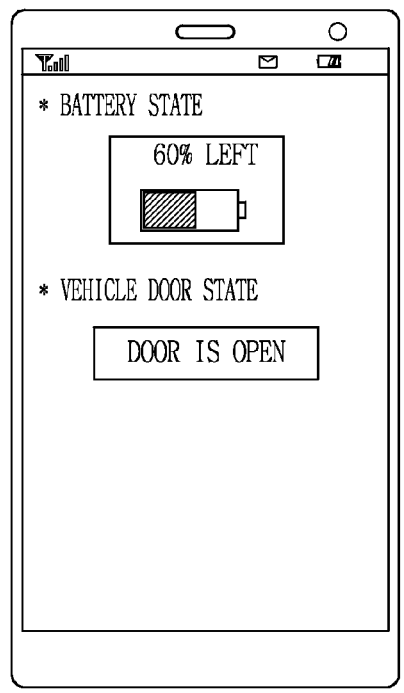
FIG. 13D is an exemplary view illustrating a screen on which vehicle information according to an embodiment disclosed in the present disclosure is displayed.

FIG. 13D is an exemplary view illustrating a screen on which vehicle information according to an embodiment disclosed in the present disclosure is displayed.

As illustrated in FIG. 13D, the mobile terminal 100 may receive vehicle information collected by the vehicle control apparatus 400, 400', 400" through the wireless communication unit 110 to display the received vehicle information on the screen.

At this time, the vehicle information collected by the vehicle control apparatus 400, 400', 400" through the vehicle information acquisition unit 460 may be information associated with at least one of an air conditioning state (temperature, humidity, fan level, etc.) inside the vehicle, whether the vehicle door (a hood, a trunk, a fuel inlet, etc.) is open or closed, whether a window is open or closed, whether a sunroof is open or closed, a battery charging state of the vehicle, a fueling state of the vehicle, and tire pressure information.

For an example, as illustrated in FIG. 13D, the mobile terminal 100 may display a battery state ("60% is left") and a vehicle door state ("door is open") contained in the vehicle among the information of the vehicle on the screen.

According to still another embodiment, when power is on within a predetermined distance from the location of the vehicle, namely, when a vehicle proximity event has occurred, the mobile terminal 100 may execute a program for transmitting a control command for the vehicle according to a user input.

Figure 13E:
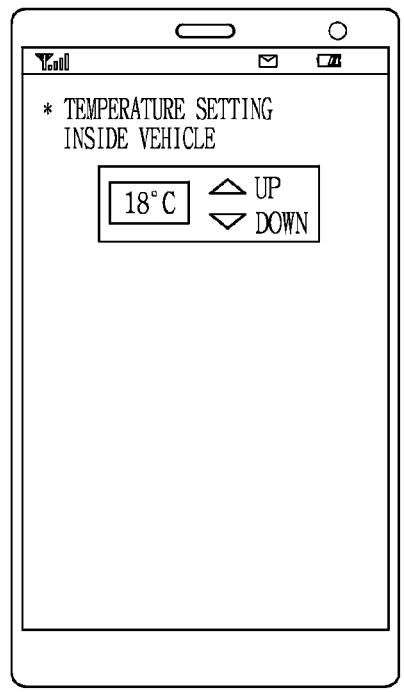
FIG. 13E is an exemplary view illustrating an execution screen of a program for transmitting a control command to a vehicle according to an embodiment disclosed in the present disclosure.

FIG. 13E is an exemplary view illustrating an execution screen of a program for transmitting a control command to a vehicle according to an embodiment disclosed in the present disclosure.

As illustrated in FIG. 13E, the mobile terminal 100 may transmit a control command for the vehicle by the vehicle control apparatus 400, 400', 400" through the wireless communication unit 110, and the vehicle control apparatus 400, 400', 400" may control the vehicle according to the control command.

At this time, a control command transmitted from the mobile terminal 100 to the vehicle control apparatus 400, 400', 400" may include at least one of an air conditioning control inside the vehicle, an ignition on/off control of the vehicle, a control of whether the vehicle door is open or closed, a control of whether the vehicle window is open or closed, and a control of whether the vehicle sunroof is open or closed.

For an example, as illustrated in FIG. 13E, the mobile terminal 100 may generate an air conditioning control command for increasing or decreasing temperature inside the vehicle through a user selection input for "UP" and "DOWN" to transfer it to the vehicle control apparatus 400, 400', 400".

Accordingly, the vehicle control apparatus 400, 400', 400" may control temperature inside the vehicle to maintain the inside temperature at 18 degrees according to the air conditioning control command.

Subsequent to Getting on Vehicle—First Embodiment

When a user is getting on the vehicle, namely, when a vehicle getting-on event has occurred, the mobile terminal 100 may display the information of the vehicle according to a user input.

The mobile terminal 100 or vehicle control apparatus 400, 400', 400" may determine whether or not a user is getting on the vehicle as described above, and when a user's vehicle getting-on event has occurred, the mobile terminal 100 may display the information of the vehicle.

As described in the [prior to getting on vehicle—fifth embodiment], the mobile terminal 100 may receive vehicle information collected by the vehicle control apparatus 400, 400', 400" through the wireless communication unit 110 to display the received vehicle information on the screen.

At this time, the vehicle information collected by the vehicle control apparatus 400, 400', 400" through the vehicle information acquisition unit 460 may be information associated with at least one of an air conditioning state (temperature, humidity, fan level, etc.) inside the vehicle, whether the vehicle door (a hood, a trunk, a fuel inlet, etc.) is open or closed, whether a window is open or closed, whether a sunroof is open or closed, a battery charging state of the vehicle, a fueling state of the vehicle, and tire pressure information.

The user may check the state of the vehicle even subsequent to getting-on the vehicle, and thus determine whether or not the vehicle is abnormal.

When the mobile terminal 100 determines whether or not there is abnormality, and confirms that there is abnormality in the vehicle, the mobile terminal 100 may output light, sound or vibration to the outside, thereby having an effect of allowing the user to prevent an accident from occurring while moving the vehicle.

According to still another embodiment, when a user is getting on the vehicle, namely, when a vehicle getting-on event has occurred, the mobile terminal 100 may execute a program for transmitting a control command to the vehicle according to a user input.

As described in the [prior to getting on vehicle—fifth embodiment], the mobile terminal 100 may transmit a control command to the vehicle by the vehicle control apparatus 400, 400', 400" through the wireless communication unit 110, and the vehicle control apparatus 400, 400', 400" may control the vehicle according to the control command.

At this time, a control command transmitted from the mobile terminal 100 to the vehicle control apparatus 400, 400', 400" may include at least one of an air conditioning control inside the vehicle, an ignition on/off control of the vehicle, a control of whether the vehicle door is open or closed, a control of whether the vehicle window is open or closed, and a control of whether the vehicle sunroof is open or closed.

Subsequent to Getting on Vehicle—First Embodiment

When a user is getting on the vehicle, namely, when a vehicle getting-on event has occurred, the mobile terminal 100 may execute a program for setting the destination of the vehicle control apparatus 400, 400', 400" according to a user input.

In short, the mobile terminal 100 may receive an input for retrieving a destination in the form of text or voice from the user, and transmit the user's selected destination to the vehicle control apparatus 400, 400', 400" to set the destination based on data received by the vehicle control apparatus 400, 400', 400". Of course, the destination may include a stopover or At this time, data transmitted to the vehicle control apparatus 400, 400', 400" by the mobile terminal 100 may include route information including a stopover or route position.

However, when a user is getting on the vehicle, the user may directly manipulate the vehicle control apparatus 400, 400', 400" to set a destination or route position, and thus the setting of a destination on the vehicle control apparatus 400, 400', 400" through the mobile terminal 100 may not have a great advantage.

However, when a destination is set on the vehicle control apparatus 400, 400', 400" through the mobile terminal 100, the user may recognize his or her experience on the vehicle control apparatus 400, 400', 400" through the mobile terminal 100 prior to getting on the vehicle.

As described in the [prior to getting on vehicle—second embodiment] through [prior to getting on vehicle—fourth embodiment], the mobile terminal 100 may extract a place name or the like from a query requested by the user through at least one search program contained in the mobile terminal 100 prior to getting on the vehicle, an item stored in a schedule management program or text contained in a message, and transmit the extracted content to the vehicle control apparatus 400, 400', 400". Accordingly, the vehicle control apparatus 400, 400', 400" may set a destination based on data received from the mobile terminal 100.

For an example, as illustrated in FIG. 13A, the mobile terminal 100 may display a destination on the screen based on a log in which the mobile terminal 100 is used by the user, and simply receive an input for selecting one from the destination list from the user, thereby conveniently setting a destination on the vehicle control apparatus 400, 400', 400".

Driving Vehicle—First Embodiment

When receiving a call while driving the vehicle, namely, when an incoming call event has occurred, the mobile terminal 100 may reject the incoming call, and transmit an automatic response message to the outgoing call destination.

Then, when the vehicle is not moving or a user is getting off the vehicle, the mobile terminal 100 may execute a program for sending a call to the outgoing call destination according to a user input.

The mobile terminal 100 or vehicle control apparatus 400, 400', 400" may determine whether or not the vehicle is moving as described above, and the mobile terminal 100 or vehicle control apparatus 400, 400', 400" may share a state of whether or not the vehicle is moving.

At this time, when an incoming call event has occurred while driving the vehicle, the mobile terminal 100 may reject an incoming call upon receiving the call, and automatically transmit a response message to the counterpart.

Figure 9A:
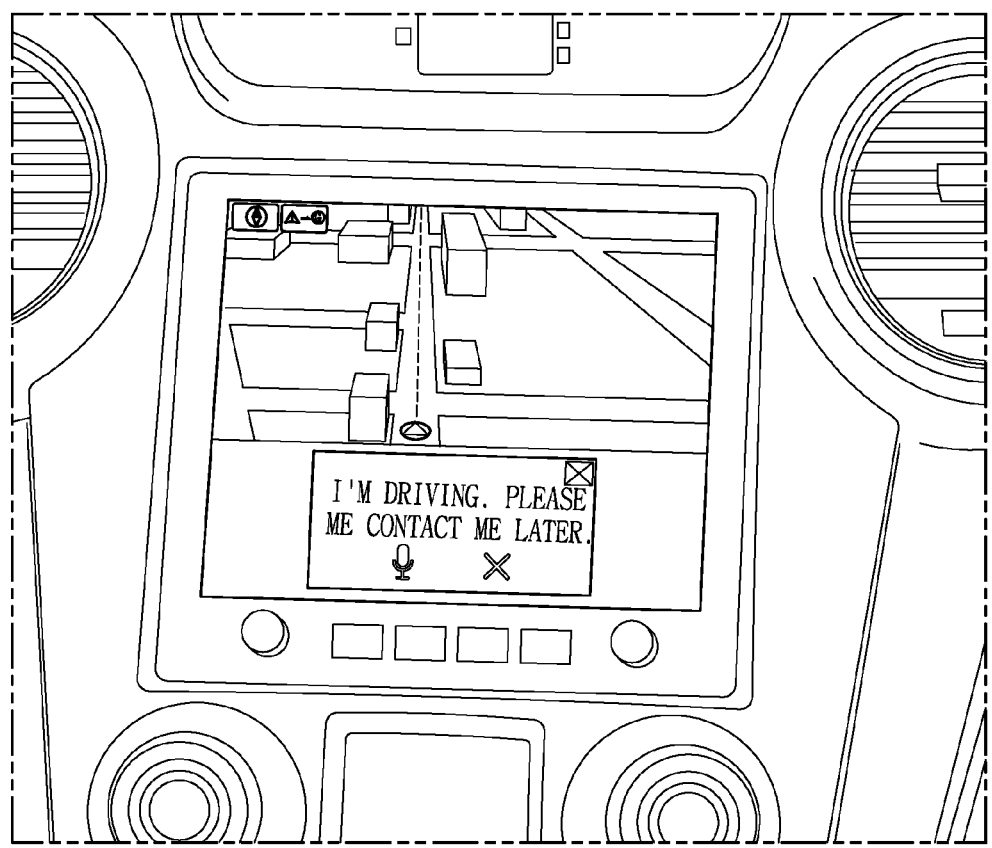
FIG. 9A is an exemplary view illustrating a screen of a vehicle control apparatus when an incoming call event has occurred in a mobile terminal while driving a vehicle according to an embodiment disclosed in the present disclosure.
Figure 9B:
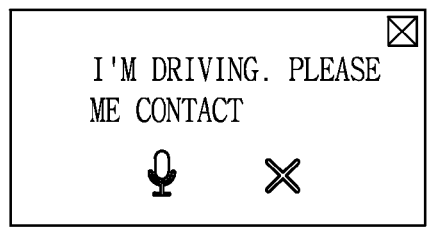
FIG. 9B is an exemplary view illustrating a partial screen of a vehicle control apparatus in FIG. 9A.
Figure 9C:
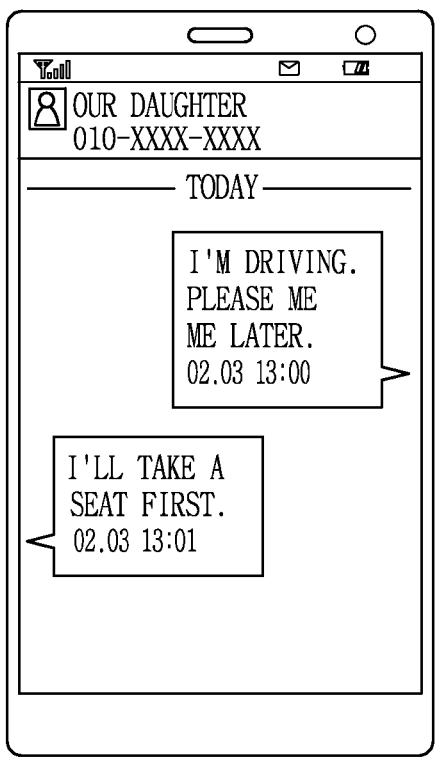
FIG. 9C is an exemplary view illustrating a screen in which a mobile terminal sends a response message to the counterpart when an incoming call event has occurred in the mobile terminal while driving a vehicle according to an embodiment disclosed in the present disclosure.

FIG. 9C is an exemplary view illustrating a screen in which a mobile terminal sends a response message to the counterpart when an incoming call event has occurred in the mobile terminal while driving a vehicle according to an embodiment disclosed in the present disclosure.

For an example, when an incoming call event from "our daughter" has occurred in the mobile terminal 100 while driving the vehicle, the mobile terminal 100 may reject the incoming call, and transmit a message indicating that the incoming call is currently not allowed, such as "I'm driving.

Please me contact me later", to "our daughter (010-xxxx-xxxx)" who is the outgoing call counterpart.

On the other hand, the mobile terminal 100 and vehicle control apparatus 400, 400', 400" may share an event that has occurred from each node, and thus when an incoming call event is generated from the mobile terminal 100, the mobile terminal 100 may reject the incoming call while at the same time the vehicle control apparatus 400, 400', 400" receives a message to be transmitted to "our daughter (010-xxxx-xxxx)" who is the outgoing call counterpart through the mobile terminal 100 as illustrated in FIG. 9B.

Since the vehicle is currently moving, the vehicle control apparatus 400, 400', 400" may preferably recognize a voice received by the vehicle control apparatus 400, 400', 400" from the user, and prepare text based on the recognized content to transmit it to the mobile terminal 100, and the mobile terminal 100 may prepare a message based on the received text to transmit the prepared message to the outgoing call counterpart.

Then, when a vehicle's non-moving event or a user's vehicle getting-off event has occurred in the mobile terminal 100 or vehicle control apparatus 400, 400', 400", the mobile terminal 100 may execute a program for placing a call to the outgoing call counterpart according to a user input.

For an example, when an incoming call event has occurred in the mobile terminal 100 while driving the vehicle, the mobile terminal 100 may perform incoming call rejection and response message transmission as described above, and may display a pop-up window (W) containing a graphic object corresponding to an outgoing call program on the screen as illustrated in FIG. 10A.

Furthermore, the number of incoming call events that have occurred in the mobile terminal 100 while driving the vehicle may be displayed as a numeral around the graphic object or around an icon receiving an execution command for the outgoing call program.

At this time, upon receiving a user input for selecting the graphic object or outgoing call program, the mobile terminal 100 executes an outgoing call program as illustrated in FIG. 10D to perform an outgoing call operation to the object selected by the user.

At this time, the outgoing call program may display whether or not the event has occurred or the number of event occurrences on the executed program screen.

For an example, as illustrated in FIG. 10D, when an incoming and outgoing call program is executed, when an incoming call event has occurred once in the mobile terminal 100 while driving the vehicle, and whether or not an event has occurred on part of the incoming and outgoing call program execution screen may be displayed thereon. At this time, the number of event occurrences may display a numeral or "vehicle" shaped icons indicating that there are occurred events by repeating them as many as the number of event occurrences on the screen.

Here, the location of an icon indicating whether or not an event has occurred may be determined using information extracted from data corresponding to an event that has occurred from the mobile terminal 100 or vehicle control apparatus 400, 400', 400".

For an example, an incoming call event is generated from the mobile terminal 100 while driving the vehicle, and a call originator is extracted as "our daughter" from the corresponding data, the "vehicle" shaped icon may be preferably displayed in a region corresponding to "our daughter" within an incoming and outgoing call list on the screen showing an incoming and outgoing call program.

Driving Vehicle—Second Embodiment

When a vehicle receives a message containing a schedule-related text while the vehicle is moving, the mobile terminal 100 may execute a schedule management program according to a user input when the vehicle is not moving or a user is getting off the vehicle.

When the mobile terminal 100 receives a message with a schedule-related text containing time ("12:00") and/or place name "Gasan Digital Complex Station") while driving the vehicle as illustrated in FIG. 13C, and a vehicle non-moving event or vehicle getting-off event has occurred, the mobile terminal 100 may execute a schedule management program.

The controller 180 of the mobile terminal 100 may extract a schedule-related text from the message to register it with a schedule management program installed in the mobile terminal 100.

However, when the schedule-related text extracted from the message includes a text from which at least one of date, time and place name is omitted or unrecognizable text, modification by the user may be needed, and thus the mobile terminal 100 may preferably execute a schedule management program according to a user input when a vehicle non-moving event or vehicle getting-off event has occurred.

Driving Vehicle—Third Embodiment

When making a recording while the vehicle is moving, the mobile terminal 100 may execute a program capable of managing a recording file according to a user input when the vehicle is not moving or a user is getting off the vehicle.

While driving the vehicle, the mobile terminal 100 or vehicle control apparatus 400, 400', 400" may receive and store voice or text from the user (preferably, voice because of driving the vehicle).

Then, when a vehicle non-moving event or vehicle getting-off event has occurred is generated from the mobile terminal 100 or vehicle control apparatus 400, 400', 400", the mobile terminal 100 may execute a program capable of managing a recording file.

For an example, when vehicle non-moving event or vehicle getting-off event has occurred, as illustrated in FIG. 10A, the mobile terminal 100 may display a pop-up window (W) corresponding to a recording program (or memo program) on the screen.

Furthermore, the number of recordings (or memos) stored while driving the vehicle may be displayed with a numeral around a graphic object and/or around an icon receiving an execution command for the recording program (or memo program).

Figure 13F:
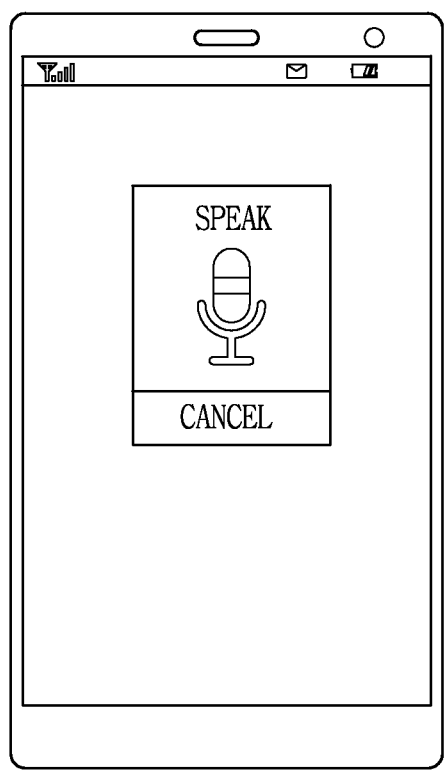
FIG. 13F is an exemplary view illustrating an execution screen of a recording program according to an embodiment disclosed in the present disclosure.

At this time, upon receiving a user input for selecting the graphic object or recording program (or memo program), the mobile terminal 100 may execute a recording file management program to play, make an additional recording (or memo), modify or delete a file recorded (or made) while driving the vehicle as illustrated in FIG. 13F.

At this time, though not shown in the drawing, a recording management program may display whether or not the event has occurred or the number of event occurrences on the executed program screen.

For an example, when a recording management program is executed or a recording (or memo) stored while driving the vehicle is generated, whether or not the event has occurred may be displayed on part of the recording management program execution screen. At this time, the number of event occurrences may display a numeral or "vehicle" shaped icons indicating that there are occurred events by repeating them as many as the number of event occurrences on the screen.

Driving Vehicle—Fourth Embodiment

When a vehicle non-moving event or vehicle getting-off event has occurred in the mobile terminal 100 or vehicle control apparatus 400, 400', 400" though the vehicle control apparatus 400, 400', 400" determines that the vehicle has not arrived at a set destination, the mobile terminal 100 may display a route from a current location to the destination according to a user input.

For an example, though a moving vehicle has not arrived at the destination, a user may get off the vehicle.

Accordingly, the user may display a route from a current location to the destination on the screen to allow him or her to walk from a place where he or she is getting off the vehicle to the destination.

The wireless communication unit 110 of the mobile terminal 100 may receive a set destination from the vehicle control apparatus 400, 400', 400", and the controller 180 may calculate the shorted and/or optimal route from a current location of the vehicle to the received destination, and display the route on the screen through the output unit 150, thereby performing road guide to allow the user to move from the current location to the vehicle location along the route.

Figure 13G:
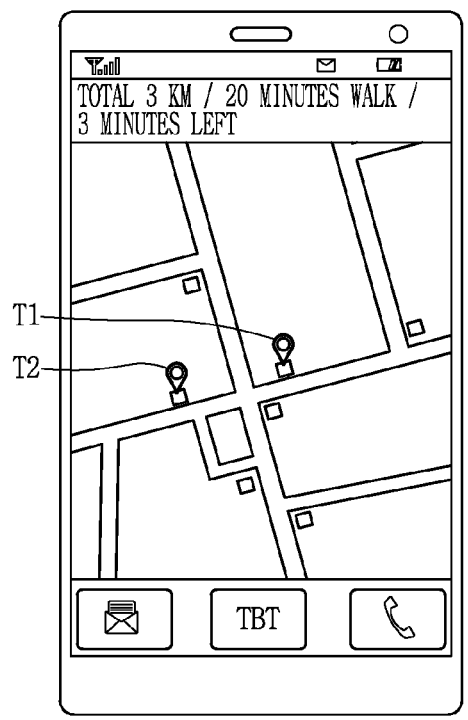
FIGS. 13G(a) and 13G(b) is an exemplary view illustrating a screen on which a route to a destination according to an embodiment disclosed in the present disclosure is displayed.
Figure 13G:
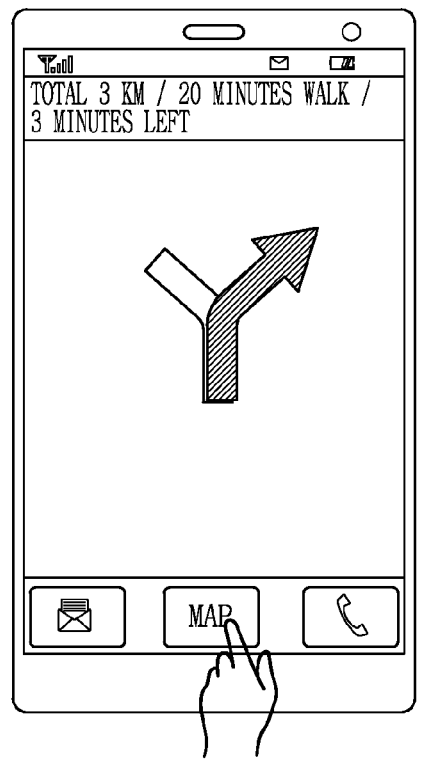

As illustrated in FIG. 13G(a), a route from a current location (T2) to the destination (T1) may be displayed on a map, and furthermore, it may be preferable to calculate a driving direction for approaching the vehicle location in real time according to a direction in which the mobile terminal body faces, and display the calculated driving direction in a turn-by-turn (TBT) manner using an arrow on the screen.

At this time, when displaying a driving direction to the vehicle location in a turn-by-turn manner, it may be preferably displayed on a wearable device screen.

Furthermore, a user may preferably calculate a moving distance from the current location to the vehicle location, an expected moving time according to a walking speed or the like to display it on the screen.

According to another embodiment, when the vehicle control apparatus 400, 400', 400" determines that the vehicle has currently arrives at a first destination (T1), and then a second destination (T2) is set, and the vehicle control apparatus 400, 400', 400" determines again that the vehicle has arrived at the second destination (T2), the mobile terminal 100 may display a route from the second destination to the first destination according to a user input when the vehicle is not moving or a user is getting off the vehicle.

For an example, when a parking space is not available at the first destination though the moving vehicle has arrived at the first destination, a nearby parking lot may be set to the second destination (T2) by a user input through the mobile terminal 100 or vehicle control apparatus 400, 400', 400".

Accordingly, the user may display a route from the second destination (T2) to the first destination (T1) on the screen to move the vehicle from the reset second destination (T2) to the initially set first destination (T1).

The wireless communication unit 110 of the mobile terminal 100 may receive the set first and second destinations from the vehicle control apparatus 400, 400', 400", and the controller 180 may calculate the shortest and/or optimal route from the second destination to the first destination to display the route on the screen through the output unit 150, thereby performing road guide to allow the user to move the vehicle from the current location to the vehicle location along the route.

A route from a current location to a destination may be displayed on a map as illustrated in FIG. 13G(a), and may be displayed on the screen in a turn-by-turn (TBT) manner as illustrated in FIG. 13G(b).

Non-Moving Vehicle or User's Getting Off—First Embodiment

When the vehicle control apparatus 400, 400', 400" determines the arrival of the vehicle at a set destination, and a vehicle non-moving event or vehicle getting-off event has occurred in the mobile terminal 100 or vehicle control apparatus 400, 400', 400", the mobile terminal 100 may display information associated with the set destination on the vehicle control apparatus 400, 400', 400".

The mobile terminal 100 may receive a destination name from the vehicle control apparatus 400, 400', 400" through the wireless communication unit 110 or display information on the destination based on the destination preselected (preset) by a user.

According to an embodiment, the memory 160 of the mobile terminal 100 may store related information on a place name, an address or a location.

Accordingly, when a vehicle non-moving event or vehicle getting-off event has occurred, the controller 180 of the mobile terminal 100 may retrieve information associated with a destination stored in the memory 160 using a destination set in the vehicle control apparatus 400, 400', 400" as a keyword, and display the retrieved result on the screen.

For an example, the information associated with a destination stored in the memory 160 may be a map containing the destination, a restroom location located at the destination, a parking lot location, a gateway location, a restaurant location, and the like, and when the destination is a restaurant, the information may be operating hours for the restaurant, a menu of the restaurant, a contact of the restaurant, and the like.

According to another embodiment, the mobile terminal 100 may transmit a query including a destination name set in the vehicle control apparatus 400, 400', 400" to a search server (provided by a search service provide) (not shown), and display response data received from the search server on the screen according to a user input.

For an example, when a vehicle non-moving event or vehicle getting-off event has occurred, a pop-up window (W) including a graphic object associated with the location may be displayed on the screen.

Furthermore, the number of events required for a user's check may be displayed as a numeral around a graphic object and/or around an icon receiving an execution command for a program associated with the location.

Figure 13H:
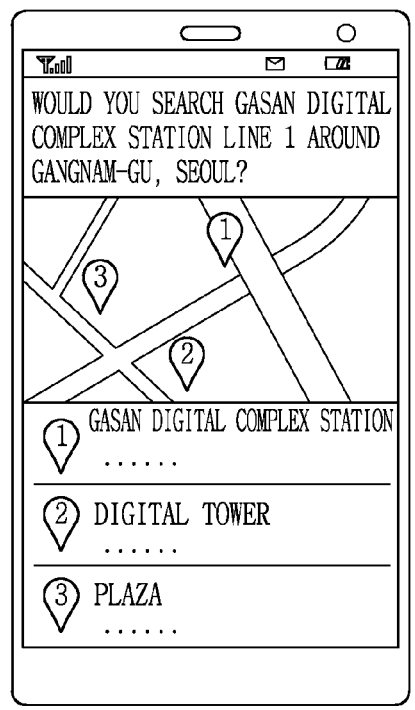
FIG. 13H is an exemplary view illustrating a screen on which information associated with a destination according to an embodiment disclosed in the present disclosure is displayed.

At this time, upon receiving a user input for selecting the graphic object, the mobile terminal 100 may execute a program associated with location to display a screen shown with information associated with the destination as illustrated in FIG. 13H.

On the contrary, upon receiving a user input for selecting the graphic object, the mobile terminal 100 may transfer the destination name as a parameter to a search program, and receive response data received from a search server using the search program to display it on the screen. As illustrated in FIG. 13H, it may be displayed in the form of web page.

In this manner, when a vehicle non-moving event or vehicle getting-off event has occurred, the mobile terminal 100 may display information associated with a destination on the screen to provide information on a destination to a user, and consequently, the user may know a map for the destination, the location of various facilities or the like, and visit a home page corresponding to the destination, and make a call through an outgoing call program using a contact of the destination.

Non-Moving Vehicle or User's Getting Off—Second Embodiment

When the vehicle control apparatus 400, 400', 400" determines the arrival of the vehicle at a set destination, and a vehicle non-moving event or vehicle getting-off event has occurred in the mobile terminal 100 or vehicle control apparatus 400, 400', 400", the mobile terminal 100 may execute an outgoing call program to place a call to a contact corresponding to an address stored in an address book according to a user input when the address stored in the address book belongs to a predetermined range of destination set in the vehicle control apparatus 400, 400', 400".

According to another embodiment, when the vehicle control apparatus 400, 400', 400" determines the arrival of the vehicle at a set destination, and a vehicle non-moving event or vehicle getting-off event has occurred in the mobile terminal 100 or vehicle control apparatus 400, 400', 400", the mobile terminal 100 may execute an outgoing call program to make a call to a contact within a message stored along with a place or the message originator corresponding to an address stored in an address book according to a user input when the place contained in a prestored message belongs to a predetermined range of destination set in the vehicle control apparatus 400, 400', 400".

According to still another embodiment, when the vehicle control apparatus 400, 400', 400" determines the arrival of the vehicle at a set destination, and a vehicle non-moving event or vehicle getting-off event has occurred in the mobile terminal 100 or vehicle control apparatus 400, 400', 400", the mobile terminal 100 may execute an outgoing call program to make a call to a contact stored along with a place in a schedule management program according to a user input when the place store in the schedule management program belongs to a predetermined range of destination set in the vehicle control apparatus 400, 400', 400".

In other words, when the vehicle arrives at a destination set in the vehicle control apparatus 400, 400', 400", the mobile terminal 100 may preferably execute an outgoing call program to make a call to a specific person, house, store, or the like associated with the destination.

Figure 13I:
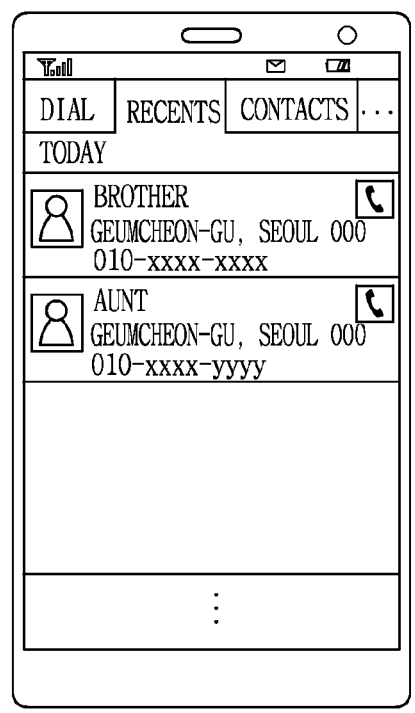
FIG. 13I is an exemplary view illustrating an execution screen of an outgoing call program for placing a call to a contact associated with a destination according to an embodiment disclosed in the present disclosure.

At this time, the mobile terminal 100 may execute an outgoing call program to display an outgoing call destination in the form of list as illustrated in FIG. 13I.

The outgoing call destination may be a contact stored in an address book, a contact stored in a message or that has sent a message or a contact stored in a schedule management program as described above.

Specifically, the mobile terminal 100 may preferably retrieve an address book and messages stored in the memory 160, and content stored in a schedule management program based on a destination received from the vehicle control apparatus 400, 400', 400" or previously selected (or set) by the user according to the occurrence of a vehicle non-moving event or vehicle getting-off event to extract a contact associated with the destination, and make a call through an outgoing call program to the extracted contact according to a user input.

In other words, the controller 180 of the mobile terminal 100 may calculate a distance between an address stored in an address book and the destination based on the destination, and execute an outgoing call program to make a call to a contact corresponding to the address that belongs to a predetermined range of distance when the calculated distance belongs to the predetermined range of distance.

Furthermore, the controller 180 of the mobile terminal 100 extracts a place or address from a message containing a schedule-related text, and calculates a distance between the extracted place or address and the destination. When the calculated distance belongs to a predetermined range of distance, the controller 180 of the mobile terminal 100 may execute an outgoing call program to make a call to a contact contained in a message from which the place or address is extracted or a contact that has sent a message from which the place or address is extracted.

Furthermore, the controller 180 of the mobile terminal 100 extracts a place or address stored in a schedule management program based on the destination, and calculates a distance between the extracted place or address and the destination. When the calculated distance belongs to a predetermined range of distance, the controller 180 of the mobile terminal 100 may execute an outgoing call program to make a call to a contact stored along with an item from which the place or address is extracted.

As illustrated in FIG. 13I, an outgoing call program may display a contact associated with the destination in the form of list on the screen in connection with the address book, message, schedule management program, and make a call too a contact selected by the user.

Non-Moving Vehicle or User's Getting Off—Third Embodiment

When the vehicle control apparatus 400, 400', 400" determines the arrival of the vehicle at a set destination, and a vehicle non-moving event or vehicle getting-off event has occurred in the mobile terminal 100 or vehicle control apparatus 400, 400', 400", the mobile terminal 10 may execute a photo capture program, a memo program or recording program according to a user input.

When a vehicle non-moving event or vehicle getting-off event has occurred to record a parking location of the vehicle while getting off the vehicle, the user may preferably execute a program according to a user input to capture a photo, make a memo or make a recording.

For an example, when a vehicle non-moving event or vehicle getting-off event has occurred, as illustrated in FIG. 10A, the mobile terminal 100 may display a pop-up window (W) including a graphic object corresponding to a recording program for allowing a photo, a memo or recording on the screen.

Furthermore, the number of event occurrences requiring the user's check may be displayed with a numeral around a graphic object and/or around an icon receiving an execution command for the recording program.

At this time, upon receiving a user input for selecting the graphic object or recording program, for an example, the mobile terminal 100 may execute a recording file management program to make a recording as illustrated in FIG. 13F, or execute a program capable of capturing a photo as illustrated in FIG. 11B.

Vehicle to which the Technique of the Present Invention is Applicable

Hereinafter, a vehicle, to which the vehicle control apparatus of the present invention is applicable, will be explained with reference to FIG. 14.

Figure 14:
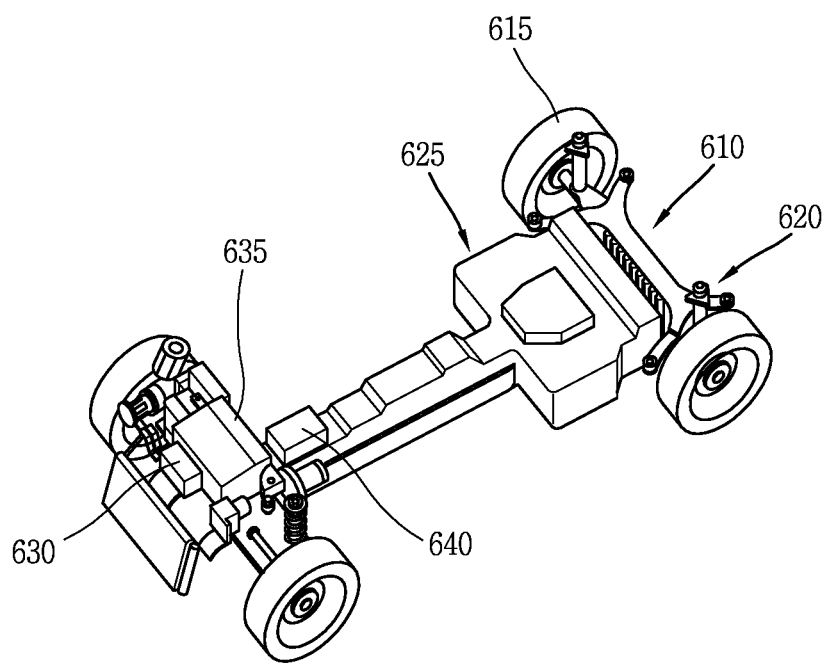
FIG. 14 is a schematic configuration diagram illustrating an electric vehicle provided with a battery charging device according to an embodiment disclosed in the present disclosure.

FIG. 14 illustrates an electric vehicle. However, it is obvious to those skilled in the art that the technique of the present invention is also applicable to other types of vehicles (e.g., vehicle provided with gasoline engine, diesel engine, or LPG engine) within the scope of the technical spirit of the present invention.

FIG. 14 is a view illustrating a schematic construction of an electric vehicle having a battery charging device according to an embodiment of the present invention.

As shown in FIG. 14, the electric vehicle 600 having a battery charging device according to an embodiment of the present invention may include a vehicle body 610; a battery 625 provided at the vehicle body 610; and a battery charging device 640 provided at the vehicle body 610, connected to an external power, and configured to charge the battery 625.

Although not shown, a boarding space for a driver or a passenger may be provided at an upper region of the vehicle body 610. For instance, the vehicle body 610 may be provided with a cabin (not shown) having a boarding space therein.

The vehicle body 610 may be provided with a plurality of wheels 615. A suspension device 620 may be provided between the vehicle body 610 and the wheel 615. Under such configuration, a vibration and an impact, which occur when the vehicle body 610 runs on a road, may be attenuated.

The wheel 615 may be provided at each of front, rear, and lateral sides of the vehicle body 610.

The battery 625 for supplying power may be provided at the vehicle body 610.

The battery 625 may be configured as a secondary battery for charging.

An electronic motor 630 for providing a driving force to the wheel 615 may be provided at one side of the vehicle body 610.

An inverter 635 for providing a driving power to the electric motor 630 may be provided at the vehicle body 610. The inverter 635 may be connected to the battery 625 and the electric motor 630, respectively.

The inverter 635 may be connected to the battery 125 to receive a direct current (DC) power, and may convert the DC power to a power suitable for driving of the electric motor 630. Then the inverter 635 may provide the converted power to the electric motor 130.

The battery charging device 640 for charging the battery 625 may be provided at the vehicle body 610. The battery charging device 640 may be provided with a charging circuit 660 connected to an external commercial power (AC), the charging circuit 660 configured to provide the commercial power to the battery 625 after converting the commercial power to a power suitable for charging of the battery 625. Although not shown, the charging circuit 660 may include a commercial power input unit connected to a commercial power and configured to input the commercial power; a rectifying unit and a smoothing unit configured to convert a commercial power input through the commercial power input unit, to a direct current; and a power conversion unit configured to convert a converted direct current into a power suitable for charging of the battery 625, and to output the converted power.

The scope of the invention is not limited to those specific embodiments, and thus various modifications, variations, and improvements can be made in the present invention without departing from the concept of the invention, and within the scope of the appended claims.

What is claimed is:

1. A mobile terminal configured to perform communication with a vehicle control apparatus installed in a vehicle, the mobile terminal comprising:
   a wireless communication unit configured to communicate with a network comprising the vehicle control apparatus and the mobile terminal; and
   a controller configured to:
      cause the vehicle control apparatus or the mobile terminal to perform an operation corresponding to one or more events that have been detected related to the vehicle;
      cause the mobile terminal to generate an output based at least in part on the one or more events that have been detected related to the vehicle; and
      based on the vehicle arriving at a preset destination, execute an outgoing call program to place a call to a contact associated with the preset destination.

2. The mobile terminal of claim 1, wherein the wireless communication unit is configured to transmit, to the vehicle control apparatus, data corresponding to the detected one or more events that causes the vehicle control apparatus to perform an operation corresponding to the one or more events.

3. The mobile terminal of claim 1, further comprising:
   a display unit configured to display a pop-up window that is configured to receive the user input.

4. The mobile terminal of claim 3, wherein the display unit is configured to display at least one graphic object within the pop-up window, and
   the controller is configured to perform an operation corresponding to the one or more events according to a selection input to the at least one graphic object.

5. The mobile terminal of claim 4, wherein the display unit is configured to display, on or around the at least one graphic object, an indication of a number of the one or more events that have been detected.

6. The mobile terminal of claim 1, further configured to, based at least in part on detecting an event related to a user entering the vehicle, display information regarding the vehicle according to a user input.

7. The mobile terminal of claim 6, wherein the information regarding the vehicle comprises at least one of an air conditioning state inside the vehicle, an open state of a vehicle door, an open state of a vehicle window, an alarm state of the vehicle, an open state of a movable cover in the vehicle, an open state of an enclosable aperture in the vehicle, an open state of a sunroof, a battery charging state of the vehicle, a fueling state of the vehicle, or tire pressure information.

8. The mobile terminal of claim 1, further configured to, based at least in part on detecting an event related to a user entering the vehicle, execute a program for transmitting a control command to the vehicle according to a user input.

9. The mobile terminal of claim 1, further configured to, based at least in part on detecting an event related to a user entering the vehicle, execute a program configured to cause one or more processors to set a destination on the vehicle control apparatus according to a user input.

10. The mobile terminal of claim 9, wherein the program is configured to cause the one or more processors to set, as the destination of the vehicle control apparatus, at least one of:

a place for which a name has been retrieved more than a predetermined number of times based on a search log stored in the mobile terminal, a place that has been registered more than a predetermined number of times on a schedule management program, or a place that is included in a message in which the message including a specific place name is repeated more than a predetermined number of times.

11. The mobile terminal of claim 1, further configured to:
as a result of receiving an incoming call while the vehicle is moving and based on detecting an event related to non-movement of the vehicle or an event related to a user exiting the vehicle, reject the incoming call and send a response message to an outgoing call destination, and execute a program configured to cause one or more processors to originate a call to the outgoing call destination according to a user input.

12. The mobile terminal of claim 1, further configured to, as a result of receiving a message including a schedule-related text while the vehicle is moving and based on detecting an event related to non-movement of the vehicle or an event related to a user exiting the vehicle, execute a schedule management program according to a user input.

13. The mobile terminal of claim 1, further configured to, as a result of capturing a voice recording while the vehicle is moving and based on detecting an event related to non-movement of the vehicle or an event related to a user exiting the vehicle, execute a program configured to cause one or more processors to manipulate a file that stores the voice recording according to a user input.

14. The mobile terminal of claim 1, further configured to, as a result of determining that the vehicle has not arrived to a preset destination and based on detecting an event related to non-movement of the vehicle or an event related to a user exiting the vehicle, display, a route from a current location to the destination on the screen according to a user input.

15. The mobile terminal of claim 1, wherein
the vehicle control apparatus is configured to, subsequent to determining that the vehicle has arrived to a preset first destination, set a second destination for the vehicle, and the mobile terminal is configured to, as a result of determining the arrival of the vehicle at the second destination and based on detecting an event related to non-movement of the vehicle or an event related to a user exiting the vehicle, display a route from the second destination back to the first destination according to a user input.

16. The mobile terminal of claim 1, further configured to, as a result of the vehicle control apparatus determining the arrival of the vehicle to a preset destination and based on detecting an event related to non-movement of the vehicle or an event related to a user exiting the vehicle, display information associated with the preset destination.

17. The mobile terminal of claim 16, further configured to:
transmit a query including a name associated with the preset destination to a server, and
display data received from the server on the screen according to a user input.

18. The mobile terminal of claim 1, further configured to, as a result of the vehicle control apparatus determining the arrival of the vehicle to the preset destination and based on determining that a distance between the preset destination and an address stored in an address book is within a predetermined distance, execute the outgoing call program to place the call to a contact corresponding to the address stored in the address book according to a user input.

19. The mobile terminal of claim 1, further configured to, as a result of the vehicle control apparatus determining the arrival of the vehicle to the preset destination and based on determining that a distance between the preset destination and a location included in a pre-stored message is within a predetermined distance, execute the outgoing call program to place the call to a contact indicated in the pre-stored message or to an originator of the message according to a user input.

20. The mobile terminal of claim 1, further configured to, as a result of the vehicle control apparatus determining the arrival of the vehicle to the preset destination and based on determining that a distance between the preset destination and a location stored in a schedule management program is within a predetermined distance, execute an outgoing call program to place the call to a contact stored along with the location in the schedule management program according to a user input.

21. The mobile terminal of claim 1, further configured to, as a result of the vehicle control apparatus determining the arrival of the vehicle to the preset destination and based on detecting an event related to non-movement of the vehicle or an event related to a user exiting the vehicle, execute a photo capture program, a memo program, or a recording program according to a user input.

22. The mobile terminal of claim 1, wherein the controller is configured to cause the mobile terminal to generate the output that is based at least in part on the detected one or more events related to the vehicle in the form of a visual indication, a vibration, or a sound based on the event being detected.

23. A system comprising:
a vehicle control apparatus provided in a vehicle and communicative with one or more communication networks, the vehicle control apparatus configured to:
determine one or more events that have been detected related to the vehicle; and
transmit, through the one or more communication networks, information regarding the detected one or more events related to the vehicle; and a mobile terminal communicative with the one or more communication networks and configured to:
receive the information transmitted by the vehicle control apparatus regarding the detected one or more events related to the vehicle;
generate an output based at least in part on the received information regarding the detected one or more events related to the vehicle; and
based on the vehicle arriving at a preset destination, execute an outgoing call program to place a call to a contact associated with the preset destination.

* * * * *